(12) United States Patent
Tsuyama et al.

(10) Patent No.: US 11,898,046 B2
(45) Date of Patent: Feb. 13, 2024

(54) PHOTOPOLYMERIZATION INITIATOR AND PRODUCING METHOD THEREOF, POLYMERIZABLE COMPOSITION, INK JET RECORDING METHOD, AND ACYLPHOSPHINE OXIDE COMPOUND

(71) Applicant: FUJIFILM CORPORATION, Tokyo (JP)

(72) Inventors: Hiroaki Tsuyama, Kanagawa (JP); Kazuhiro Yokoi, Kanagawa (JP); Kouki Nakamura, Kanagawa (JP); Kenjiro Araki, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 329 days.

(21) Appl. No.: 17/159,410

(22) Filed: Jan. 27, 2021

(65) Prior Publication Data
US 2021/0147700 A1 May 20, 2021

Related U.S. Application Data

(60) Division of application No. 15/967,603, filed on May 1, 2018, now Pat. No. 10,941,307, which is a continuation of application No. PCT/JP2016/083288, filed on Nov. 9, 2016.

(30) Foreign Application Priority Data

Nov. 20, 2015 (JP) ................. 2015-227695
Aug. 31, 2016 (JP) ................. 2016-169969

(51) Int. Cl.
| | | |
|---|---|---|
| C09D 11/38 | (2014.01) | |
| C07F 9/53 | (2006.01) | |
| C08F 2/50 | (2006.01) | |
| B41M 5/00 | (2006.01) | |
| B41M 7/00 | (2006.01) | |

(52) U.S. Cl.
CPC .............. C09D 11/38 (2013.01); B41M 5/00 (2013.01); B41M 7/0081 (2013.01); C07F 9/53 (2013.01); C07F 9/5337 (2013.01); C08F 2/50 (2013.01)

(58) Field of Classification Search
CPC ....... C09D 11/38; B41M 5/00; B41M 7/0081; C07F 9/53; C07F 9/5337; C08F 2/50
USPC ............................................... 568/15
See application file for complete search history.

(56) References Cited

U.S. PATENT DOCUMENTS

| | | | |
|---|---|---|---|
| 4,324,744 A | 4/1982 | Lechtken et al. | |
| 5,410,060 A | 4/1995 | Schroeder et al. | |
| 2005/0245768 A1 | 11/2005 | Wolf et al. | |
| 2015/0197651 A1 | 7/2015 | Fukagawa | |
| 2015/0344711 A1 | 12/2015 | Shimono et al. | |

FOREIGN PATENT DOCUMENTS

| | | | |
|---|---|---|---|
| CN | 1659175 A | | 8/2005 |
| CN | 104662107 A | | 5/2015 |
| CN | 104995266 A | | 10/2015 |
| JP | H06-247992 A | | 9/1994 |
| JP | 2005-529167 A | | 9/2005 |
| JP | 2007272106 | * | 10/2007 |
| JP | 2012-513998 A | | 6/2012 |
| JP | 2014-185319 A | | 10/2014 |
| WO | 2014/016567 A | | 1/2014 |

OTHER PUBLICATIONS

Machine translation JP2007272106, year 2007.*
Office Action dated Feb. 2, 2022, issued by the EPO in corresponding EP Patent Application No. 16866226.0.

(Continued)

*Primary Examiner* — Ana Z Muresan
(74) *Attorney, Agent, or Firm* — SOLARIS Intellectual Property Group, PLLC

(57) ABSTRACT

A photopolymerization initiator which is a compound having a structure in which one or more carbonyl groups that link to a carbon atom are further directly bonded to an aromatic ring of an aromatic acyl group that bonds to a phosphorus atom in an acylphosphine oxide structure. A producing method of a photopolymerization initiator produces the photopolymerization initiator. In a polymerizable composition and an ink jet recording method, the photopolymerization initiator is used. Furthermore, an acylphosphine oxide compound has a partial structure represented by Formula 1 or Formula 2.

Formula 1

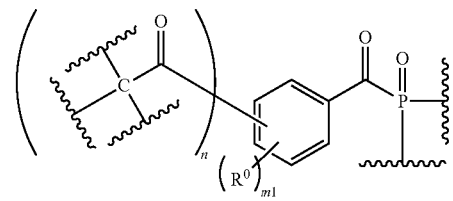

Formula 2

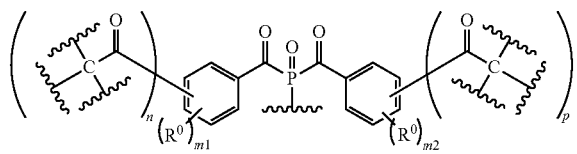

8 Claims, No Drawings

(56) References Cited

OTHER PUBLICATIONS

Nguyen, Lan M. et al., "gem-Diphosphate and gem-Phosphonate-Phosphate Compounds with Specific High Density Lipoprotein Inducing Activity", Journal of Medicinal Chemistry, vol. 30, No. 8, p. 1426-1433, American Chemical Society 1987.
Groffits, D.V. et al., Zhurnal Obshchei Khimii, vol. 63, No. 10, p. 2245-2251, 1993.
International Search Report issued in International Application No. PCT/JP2016/083288 dated Dec. 27, 2016.
Written Opinion of the ISA issued in International Application No. PCT/JP2016/083288 dated Dec. 27, 2016.
Zhong Lian et al., "Pd-catalyzed carbonylative access to aroyl phosphonates from (hetero) aryl bromides", Chemical Communications, vol. 51 No. 37, Apr. 2015, pp. 7831-7834, Scheme 2, Compound 3k.
Extended European Search Report dated Sep. 17, 2018, issued in corresponding EP Patent Application No. 16866226.0.
English language translation of the following: Office action dated Dec. 25, 2019, from the SIPO in a Chinese patent application No. 201680066355.8 corresponding to the instant patent application.
English language translation of the following: Office action dated Sep. 14, 2020 from the SIPO in a Chinese patent application No. 201680066355.8 corresponding to the instant patent application.
Requirement for Restriction/Election issued by USPTO dated Sep. 6, 2019, in related U.S. Appl. No. 15/967,603.
Non-Final Office Action issued by USPTO dated Jan. 30, 2020, in related U.S. Appl. No. 15/967,603.
Final Office Action issued by USPTO dated Jul. 8, 2020, in related U.S. Appl. No. 15/967,603.
Notice of Allowance issued by USPTO dated Oct. 30, 2020, in related U.S. Appl. No. 15/967,603.
Corrected Notice of Allowability issued by USPTO dated Dec. 7, 2020, in related U.S. Appl. No. 15/967,603.

\* cited by examiner

PHOTOPOLYMERIZATION INITIATOR AND PRODUCING METHOD THEREOF, POLYMERIZABLE COMPOSITION, INK JET RECORDING METHOD, AND ACYLPHOSPHINE OXIDE COMPOUND

CROSS-REFERENCE TO RELATED APPLICATIONS

This application is a divisional application of, and claims priority to, U.S. application Ser. No. 15/967,603 filed on May 1, 2018, which is a continuation of, and claims priority to, International Application No. PCT/JP2016/083288 filed on Nov. 9, 2016, which claims priority to Japanese Patent Application No. 2015-227695 filed on Nov. 20, 2015 and Japanese Patent Application No. 2016-169969 filed on Aug. 31, 2016. The entire contents of all these applications are incorporated herein by reference.

BACKGROUND OF THE INVENTION

1. Field of the Invention

The present disclosure relates to a photopolymerization initiator and a producing method thereof, a polymerizable composition, an ink jet recording method, and an acylphosphine oxide compound.

2. Description of the Related Art

As polymerizable compositions, generally, polymerizable compounds and polymerization initiators are used. As polymerization initiators, in particular, photopolymerization initiators that generate polymerization initiating species by irradiation with active radiation such as ultraviolet rays, acylphosphine oxide compounds are known.

Examples of acylphosphine oxide compounds of the related art include the compounds described in JP2014-185319A.

In addition, examples of polymer initiators of the related art include the compounds described in JP2012-513998A.

SUMMARY OF THE INVENTION

An object that an embodiment of the present invention intends to achieve is to provide a photopolymerization initiator being excellent in terms of degradability and sensitivity and a producing method thereof, and a polymerizable composition and an ink jet recording method in which the photopolymerization initiator is used.

In addition, an object that another embodiment of the present invention intends to achieve is to provide a new acylphosphine oxide compound.

The above-described objects were achieved by means described in <1>, <3>, <14> to <16>, or <17> below, which will be described below together with <2>, <4> to <13>, and <18> to <20> which are preferred embodiments.

<1> A photopolymerization initiator which is an acylphosphine oxide compound having a structure in which one or more carbonyl groups that link to a carbon atom are further directly bonded to an aromatic ring of an aromatic acyl group that bonds to a phosphorus atom in an acylphosphine oxide structure.

<2> The photopolymerization initiator according to <1>, in which the carbon atom that links to the carbonyl group is an aliphatic carbon atom.

<3> A photopolymerization initiator which is an acylphosphine oxide compound having a partial structure represented by Formula 1 or Formula 2.

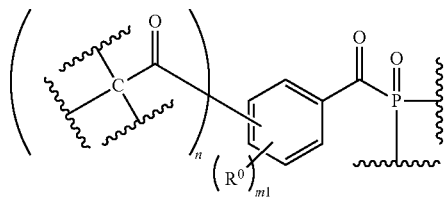

Formula 1

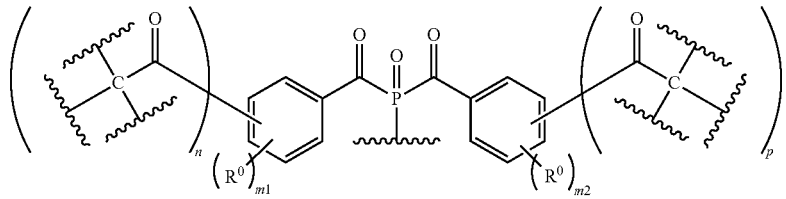

Formula 2

In Formula 1 and Formula 2, $R^O$'s each independently represent an alkyl group, an aryl group, or an alkoxy group, m1 represents an integer of 0 to 4, m2 represents an integer of 0 to 5, n represents an integer of 1 to 3, p represents an integer of 0 to 3, and a wavy line portion represents a bonding position to other structures.

<4> The photopolymerization initiator according to <3> which is an acylphosphine oxide compound having a partial structure represented by Formula 1-00 or Formula 2-00.

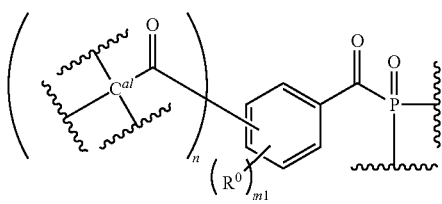

Formula 1-00

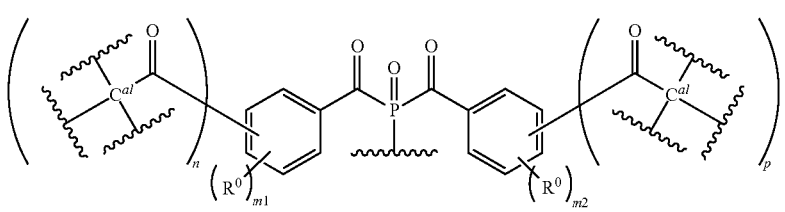

Formula 2-00

In Formula 1-00 and Formula 2-00, $C^{al}$ represents an aliphatic carbon atom, $R^0$'s each independently represent an alkyl group, an aryl group, or an alkoxy group, m1 represents an integer of 0 to 4, m2 represents an integer of 0 to 5, n represents an integer of 1 to 3, p represents an integer of 0 to 3, and a wavy line portion represents a bonding position to other structures.

<5> The photopolymerization initiator according to <3> or <4> which is an acylphosphine oxide compound represented by Formula 1-0 or Formula 2-0.

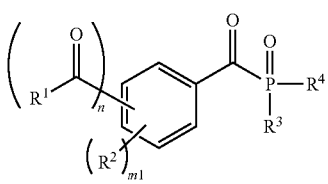

Formula 1-0

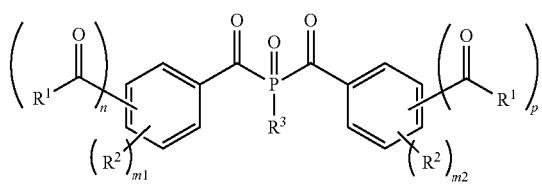

Formula 2-0

In Formula 1-0 and Formula 2-0, $R^1$'s each independently represent a monovalent hydrocarbon group in which a part of a hydrocarbon chain may be substituted with a carbonyl group, an ester bond, an amide bond, an oxygen atom, NR, and/or a sulfur atom, a linking group that links to a main chain of an oligomer or a polymer, or a linking group that links to $R^1$ of another acylphosphine oxide compound represented by Formula 1-0 or Formula 2-0 to form an oligomer or a polymer, R represents a hydrogen atom, an alkyl group, or an aryl group, $R^2$ to $R^4$ each independently represent an alkyl group, an aryl group, or an alkoxy group, m1 represents an integer of 0 to 4, m2 represents an integer of 0 to 5, n represents an integer of 1 to 3, and p represents an integer of 0 to 3.

<6> The photopolymerization initiator according to <5> which is an acylphosphine oxide compound represented by Formula 1-1 or Formula 2-1.

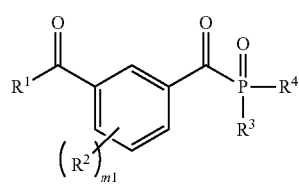

Formula 1-1

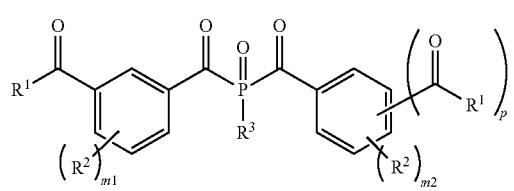

Formula 2-1

In Formula 1-1 and Formula 2-1, $R^1$'s each independently represent a monovalent hydrocarbon group in which a part of a hydrocarbon chain may be substituted with a carbonyl group, an ester bond, an amide bond, an oxygen atom, NR, and/or a sulfur atom, a linking group that links to a main chain of an oligomer or a polymer, or a linking group that links to $R^1$ of another acylphosphine oxide compound represented by Formula 1-1 or Formula 2-1 and forms an oligomer or a polymer, R represents a hydrogen atom, an alkyl group, or an aryl group, $R^2$ to $R^4$ each independently represent an alkyl group, an aryl group, or an alkoxy group, m1 represents an integer of 0 to 4, m2 represents an integer of 0 to 5, and p represents 0 or 1.

<7> The photopolymerization initiator according to <5> or <6> which is an acylphosphine oxide compound represented by Formula 1-2 or Formula 2-2.

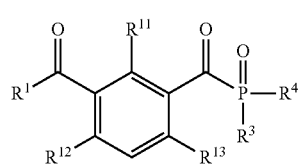

Formula 1-2

-continued

Formula 2-2

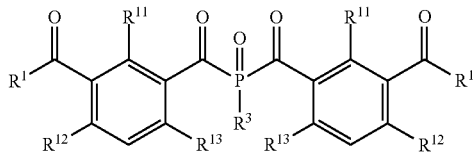

In Formula 1-2 and Formula 2-2, $R^1$'s each independently represent a monovalent hydrocarbon group in which a part of a hydrocarbon chain may be substituted with a carbonyl group, an ester bond, an amide bond, an oxygen atom, NR, and/or a sulfur atom, a linking group that links to a main chain of an oligomer or a polymer, or a linking group that links to $R^1$ of another acylphosphine oxide compound represented by Formula 1-2 or Formula 2-2 and forms an oligomer or a polymer, R represents a hydrogen atom, an alkyl group, or an aryl group, $R^{11}$ to $R^{13}$ each independently represent an alkyl group having 1 to 8 carbon atoms, an aryl group having 6 to 20 carbon atoms, or an alkoxy group having 1 to 4 carbon atoms, and $R^3$ and $R^4$ each independently represent an alkyl group, an aryl group, or an alkoxy group.

<8> The photopolymerization initiator according to any one of <3> to <7> which has a constitutional unit represented by Formula 1A, Formula 2A, or Formula 2B.

Formula 1A

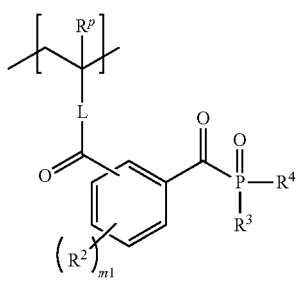

Formula 2A

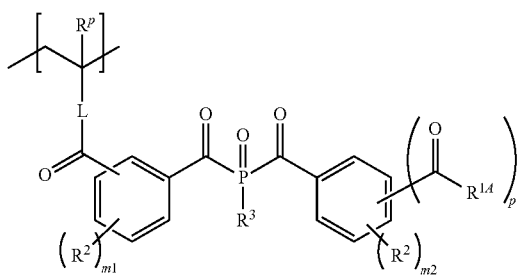

Formula 2B

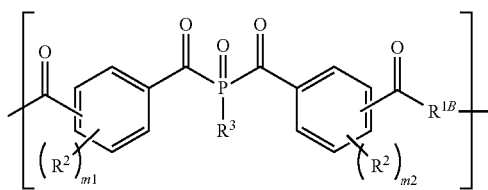

In Formula 1A, Formula 2A, or Formula 2B, L's each independently represent a single bond or a divalent linking group that links to a main chain of an oligomer or a polymer, $R^P$'s each independently represent a hydrogen atom or an alkyl group, $R^{14}$'s each independently represent a monovalent hydrocarbon group in which a part of a hydrocarbon chain may be substituted with a carbonyl group, an ester bond, an amide bond, an oxygen atom, NR, and/or a sulfur atom, $R^{1B}$ represents a divalent hydrocarbon group in which a part of a hydrocarbon chain may be substituted with a carbonyl group, an ester bond, an amide bond, an oxygen atom, NR, and/or a sulfur atom, R represents a hydrogen atom, an alkyl group, or an aryl group, $R^2$ to $R^4$ each independently represent an alkyl group, an aryl group, or an alkoxy group, m1 represents an integer of 0 to 4, m2 represents an integer of 0 to 5, and p represents an integer of 0 to 3.

<9> The photopolymerization initiator according to <8>, in which Formula 1A is Formula 1C, and Formula 2A is Formula 2C.

Formula 1C

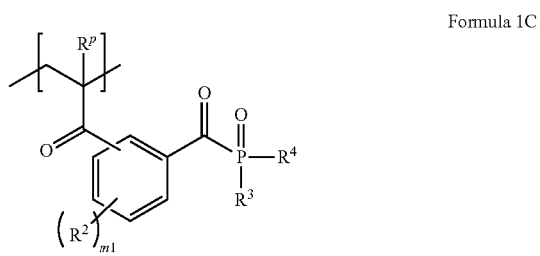

Formula 2C

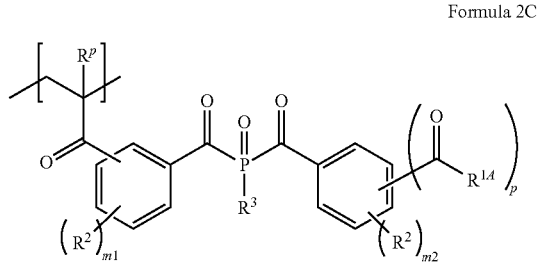

In Formula 1C and Formula 2C, Rn's each independently represent a hydrogen atom or a methyl group, $R^{14}$'s each independently represent a monovalent hydrocarbon group in which a part of a hydrocarbon chain may be substituted with a carbonyl group, an ester bond, an amide bond, an oxygen atom, NR, and/or a sulfur atom, R represents a hydrogen atom, an alkyl group, or an aryl group, $R^2$ to $R^4$ each independently represent an alkyl group, an aryl group, or an alkoxy group, m1 represents an integer of 0 to 4, m2 represents an integer of 0 to 5, and p represents an integer of 0 to 3.

<10> The photopolymerization initiator according to <3> which is an acylphosphine oxide compound represented by Formula 3 or Formula 4.

Formula 3

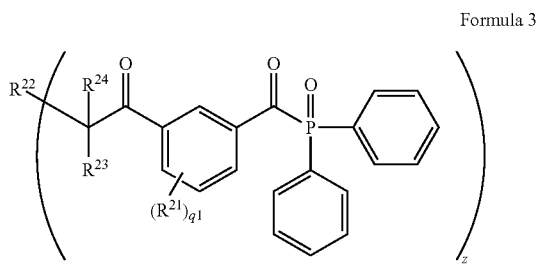

-continued

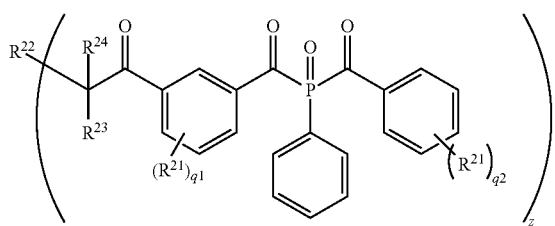
Formula 4

In Formula 3 and Formula 4, $R^{21}$'s each independently represent an alkyl group, an aryl group, or an alkoxy group, $R^{22}$ represents a z-valent organic group, $R^{23}$ and $R^{24}$ each independently represent a hydrogen atom or a monovalent hydrocarbon group in which a part of a hydrocarbon chain may be substituted with a carbonyl group, an ester bond, an amide bond, an oxygen atom, NR, and/or a sulfur atom, R represents a hydrogen atom, an alkyl group, or an aryl group, q1 represents an integer of 0 to 4, q2 represents an integer of 0 to 5, and z represents an integer of 2 to 10.

<11> The photopolymerization initiator according to any one of <1> to <10> which has two or more acylphosphine oxide structures in a molecule.

<12> The photopolymerization initiator according to <11>, in which a linking group that links two or more of the acylphosphine oxide structures together does not have any of an amino bond, a thioether bond, and a halogen atom.

<13> The photopolymerization initiator according to any one of <1> to <12>, in which a molecular weight or a weigh-average molecular weight is 300 or more and 10,000 or less.

<14> A polymerizable composition comprising: the photopolymerization initiator according to any one of <1> to <13>; and a polymerizable compound.

<15> An ink jet recording method comprising: a step of jetting the polymerizable composition according to <14> onto a recording medium using an ink jet method; and a step of curing the polymerizable composition by irradiating the jetted polymerizable composition with active radiation.

<16> A producing method of the photopolymerization initiator according to any one of <1> to <13>, the method comprising: a step of reacting an acylphosphine oxide compound having one or more aromatic acyl groups that bond to a phosphorus atom with an acid halide or an acid anhydride in the presence of a Lewis acid.

<17> An acylphosphine oxide compound having a partial structure represented by Formula 1 or Formula 2.

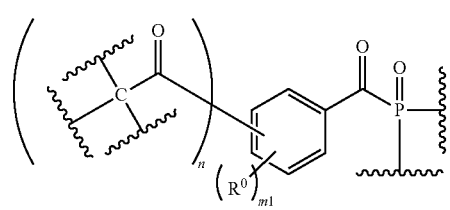
Formula 1

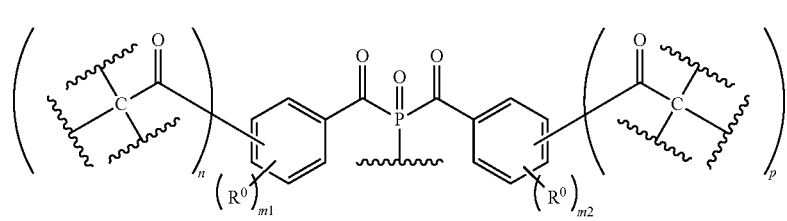
Formula 2

In Formula 1 and Formula 2, $R^0$'s each independently represent an alkyl group, an aryl group, or an alkoxy group, m1 represents an integer of 0 to 4, m2 represents an integer of 0 to 5, n represents an integer of 1 to 3, p represents an integer of 0 to 3, and a wavy line portion represents a bonding position to other structures.

<18> The acylphosphine oxide compound according to <17> which has a partial structure represented by Formula 1-00 or Formula 2-00.

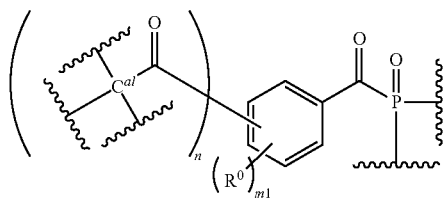

Formula 1-00

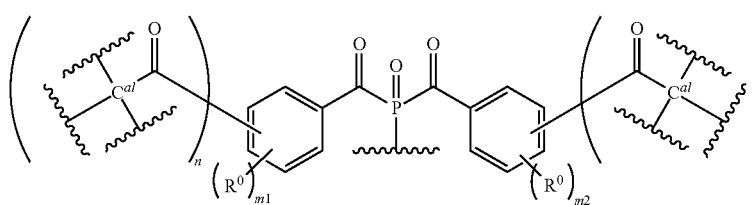

Formula 2-00

In Formula 1-00 and Formula 2-00, $C^{al}$ represents an aliphatic carbon atom, $R^0$'s each independently represent an alkyl group, an aryl group, or an alkoxy group, m1 represents an integer of 0 to 4, m2 represents an integer of 0 to 5, n represents an integer of 1 to 3, p represents an integer of 0 to 3, and a wavy line portion represents a bonding position to other structures.

<19> The acylphosphine oxide compound according to <17> or <18> which is represented by Formula 1-0 or Formula 2-0.

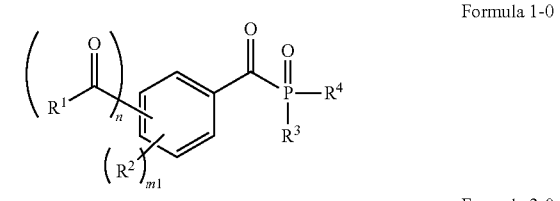

Formula 1-0

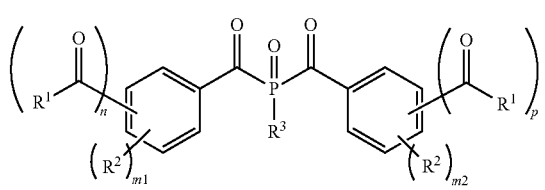

Formula 2-0

In Formula 1-0 and Formula 2-0, $R^1$'s each independently represent a monovalent hydrocarbon group in which a part of a hydrocarbon chain may be substituted with a carbonyl group, an ester bond, an amide bond, an oxygen atom, NR, and/or a sulfur atom, a linking group that links to a main chain of an oligomer or a polymer, or a linking group that links to $R^1$ of another acylphosphine oxide compound represented by Formula 1-0 or Formula 2-0 to form an oligomer or a polymer, R represents a hydrogen atom, an alkyl group, or an aryl group, $R^2$ to $R^4$ each independently represent an alkyl group, an aryl group, or an alkoxy group, m1 represents an integer of 0 to 4, m2 represents an integer of 0 to 5, n represents an integer of 1 to 3, and p represents an integer of 0 to 3.

<20> The acylphosphine oxide compound according to <17> or <18> which is represented by Formula 3 or Formula 4.

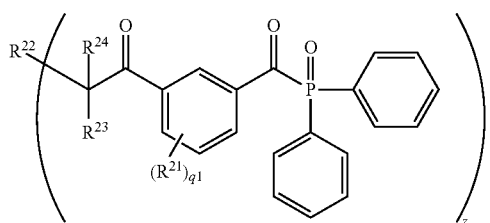

Formula 3

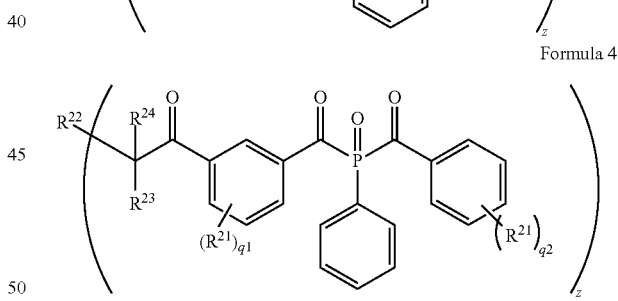

Formula 4

In Formula 3 and Formula 4, $R^{21}$'s each independently represent an alkyl group, an aryl group, or an alkoxy group, $R^{22}$ represents a z-valent organic group, $R^{23}$ and $R^{24}$ each independently represent a hydrogen atom or a monovalent hydrocarbon group in which a part of a hydrocarbon chain may be substituted with a carbonyl group, an ester bond, an amide bond, an oxygen atom, NR, and/or a sulfur atom, R represents a hydrogen atom, an alkyl group, or an aryl group, q1 represents an integer of 0 to 4, q2 represents an integer of 0 to 5, and z represents an integer of 2 to 10.

According to the embodiment of the present invention, it is possible to provide a photopolymerization initiator being excellent in terms of degradability and sensitivity and a producing method thereof, and a polymerizable composition and an ink jet recording method in which the photopolymerization initiator is used.

In addition, according to another embodiment of the present invention, it is possible to provide a new acylphosphine oxide compound.

DESCRIPTION OF THE PREFERRED EMBODIMENTS

Hereinafter, the present disclosure will be described in detail.

Meanwhile, in the present specification, an expression of "xx to yy" represents a numerical range including xx and yy.

"(Meth)acrylate" and the like are the same as "acrylate and/or methacrylate" and the like, which is true in the following description.

Unless particularly otherwise described, hydrocarbon groups such as an alkyl group, an aryl group, an alkylene group, and an arylene group in the present disclosure may have a branch or have a ring structure.

In addition, in the present disclosure, "% by mass" is the same as "% by weight", and "parts by mass" is the same as "weight by mass".

In addition, unless particularly otherwise described, the weight-average molecular weight (Mw) in the present disclosure refers to a molecular weight that is detected using a gel permeation chromatography (GPC) analysis device in which columns of TSKgel GMHxL, TSKgel G4000HxL, and TSKgel G2000HxL (all are trade names manufactured by Tosoh Corporation), a solvent of tetrahydrofuran (THF), and a differential refractometer and converted using polystyrene as a standard substance.

Hereinafter, the present disclosure will be described in detail.

(Photopolymerization Initiator)

A photopolymerization initiator of the present disclosure is an acylphosphine oxide compound having a structure in which one or more carbonyl groups that link to a carbon atom are further directly bonded to an aromatic ring of an aromatic acyl group that bonds to a phosphorus atom in an acylphosphine oxide structure (hereinafter, also referred to as "specific acylphosphine oxide compound").

The acylphosphine oxide compound is degraded by active radiation and generates a polymerization initiating species such as a radical.

As a result of detailed studies, the present inventors found that, in a case in which a structure in which one or more carbonyl groups that link to a carbon atom are further directly bonded to an aromatic ring of an aromatic acyl group that bonds to a phosphorus atom in an acylphosphine oxide structure is provided, a photopolymerization initiator being excellent in terms of degradability and sensitivity can be obtained. The detailed mechanism is not clear, but is assumed that, probably, a steric and electronic influence attributed to the substitution of an acyl group decreases the bonding energy in an acylphosphine structure and improves degradation rate or sensitivity.

In addition, the acylphosphine oxide compound having a structure in which one or more carbonyl groups that link to a carbon atom are further directly bonded to an aromatic ring of an aromatic acyl group that bonds to a phosphorus atom in an acylphosphine oxide structure is a new compound.

Meanwhile, the carbonyl group to which the carbon atom links refers to a group in which an atom that links to a carbon atom in the carbonyl group is a carbon atom, that is, an acyl group.

Furthermore, in a case in which the carbon atom that links to the carbonyl group is an aliphatic carbon atom, a conjugated chain does not become long, the rigidity of a molecule is suppressed, and the ink jet jettability is excellent.

Hereinafter, the present disclosure will be described in detail.

The specific acylphosphine oxide compound is preferably an acylphosphine oxide compound having the partial structure represented by Formula 1 or Formula 2 or the acylphosphine oxide compound represented by Formula 3 or Formula 4. Meanwhile, it is needless to say that some of the acylphosphine oxide compounds represented by Formula 3 or Formula 4 are also compounds corresponding to the acylphosphine oxide compound having the partial structure represented by Formula 1 or Formula 2.

In addition, the specific acylphosphine oxide compound is preferably a compound having a structure in which one carbonyl group (acyl group) that links to a carbon atom is further directly bonded to all of aromatic rings of one or more of the aromatic acyl groups.

In the specific acylphosphine oxide compound, the carbon atom that links to the carbonyl group is preferably an aliphatic carbon atom from the viewpoint of the ink jet jettability.

In addition, the specific acylphosphine oxide compound is preferably an acylphosphine oxide compound having the partial structure represented by Formula 1 or Formula 2.

Furthermore, the acylphosphine oxide compound having the partial structure represented by Formula 1 or Formula 2 may be a compound in which the number of the partial structures represented by Formula 1 or Formula 2 is one or more.

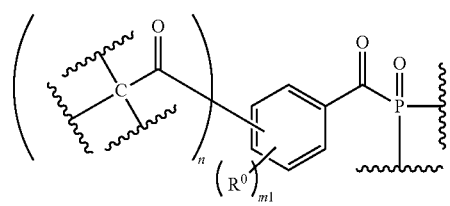

Formula 1

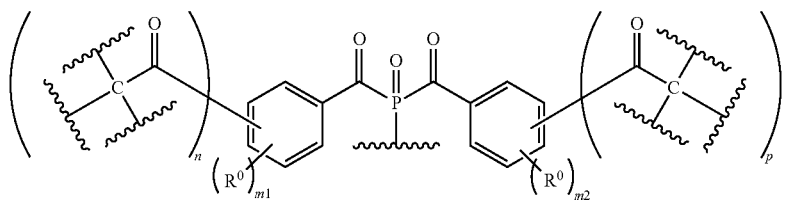

Formula 2

In Formula 1 and Formula 2, $R^0$'s each independently represent an alkyl group, an aryl group, or an alkoxy group, m1 represents an integer of 0 to 4, m2 represents an integer of 0 to 5, n represents an integer of 1 to 3, p represents an integer of 0 to 3, and a wavy line portion represents a bonding position to other structures.

$R^0$'s in Formula 1 and Formula 2 each are, independently, preferably an alkyl group having 1 to 8 carbon atoms, an aryl group having 6 to 20 carbon atoms, or an alkoxy group having 1 to 4 carbon atoms, more preferably an alkyl group having 1 to 8 carbon atoms or an alkoxy group having 1 to 4 carbon atoms, still more preferably an alkyl group having 1 to 8 carbon atoms, particularly preferably an alkyl group having 1 to 4 carbon atoms, and most preferably a methyl group. In such an aspect, degradability and sensitivity are superior, additionally, the stability of the compound is excellent, and furthermore, convenience or the yield during the synthesis is excellent.

m1 in Formula 1 and Formula 2 is preferably an integer of 0 to 3, more preferably 1 to 3, and particularly preferably 3. In such an aspect, degradability and sensitivity are superior, additionally, the stability of the compound is excellent, and furthermore, convenience or the yield during the synthesis is excellent.

m2 in Formula 2 is preferably an integer of 0 to 3, more preferably 1 to 3, and particularly preferably 3. In such an aspect, degradability and sensitivity are superior, additionally, the stability of the compound is excellent, and furthermore, convenience or the yield during the synthesis is excellent.

n in Formula 1 and Formula 2 is preferably 1 or 2 and more preferably 1. In such an aspect, degradability and sensitivity are superior, and the stability of the compound is excellent.

In addition, the bonding position on a benzene ring of —CO— as the wavy line portion in Formula 1 and Formula 2 is not particularly limited, but is preferably a meta position with respect to a bonding position of a carbonyl group bonded to a phosphorus atom. In such an aspect, degradability and sensitivity are superior, additionally, the stability of the compound is excellent, and furthermore, convenience or the yield during the synthesis is excellent.

p in Formula 2 is preferably an integer of 0 to 2, more preferably 0 or 1, and particularly preferably 1. In such an aspect, degradability and sensitivity are superior, and the stability of the compound is excellent.

In addition, in Formula 1 and Formula 2, the carbon atom that bonds to other structures at the wavy line portion may have an arbitrary sp hybrid orbit. That is, the carbon atom that bonds to other structures at the wavy line portion may be a carbon atom (sp2 hybrid orbit) constituting an aromatic hydrocarbon group, may be a carbon atom (sp hybrid orbit) constituting an alkynyl group such an ethynyl group, may be a carbon atom (sp2 hybrid orbit) constituting an alkenyl group such as a vinyl group, or may be a carbon atom (sp3 hybrid orbit) constituting an alkyl group, but is preferably a carbon atom (sp2 hybrid orbit) constituting an alkenyl group such as a vinyl group or a carbon atom (sp3 hybrid orbit) constituting an alkyl group, and more preferably a carbon atom (sp3 hybrid orbit) constituting an alkyl group. In such an aspect, degradability and the ink jet jettability in the case of being used in a polymerizable composition are excellent, and furthermore, convenience or the yield during the synthesis is excellent.

The specific acylphosphine oxide compound is more preferably an acylphosphine oxide compound having a partial structure represented by Formula 1-00 or Formula 2-00.

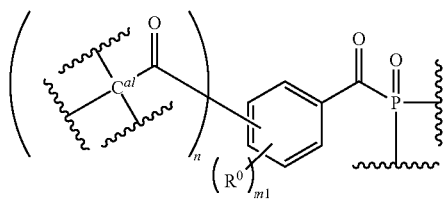

Formula 1-00

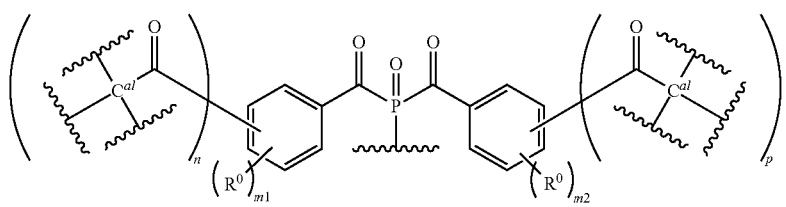

Formula 2-00

In Formula 1-00 and Formula 2-00, $C^{al}$ represents an aliphatic carbon atom, $R^0$'s each independently represent an alkyl group, an aryl group, or an alkoxy group, m1 represents an integer of 0 to 4, m2 represents an integer of 0 to 5, n represents an integer of 1 to 3, p represents an integer of 0 to 3, and a wavy line portion represents a bonding position to other structures.

In addition, in Formula 1-00 and Formula 2-00, $C^{al}$ that bonds to other structures at the wavy line portion may have an arbitrary sp hybrid orbit. That is, $C^{al}$ that bonds to other structures at the wavy line portion may be a carbon atom (sp hybrid orbit) constituting an alkynyl group such an ethynyl group, may be a carbon atom (sp2 hybrid orbit) constituting an alkenyl group such as a vinyl group, or may be a carbon atom (sp3 hybrid orbit) constituting an alkyl group, but is preferably a carbon atom (sp2 hybrid orbit) constituting an alkenyl group such as a vinyl group or a carbon atom (sp3 hybrid orbit) constituting an alkyl group, and more preferably a carbon atom (sp3 hybrid orbit) constituting an alkyl group. In such an aspect, degradability and the ink jet jettability in the case of being used in a polymerizable composition are excellent, and furthermore, convenience or the yield during the synthesis is excellent.

$R^0$, m1, m2, n, and p in Formula 1-00 and Formula 2-00 are the same as $R^0$, m1, m2, n, and p in Formula 1 and Formula 2, and preferred aspects thereof are also the same.

In addition, the photopolymerization initiator of the present disclosure is more preferably an acylphosphine oxide compound represented by any of Formula 1-0, Formula 2-0, Formula 3, and Formula 4.

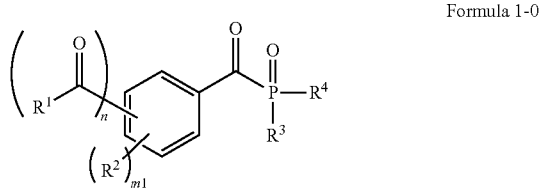

Formula 1-0

Formula 2-0

In Formula 1-0 and Formula 2-0, $R^1$'s each independently represent a monovalent hydrocarbon group in which a part of a hydrocarbon chain may be substituted with a carbonyl group, an ester bond, an amide bond, an oxygen atom, NR, and/or a sulfur atom, a linking group that links to a main chain of an oligomer or a polymer, or a linking group that links to $R^1$ of another acylphosphine oxide compound represented by Formula 1-0 or Formula 2-0 to form an oligomer or a polymer, R represents a hydrogen atom, an alkyl group, or an aryl group, $R^2$ to $R^4$ each independently represent an alkyl group, an aryl group, or an alkoxy group, m1 represents an integer of 0 to 4, m2 represents an integer of 0 to 5, n represents an integer of 1 to 3, and p represents an integer of 0 to 3.

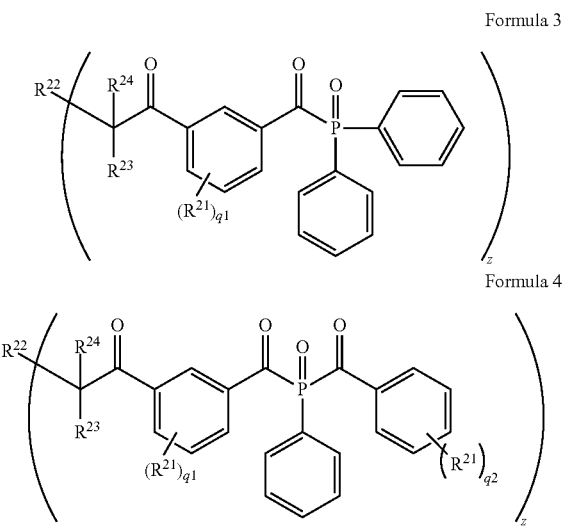

Formula 3

Formula 4

In Formula 3 and Formula 4, $R^{21}$'s each independently represent an alkyl group, an aryl group, or an alkoxy group, $R^{22}$ represents a z-valent organic group, $R^{23}$ and $R^{24}$ each independently represent a hydrogen atom or a monovalent hydrocarbon group in which a part of a hydrocarbon chain may be substituted with a carbonyl group, an ester bond, an amide bond, an oxygen atom, NR, and/or a sulfur atom, R represents a hydrogen atom, an alkyl group, or an aryl group, q1 represents an integer of 0 to 4, q2 represents an integer of 0 to 5, and z represents an integer of 2 to 10.

First, the acylphosphine oxide compound represented by Formula 1-0 or Formula 2-0 which is one of the preferred aspects of the photopolymerization initiator of the present disclosure will be described.

$R^1$ in Formula 1-0 and Formula 2-0 will be described below in detail.

$R^2$'s in Formula 1-0 and Formula 2-0 each are, independently, preferably an alkyl group having 1 to 8 carbon atoms, an aryl group having 6 to 20 carbon atoms, or an alkoxy group having 1 to 4 carbon atoms, more preferably an alkyl group having 1 to 8 carbon atoms or an alkoxy group having 1 to 4 carbon atoms, still more preferably an alkyl group having 1 to 8 carbon atoms, particularly preferably an alkyl group having 1 to 4 carbon atoms, and most preferably a methyl group. In such an aspect, degradability and sensitivity are superior, additionally, the stability of the compound is excellent, and furthermore, convenience or the yield during the synthesis is excellent.

$R^3$'s and $R^4$'s in Formula 1-0 and Formula 2-0 each are, independently, preferably an alkyl group having 1 to 8 carbon atoms, an aryl group having 6 to 20 carbon atoms, or an alkoxy group having 1 to 4 carbon atoms, more preferably an aryl group having 6 to 20 carbon atoms or an alkoxy group having 1 to 4 carbon atoms, still more preferably an aryl group having 6 to 20 carbon atoms, particularly preferably an aryl group having 6 to 12 carbon atoms, and most preferably a phenyl group. In such an aspect, degradability and sensitivity are superior, and furthermore, the raw materials can be easily procured.

m1, m2, n, and p in Formula 1-0 and Formula 2-0 are the same as m1, m2, n, and p in Formula 1 and Formula 2, and preferred aspects thereof are also the same.

In addition, the bonding position on a benzene ring of $R^1$—CO— in Formula 1-0 and Formula 2-0 is not particularly limited, but is preferably a meta position with respect to a bonding position of a carbonyl group bonded to a phosphorus atom. In such an aspect, degradability and sensitivity are superior, and furthermore, convenience or the yield during the synthesis is excellent.

$R^1$'s in Formula 1-0 and Formula 2-0 each independently represent a monovalent hydrocarbon group in which a part of a hydrocarbon chain may be substituted with a carbonyl group, an ester bond, an amide bond, an oxygen atom, NR, and/or a sulfur atom, which is a low-molecular-weight-type aspect, a linking group that links to a main chain of an oligomer or a polymer, which is an oligomer or polymer-type aspect, or a linking group that links to $R^1$ of another acylphosphine oxide compound represented by Formula 1-0 or Formula 2-0 to form an oligomer or a polymer.

In addition, R in NR is preferably an alkyl group or an aryl group, more preferably an alkyl group having 1 to 8 carbon atoms or an aryl group having 6 to 20 carbon atoms, and still more preferably an alkyl group having 1 to 8 carbon atoms.

Furthermore, $R^1$ in Formula 1-0 and Formula 2-0 is preferably a group that bonds the carbonyl group described in Formula 1-0 or Formula 2-0 and a carbon atom. In such an aspect, degradability and sensitivity are superior, and furthermore, convenience or the yield during the synthesis is excellent.

The monovalent hydrocarbon group in the monovalent hydrocarbon group in which a part of a hydrocarbon chain may be substituted with a carbonyl group, an ester bond, an amide bond, an oxygen atom, NR, and/or a sulfur atom may be an aliphatic hydrocarbon group, an aromatic hydrocarbon group, or a combined group of one or more aliphatic hydrocarbon groups and one or more aromatic hydrocarbon groups. In addition, the aliphatic hydrocarbon group may have an unsaturated bond.

In addition, the monovalent hydrocarbon group may further have a substituent.

Examples of the substituent include a halogen atom, an alkoxy group, an acyl group, an alkoxycarbonyl group, an amide group, and an acyloxy group.

The monovalent hydrocarbon group in which a part of a hydrocarbon chain may be substituted with a carbonyl group, an ester bond, an amide bond, an oxygen atom, NR, and/or a sulfur atom is preferably a monovalent hydrocarbon group in which a part of a hydrocarbon chain may be substituted with a carbonyl group, an ester bond, an oxygen atom, and/or a sulfur atom, more preferably a monovalent saturated or unsaturated hydrocarbon group, still more preferably an alkyl group or an alkenyl group, and particularly preferably an alkyl group, an ethynyl group or a 2-propenyl group which has a halogen atom. In such an aspect, degradability and sensitivity are superior, and the monovalent hydrocarbon group can be preferably used as a raw material of the photopolymerization initiator of the present disclosure which is an oligomer or polymer-type acylphosphine oxide compound or the acylphosphine oxide compound represented by Formula 3 or Formula 4.

In addition, the substitution with a carbonyl group, an ester bond, an amide bond, an oxygen atom, NR, and/or a sulfur atom in $R^1$ may be carried out on a hydrocarbon group at the terminal of the hydrocarbon group.

In Formula 1-0 and Formula 2-0, in a case in which $R^1$ is a linking group that link to a main chain of an oligomer or a polymer or a linking group that links to $R^1$ of another acylphosphine oxide compound represented by Formula 1-0 or Formula 2-0 to form an oligomer or a polymer, a polymer structure in the photopolymerization initiator of the present disclosure is not particularly limited, and examples thereof include polymer structures such as a vinyl resin, a polyketone resin, a (meth)acrylic resin, a polyurethane resin, a polyester resin, a polycarbonate resin, an epoxy resin, a polyamide resin, a polyolefin resin, a styrene-(meth)acrylic resin, or a styrene resin which has an acylphosphine oxide structure. Among these, a vinyl resin having a constitutional unit represented by Formula 1A or Formula 2A described below, a (meth)acrylic resin having the constitutional unit represented by Formula 1A or Formula 2A described below, or a polyketone resin having a constitutional unit represented by Formula 2B described below is preferred. In addition, the vinyl resin is preferably a resin obtained by polymerizing an α,β-unsaturated carbonyl compound.

Meanwhile, in the present disclosure, the "oligomer" refers to an oligomer having a molecular weight or a weight-average molecular weight of 500 or more and less than 5,000, and the "polymer" refers to a polymer having a weight-average molecular weight of 5,000 or more.

In addition, in the present disclosure, a compound having a molecular weight distribution refers to a compound having a weight-average molecular weight that is measured using the above-described method, and a compound having no molecular weight distribution refers to a compound having a molecular weight that is obtained from an element composition (compositional formula) thereof.

As $R^1$ in Formula 1-0 and Formula 2-0, the linking group that links to $R^1$ of another acylphosphine oxide compound represented by Formula 1-0 or Formula 2-0 to form an oligomer or a polymer is preferably a hydrocarbon group having 1 to 20 carbon atoms or a di- to decavalent linking group to which two or more structures selected from the group consisting of a hydrocarbon group having 1 to 20 carbon atoms, a carbonyl group, an ester bond, an amide bond, an oxygen atom, a nitrogen atom, and a sulfur atom are bonded, more preferably a di- to decavalent linking group to which two or more structures selected from the group consisting of a hydrocarbon group having 1 to 20 carbon atoms, a carbonyl group, an ester bond, an amide bond, an oxygen atom, a nitrogen atom, and a sulfur atom are bonded, and still more preferably a di- to decavalent linking group to which two or more structures selected from the group consisting of a hydrocarbon group having 1 to 20 carbon atoms, an ester bond, an oxygen atom, a nitrogen atom, and a sulfur atom are bonded.

The hydrocarbon group may be an aliphatic hydrocarbon group, an aromatic hydrocarbon group, or a combined group of one or more aliphatic hydrocarbon groups and one or more aromatic hydrocarbon groups. In addition, the aliphatic hydrocarbon group may have an unsaturated bond.

In addition, the hydrocarbon group may further have a substituent. Examples of the substituent include a halogen atom, an alkoxy group, an acyl group, an alkoxycarbonyl group, an amide group, and an acyloxy group.

In Formula 1-0 and Formula 2-0, in a case in which $R^1$ is a linking group that links to a main chain of an oligomer or a polymer, the photopolymerization initiator of the present disclosure is preferably a compound having the constitutional unit represented by Formula 1A or Formula 2A, and, in a case in which $R^1$ is a linking group that links to $R^1$ of another acylphosphine oxide compound represented by Formula 1-0 or Formula 2-0 to form an oligomer or a polymer, the photopolymerization initiator of the present disclosure is preferably a compound having the constitutional unit represented by Formula 2B.

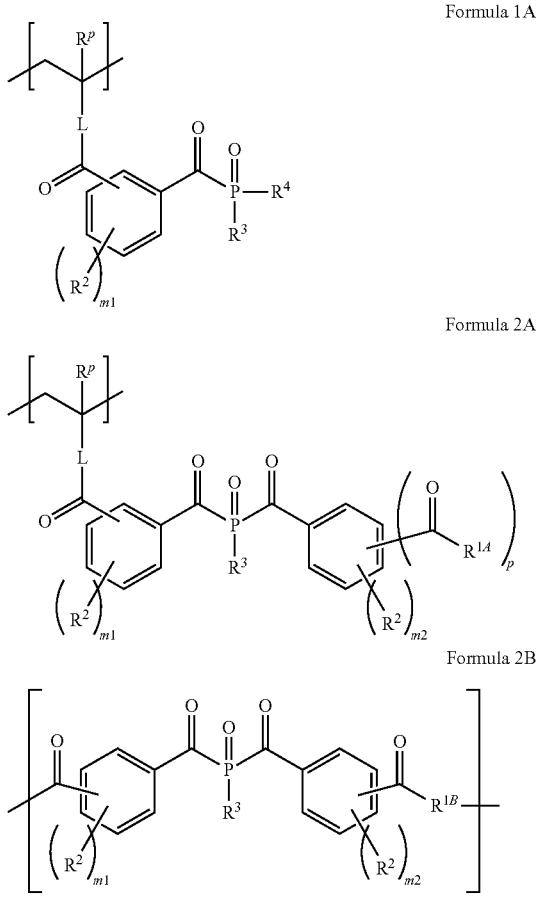

Formula 1A

Formula 2A

Formula 2B

In Formula 1A, Formula 2A, and Formula 2B, L's each independently represent a single bond or a divalent linking group that links to a main chain of an oligomer or a polymer, $R^P$'s each independently represent a hydrogen atom or an alkyl group, $R^{1A}$'s each independently represent a monovalent hydrocarbon group in which a part of a hydrocarbon chain may be substituted with a carbonyl group, an ester bond, an amide bond, an oxygen atom, NR, and/or a sulfur atom, $R^{1B}$ represents a divalent hydrocarbon group in which a part of a hydrocarbon chain may be substituted with a carbonyl group, an ester bond, an amide bond, an oxygen atom, NR, and/or a sulfur atom, R represents a hydrogen atom, an alkyl group, or an aryl group, $R^2$ to $R^4$ each independently represent an alkyl group, an aryl group, or an alkoxy group, m1 represents an integer of 0 to 4, m2 represents an integer of 0 to 5, and p represents an integer of 0 to 3.

$R^2$ to $R^4$, m1, m2, and R in Formula 1A, Formula 2A, and Formula 2B are the same as $R^2$ to $R^4$, m1, m2, and R in Formula 1-0 and Formula 2-0, and preferred aspects thereof are also the same.

L's in Formula 1A and Formula 2A each are, independently, preferably a single bond or a divalent hydrocarbon group in which a part of a hydrocarbon chain may be substituted with a carbonyl group, an ester bond, an amide bond, an oxygen atom, NR, and/or a sulfur atom, more preferably a single bond or a divalent hydrocarbon group in which a part of a hydrocarbon chain may be substituted with a carbonyl group, an ester bond, and/or an oxygen atom, and particularly preferably a single bond.

$R^P$ in Formula 1A and Formula 2A is preferably a hydrogen atom or an alkyl group having 1 to 4 carbon atoms and more preferably a hydrogen atom or a methyl group from the viewpoint of a polymerization property during the synthesis of an oligomer or a polymer.

p in Formula 2A is preferably 0 or 1 and more preferably 0.

The monovalent hydrocarbon group in which a part of a hydrocarbon chain may be substituted with a carbonyl group, an ester bond, an amide bond, an oxygen atom, NR, and/or a sulfur atom as $R^{1A}$ in Formula 2A is the same as the monovalent hydrocarbon group in which a part of a hydrocarbon chain may be substituted with a carbonyl group, an ester bond, an amide bond, an oxygen atom, NR, and/or a sulfur atom as $R^1$ in Formula 1-0 and Formula 2-0, and a preferred aspect thereof is also the same.

$R^{1B}$ in Formula 2B is preferably an alkylene group, an arylene group, or a combined group of two or more of the above-described groups and more preferably an alkylene group. In addition, the number of carbon atoms in $R^{1B}$ is preferably 1 to 20, more preferably 2 to 10, and particularly preferably 2 to 8.

In addition, the alkylene group and the arylene group as $R^{1B}$ may further have a substituent. Examples of the substituent include a halogen atom, an alkoxy group, an acyl group, an alkoxycarbonyl group, an amide group, and an acyloxy group.

The compound having the constitutional unit represented by Formula 1A, Formula 2A, or Formula 2B may have an additional constitutional unit other than the constitutional unit represented by Formula 1A, Formula 2A, or Formula 2B.

The additional constitutional unit is not particularly limited, and the compound may have a constitutional unit having an arbitrary structure as desired as long as there is no problem with the photopolymerization initiation capability.

The additional constitutional unit is not particularly limited, a compound having an ethylenically unsaturated bond can be used, examples of the compound having an ethylenically unsaturated bond include unsaturated carboxylic acids (for example, acrylic acid, methacrylic acid, itaconic acid, crotonic acid, isocrotonic acid, maleic acid, and the like), esters thereof, and amides thereof, and, preferably, an ester of an unsaturated carboxylic acid and an aliphatic polyhydric alcohol compound and amides of an unsaturated carboxylic acid and an aliphatic polyhydric amine compound are used. In addition, addition reactants between unsaturated carboxylic acid esters having a nucleophilic substituent such as a hydroxyl group, an amino group, or a mercapto group or amides and monofunctional or polyfunctional isocyanates, or epoxies, dehydration condensation reactants with a monofunctional or polyfunctional carboxylic acid, and the like are also preferably used. In addition, addition reactants between unsaturated carboxylic acid esters having an electrophilic substituent such as an isocyanate group or an epoxy group or amides and monofunctional or polyfunctional alcohols, amines, or thiols and, furthermore, substitution reactants between unsaturated carboxylic acid esters having a halogen atom or a leaving substituent such as a tosyloxy group, or amides and monofunctional or polyfunctional alcohols, amines, and thiols are also preferred. In addition, as additional examples, it is also possible to use a group of compounds in which the unsaturated carboxylic acid is substituted with an unsaturated phosphonic acid, styrene, or the like.

In addition, it is also possible to use polymerizable compounds described below, and, among them, monofunctional (meth)acrylates described below are preferred.

In addition, the photopolymerization initiator of the present disclosure is preferably a compound having 50% by mass or more of the constitutional unit represented by Formula 1A, Formula 2A, or Formula 2B, more preferably a compound having 90% by mass or more of the constitutional unit represented by Formula 1A, Formula 2A, or Formula 2B, still more preferably a compound having 95% by mass or more of the constitutional unit represented by Formula 1A, Formula 2A, or Formula 2B, and particularly preferably a compound made of the constitutional unit represented by Formula 1A, Formula 2A, or Formula 2B.

In the case of the compound made of the constitutional unit represented by Formula 1A, Formula 2A, or Formula 2B, a terminal group of an oligomer or a polymer is not particularly limited and is dependent on a condition such as a thermopolymerization initiator being used or quenching, and examples thereof include a hydrogen atom, an alkyl group, an alkoxy group, an alkylthio group, and/or a hydroxy group.

The constitutional unit represented by Formula 1A is preferably a constitutional unit represented by Formula 1C, and the constitutional unit represented by Formula 2A is preferably a constitutional unit represented by Formula 2C.

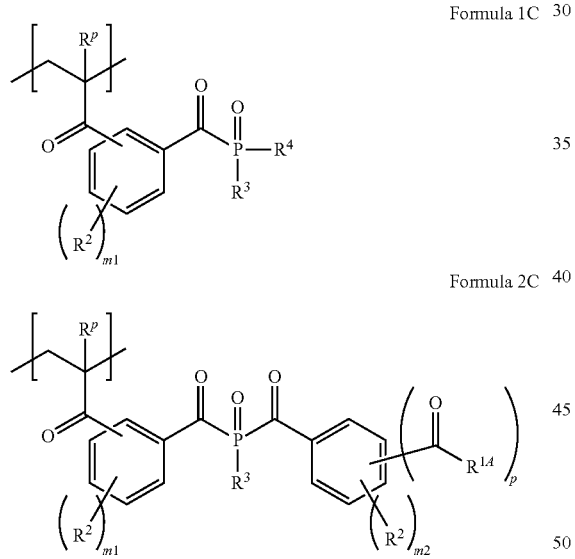

Formula 1C

Formula 2C

In Formula 1C and Formula 2C, Rn's each independently represent a hydrogen atom or an alkyl group, $R^{1A}$'s each independently represent a monovalent hydrocarbon group in which a part of a hydrocarbon chain may be substituted with a carbonyl group, an ester bond, an amide bond, an oxygen atom, NR, and/or a sulfur atom, R represents a hydrogen atom, an alkyl group, or an aryl group, $R^2$ to $R^4$ each independently represent an alkyl group, an aryl group, or an alkoxy group, m1 represents an integer of 0 to 4, m2 represents an integer of 0 to 5, and p represents an integer of 0 to 3.

$R^2$ to $R^4$, m1, m2, and R in Formula 1C and Formula 2C are the same as $R^2$ to $R^4$, m1, m2, and R in Formula 1-0 and Formula 2-0, and preferred aspects thereof are also the same.

In addition, $R^p$, $R^{1A}$, and p in Formula 1C and Formula 2C are the same as $R^p$, $R^{1A}$, and p in Formula 1A and Formula 2A, and preferred aspects thereof are also the same.

In the present disclosure, the molecular weight (or weight-average molecular weight) of the specific acylphosphine oxide compound is preferably 300 or more, more preferably 500 to 100,000, still more preferably 500 to 10,000, still more preferably 700 to 3,000, and most preferably 850 to 2,500. In the above-described range, degradability and sensitivity are superior, the ink jet jettability in the case of being used in a polymerizable composition and compatibility with polymerizable compounds are excellent, and furthermore, the amount of elution (migration) is suppressed.

In addition, the number of acylphosphine oxide structures in the molecule of the specific acylphosphine oxide compound is preferably two or more, more preferably three or more, still more preferably 3 to 300, and particularly preferably 3 to 50. In the above-described range, degradability and sensitivity are superior.

Meanwhile, the "acylphosphine oxide structure" in the present disclosure refers to a structure in which one oxo group and at least one acyl group are directly bonded to a pentavalent phosphorus atom and is preferably the acylphosphine oxide structure in Formula 1 or Formula 2.

In addition, in the specific acylphosphine oxide compound, a linking group that links two or more acylphosphine oxide structures preferably does not have any of an amino bond (a divalent or trivalent nitrogen atom), a thioether bond, and a halogen atom, and the specific acylphosphine oxide compound more preferably does not have any of an amino bond, a thioether bond, and a halogen atom. In such an aspect, the cutting of chemical bonds in the above-described portions during exposure is suppressed, and the amount of the elution (migration) of a specific acylphosphine oxide compound-derived compound from a polymer polymerized using the specific acylphosphine oxide compound is suppressed.

Furthermore, L in Formula 1A or Formula 1B, $R^{1B}$ in Formula 2B, or $R^{22}$ in Formula 3 or Formula 4 described below preferably do not have any of an amino bond, a thioether bond, and a halogen atom from the viewpoint of migration.

Meanwhile, it is needless to say that the scope of the "amino bond" in the present disclosure does not include an amide bond and an imide bond. The "amino bond" in the present disclosure refers to an amino bond in which a carbonyl group is not directly bonded to a nitrogen atom in the amino bond.

Furthermore, L in Formula 1A or Formula 1B, $R^{1B}$ in Formula 2B, or $R^{22}$ in Formula 3 or Formula 4 described below are preferably a group formed of a carbon atom, a hydrogen atom, and, as necessary, an oxygen atom from the viewpoint of migration and more preferably a di- or higher-valent hydrocarbon group or a group to which two or more structures selected from the group consisting of a mono- or higher-valent hydrocarbon group, an ether bond, an ester bond, a hydroxy group, and a carbonyl group are bonded.

The acylphosphine oxide compound represented by Formula 1-0 or Formula 2-0 is preferably an acylphosphine oxide compound represented by Formula 1-1 or Formula 2-1.

Formula 1-1

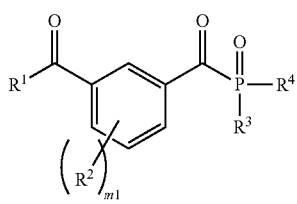

Formula 2-1

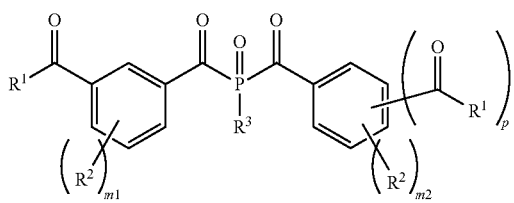

In Formula 1-1 and Formula 2-1, $R^1$'s each independently represent a monovalent hydrocarbon group in which a part of a hydrocarbon chain may be substituted with a carbonyl group, an ester bond, an amide bond, an oxygen atom, NR, and/or a sulfur atom, a linking group that links to a main chain of an oligomer or a polymer, or a linking group that links to $R^1$ of another acylphosphine oxide compound represented by Formula 1-1 or Formula 2-1 and forms an oligomer or a polymer, R represents a hydrogen atom, an alkyl group, or an aryl group, $R^2$ to $R^4$ each independently represent an alkyl group, an aryl group, or an alkoxy group, m1 represents an integer of 0 to 4, m2 represents an integer of 0 to 5, and p represents 0 or 1.

$R^1$'s in Formula 1-1 and Formula 2-1 are the same as each other except for the fact that another Formula 1-0 or Formula 2-0 in $R^1$'s in Formula 1-0 and Formula 2-0 is changed to another Formula 1-1 or Formula 2-1, and preferred aspects thereof are also the same.

$R^2$ to $R^4$, m1, m2, p, and R in Formula 1-1 and Formula 2-1 are the same as $R^2$ to $R^4$, m1, m2, p, and R in Formula 1-0 and Formula 2-0, and preferred aspects thereof are also the same.

In addition, the acylphosphine oxide compound represented by Formula 1-0 or Formula 2-0 is preferably an acylphosphine oxide compound represented by Formula 1-2 or Formula 2-2.

Formula 1-2

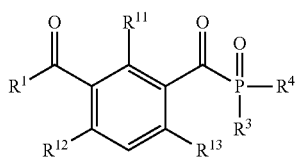

Formula 2-2

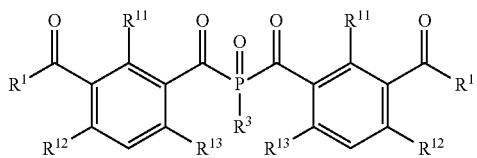

In Formula 1-2 and Formula 2-2, $R^1$'s each independently represent a monovalent hydrocarbon group in which a part of a hydrocarbon chain may be substituted with a carbonyl group, an ester bond, an amide bond, an oxygen atom, NR, and/or a sulfur atom, a linking group that links to a main chain of an oligomer or a polymer, or a linking group that links to $R^1$ of another acylphosphine oxide compound represented by Formula 1-2 or Formula 2-2 and forms an oligomer or a polymer, R represents a hydrogen atom, an alkyl group, or an aryl group, $R^{11}$ to $R^{13}$ each independently represent an alkyl group having 1 to 8 carbon atoms, an aryl group having 6 to 20 carbon atoms, or an alkoxy group having 1 to 4 carbon atoms, and $R^3$ and $R^4$ each independently represent an alkyl group, an aryl group, or an alkoxy group.

$R^1$'s in Formula 1-2 and Formula 2-2 are the same as each other except for the fact that another Formula 1-0 or Formula 2-0 in $R^1$'s in Formula 1-0 and Formula 2-0 is changed to another Formula 1-2 or Formula 2-2, and preferred aspects thereof are also the same.

$R^3$, $R^4$, and R in Formula 1-2 and Formula 2-2 are the same as $R^3$, $R^4$, and R in Formula 1-0 and Formula 2-0, and preferred aspects thereof are also the same.

$R^{11}$ to $R^{13}$ in Formula 1-2 and Formula 2-2 each are, independently, preferably an alkyl group having 1 to 8 carbon atoms or an alkoxy group having 1 to 4 carbon atoms, more preferably an alkyl group having 1 to 8 carbon atoms, still more preferably an alkyl group having 1 to 4 carbon atoms, and particularly preferably a methyl group. In such an aspect, degradability and sensitivity are superior, and furthermore, convenience or the yield during the synthesis is excellent.

In addition, $R^{11}$ to $R^{13}$ in Formula 1-2 and Formula 2-2 are preferably the same group.

In addition, the photopolymerization initiator of the present disclosure is preferably an acylphosphine oxide compound represented by Formula 3 or Formula 4.

Formula 3

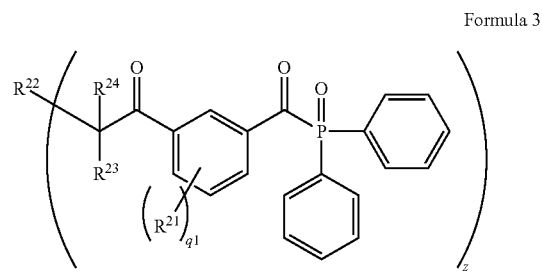

Formula 4

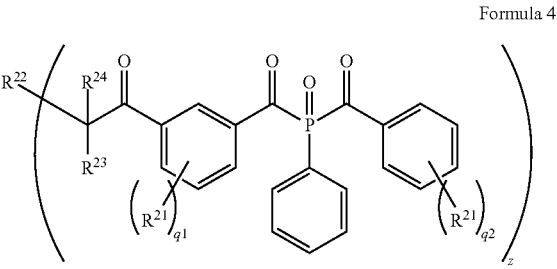

In Formula 3 and Formula 4, $R^{21}$'s each independently represent an alkyl group, an aryl group, or an alkoxy group, $R^{22}$ represents a z-valent organic group, $R^{23}$ and $R^{24}$ each independently represent a hydrogen atom or a monovalent hydrocarbon group in which a part of a hydrocarbon chain may be substituted with a carbonyl group, an ester bond, an amide bond, an oxygen atom, NR, and/or a sulfur atom, R represents a hydrogen atom, an alkyl group, or an aryl group, q1 represents an integer of 0 to 4, q2 represents an integer of 0 to 5, and z represents an integer of 2 to 10.

$R^{21}$, q1, and q2 in Formula 3 and Formula 4 are respectively the same as $R^2$, m1, and m2 in Formula 1-0 and Formula 2-0, and preferred aspects thereof are also the same respectively.

$R^{22}$ in Formula 3 and Formula 4 is preferably a di- to decavalent hydrocarbon group or a di- to decavalent linking group in which two or more structures selected from the group consisting of a mono- to decavalent hydrocarbon group, a carbonyl group, an ester bond, an amide bond, an imide bond, an oxygen atom, a nitrogen atom, and a sulfur atom are bonded to each other and more preferably a di- to decavalent hydrocarbon group or a di- to decavalent linking group in which two or more structures selected from the group consisting of a mono- to decavalent hydrocarbon group, a carbonyl group, an ester bond, an amide bond, an imide bond, and an oxygen atom are bonded to each other.

The hydrocarbon group may be an aliphatic hydrocarbon group, an aromatic hydrocarbon group, or a combined group of one or more aliphatic hydrocarbon groups and one or more aromatic hydrocarbon groups. In addition, the aliphatic hydrocarbon group may have an unsaturated bond.

In addition, the hydrocarbon group may further have a substituent. Examples of the substituent include a halogen atom, an alkoxy group, an acyl group, an alkoxycarbonyl group, an amide group, and an acyloxy group.

Meanwhile, $R^{23}$ and $R^{24}$ in Formula 3 and Formula 4 are the same as $R^1$ in Formula 1-0 and Formula 2-0, and preferred aspects thereof are also the same.

Preferred examples of $R^{22}$ include specific structures described below which are obtained using a well-known polyfunctional carboxylic acid, a well-known polyfunctional amine, a well-known polyfunctional phenol, a well-known polyfunctional thiol, or a well-known polyfunctional carboxylic chloride as a raw material. Meanwhile, the wavy line portion represents a bonding position to an α position (α carbon) of the acyl group in Formula 3 or Formula 4.

Examples of the case of using a polyfunctional carboxylic acid include specific structures illustrated below. Meanwhile, p represents 0 or 1, and q represents an integer of 0 to 50.

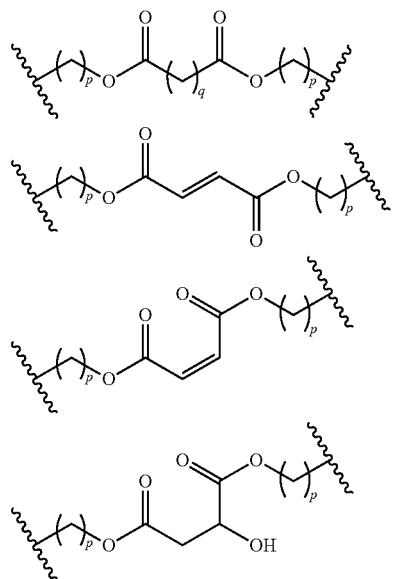

-continued

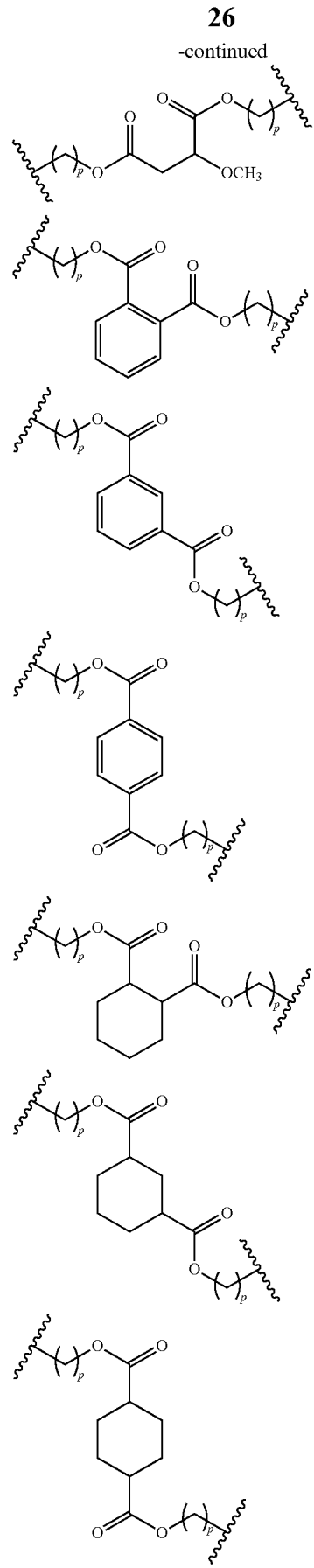

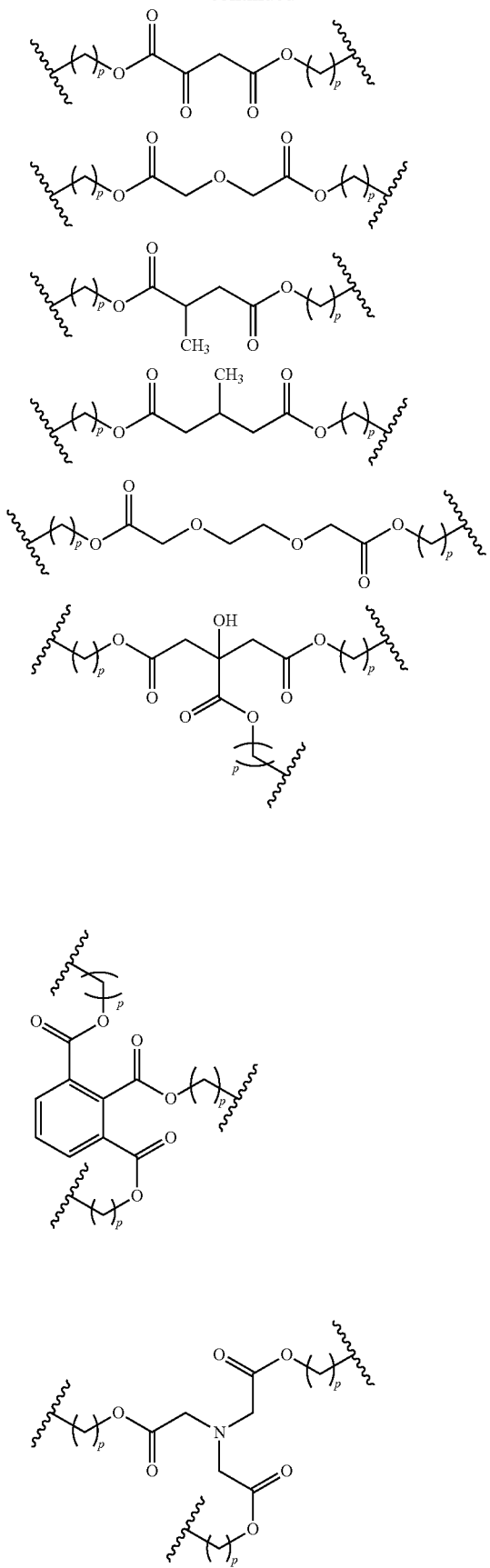
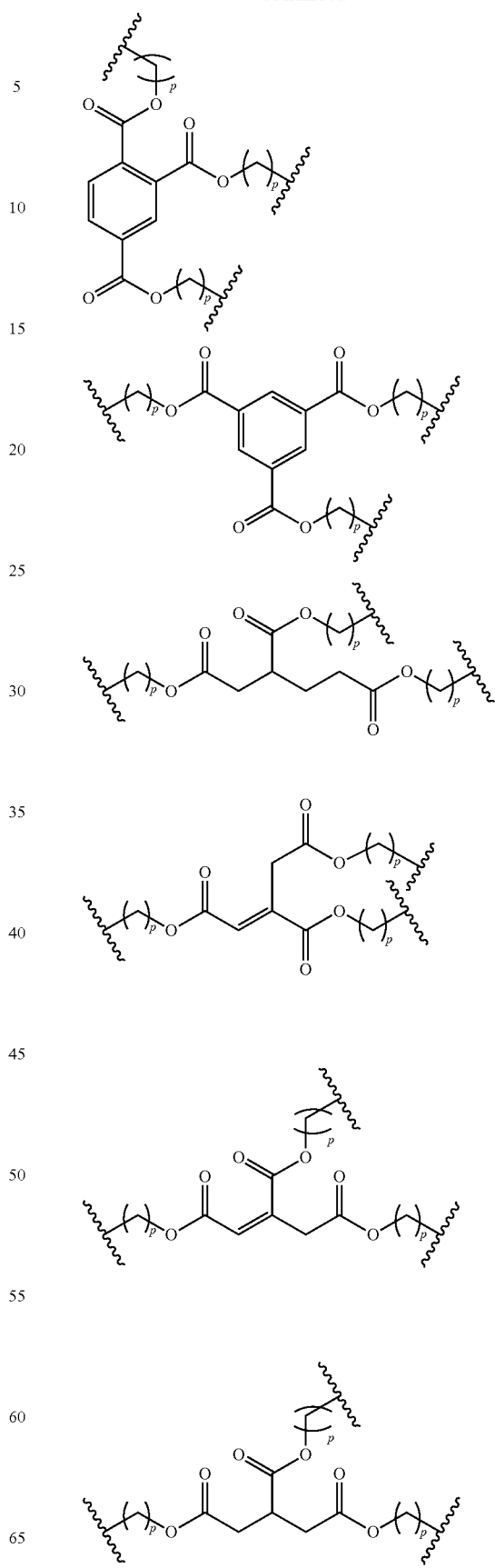

29
-continued
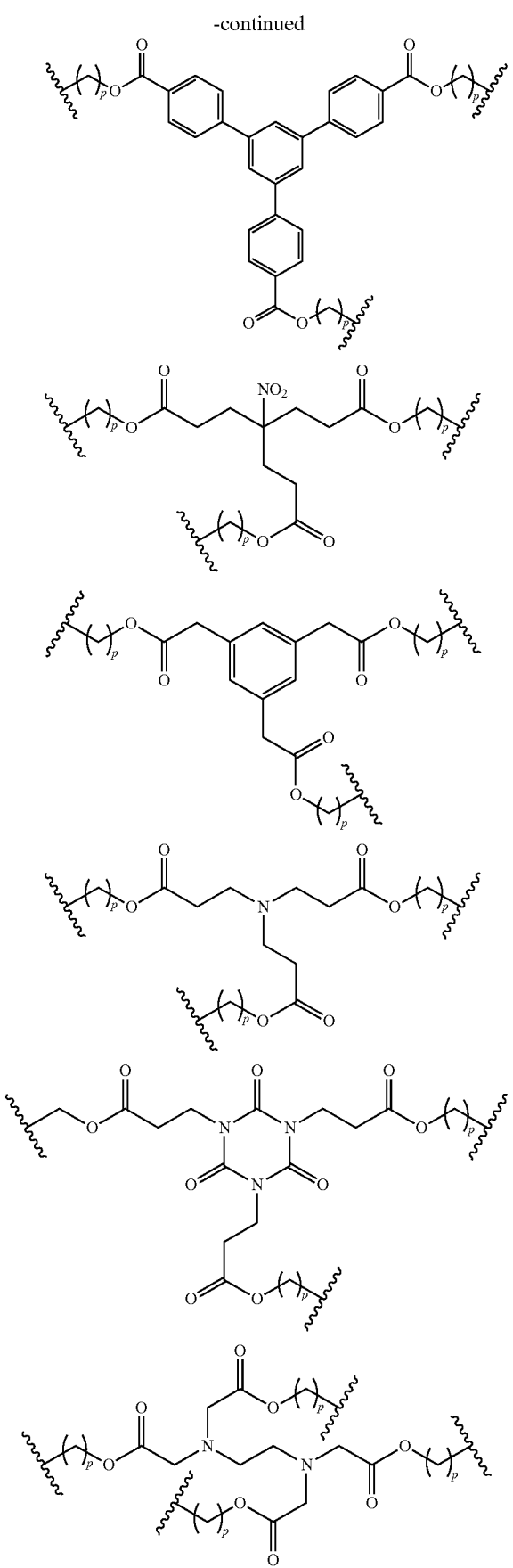
30
-continued
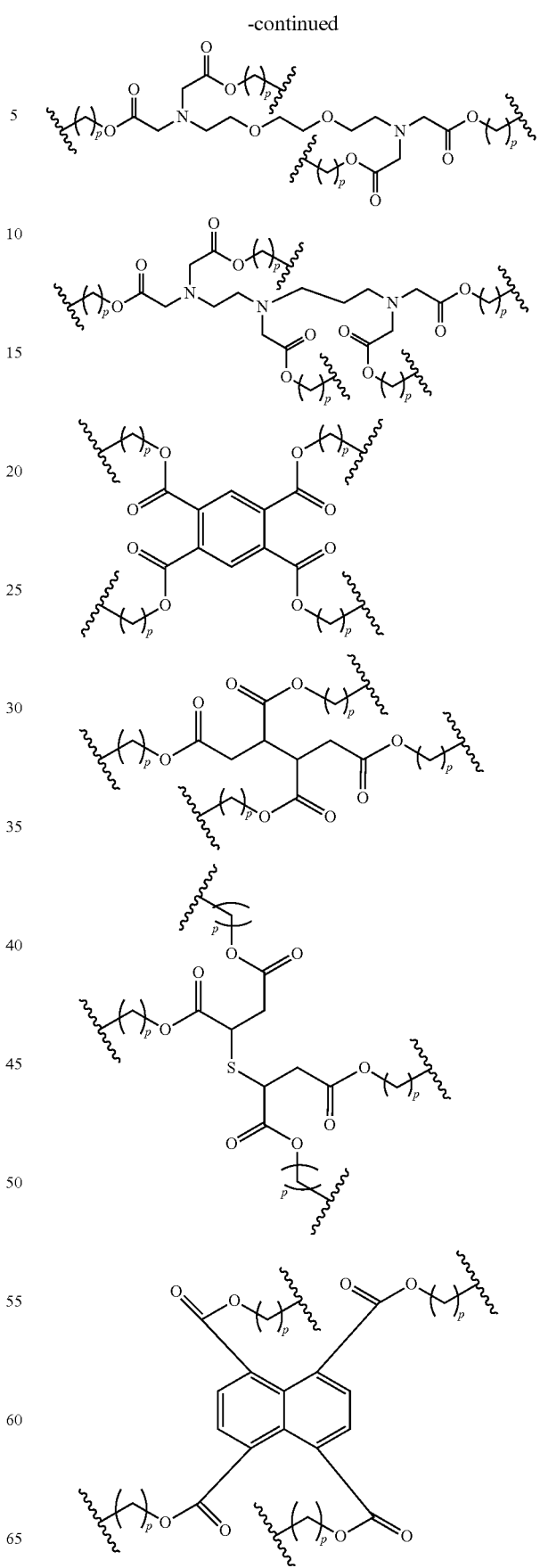

31
-continued
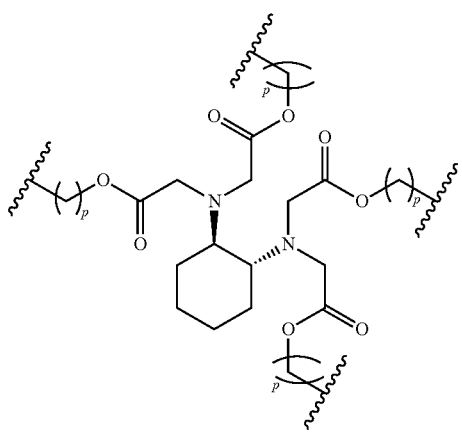
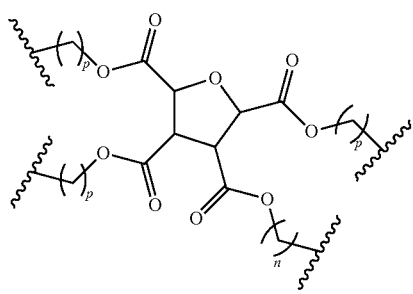
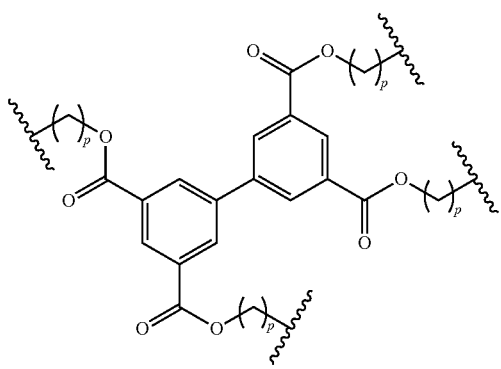
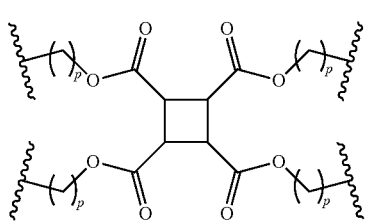
32
-continued
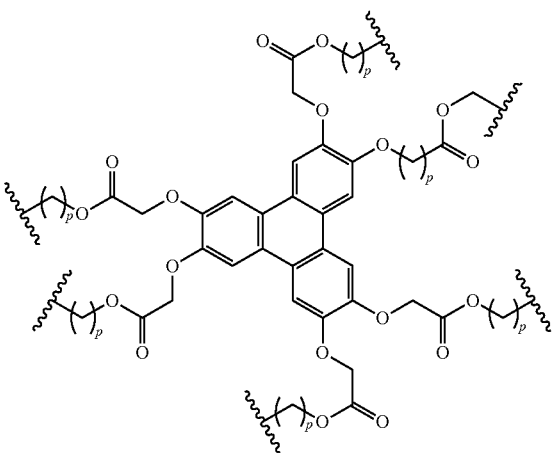
Examples of the case of using a polyfunctional amine include specific structures illustrated below.
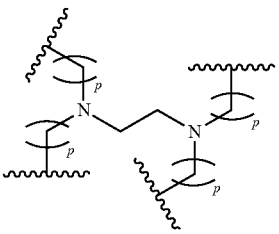
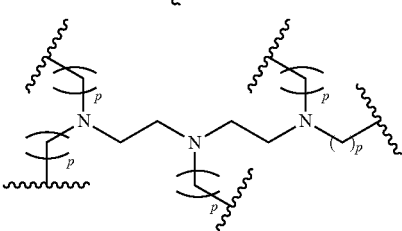
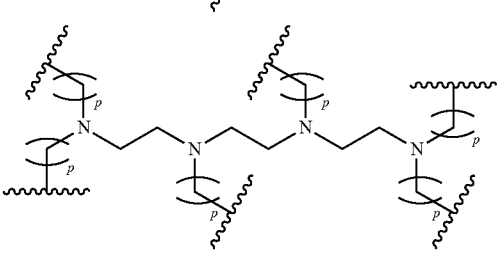
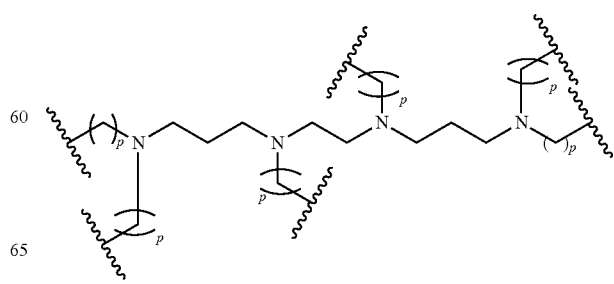

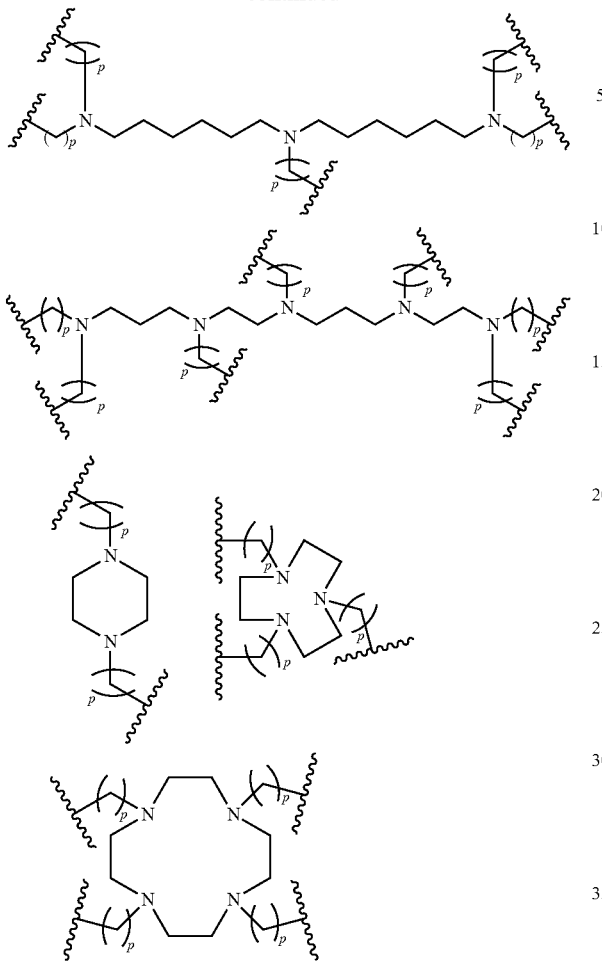
Examples of the case of using a polyfunctional thiol include specific structures illustrated below.
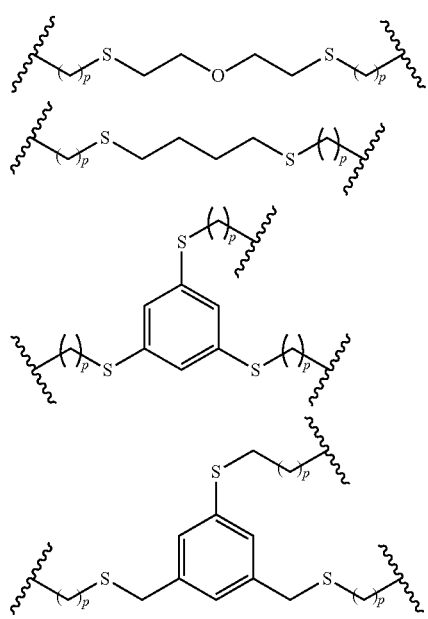
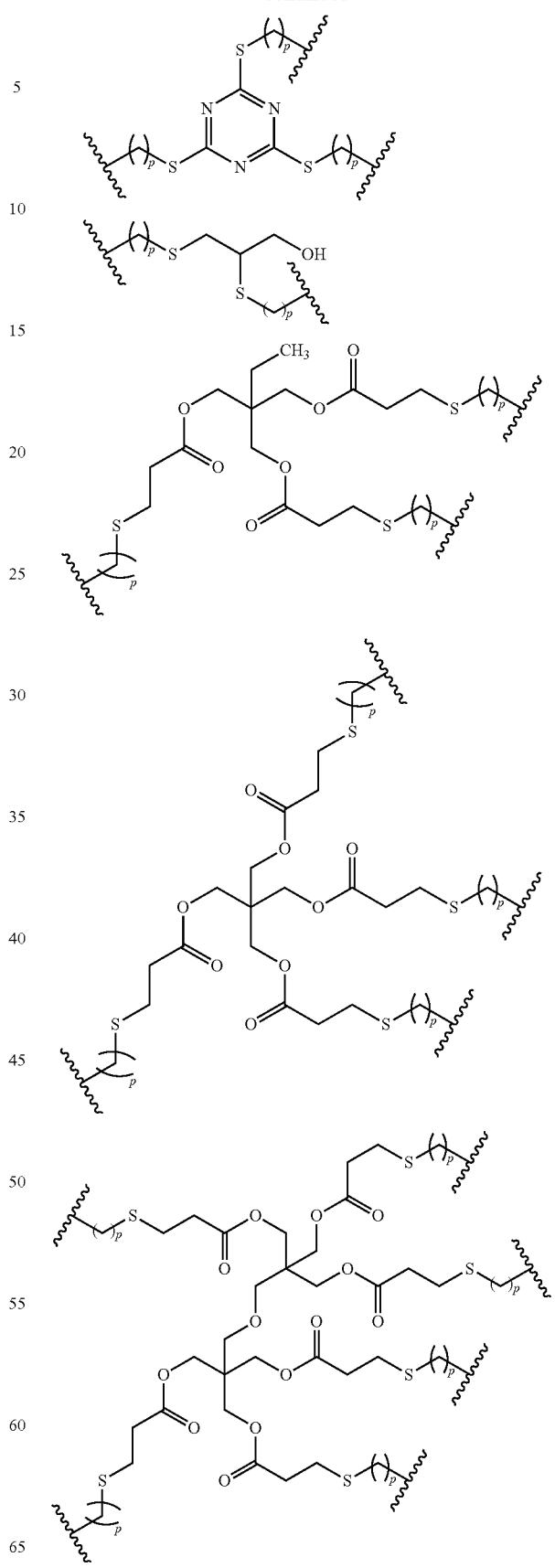

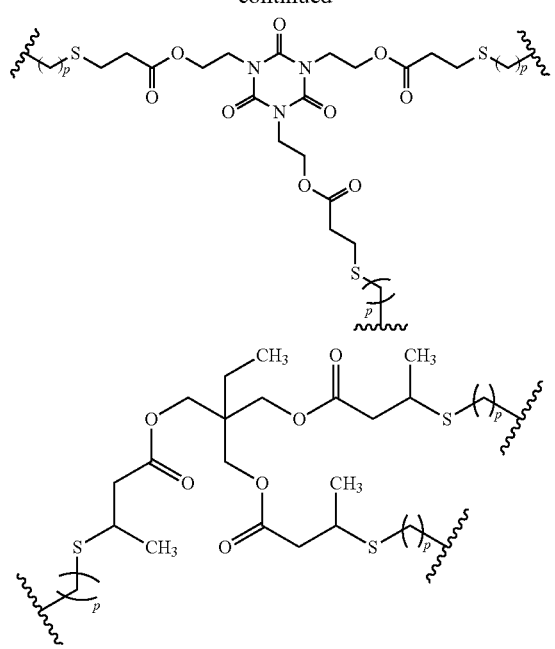
Examples of the case of using a polyfunctional phenol include specific structures illustrated below.
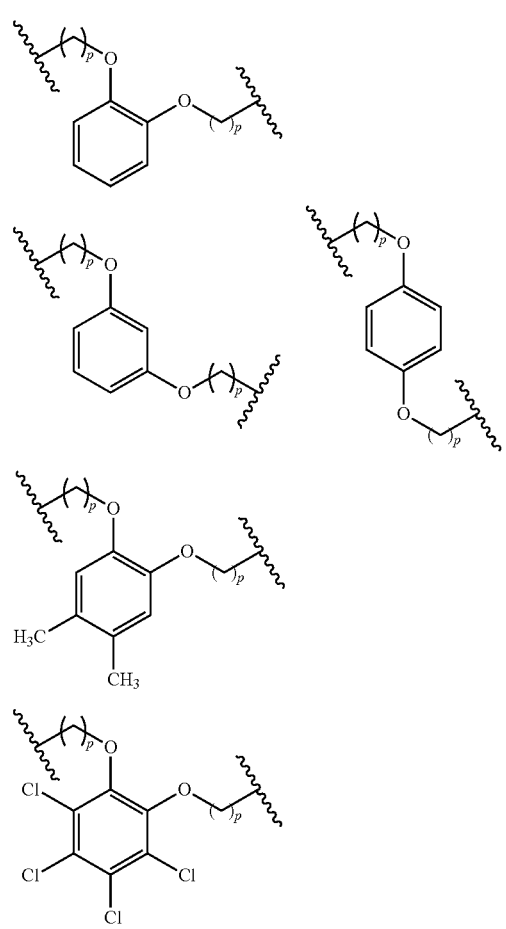
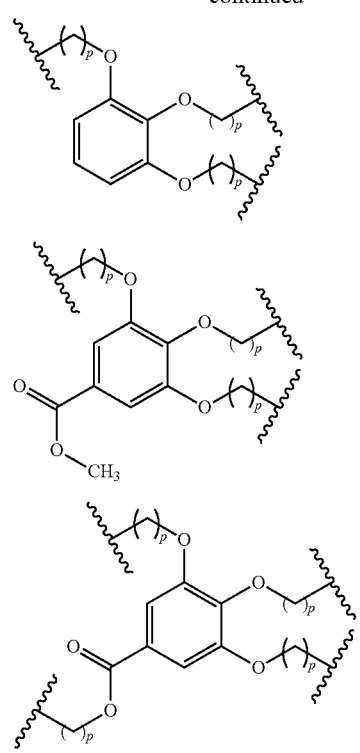
Examples of the case of using a polyfunctional carboxylic chloride include specific structures illustrated below.
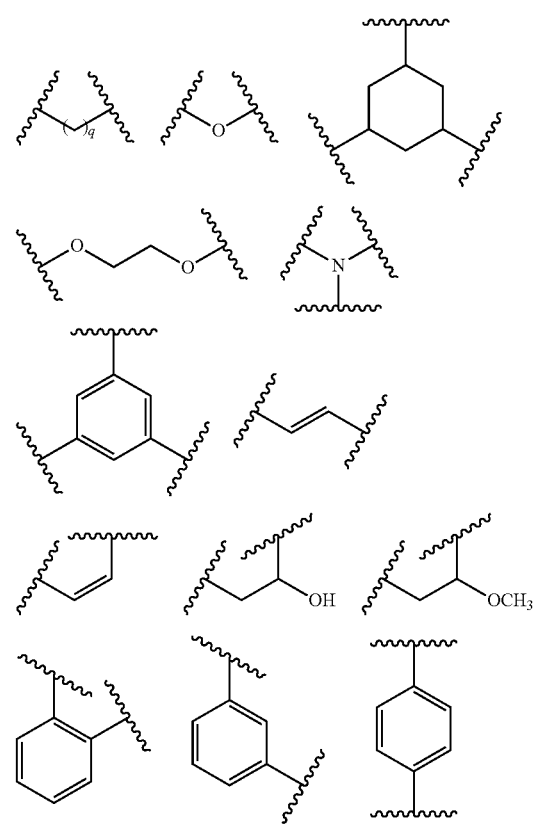

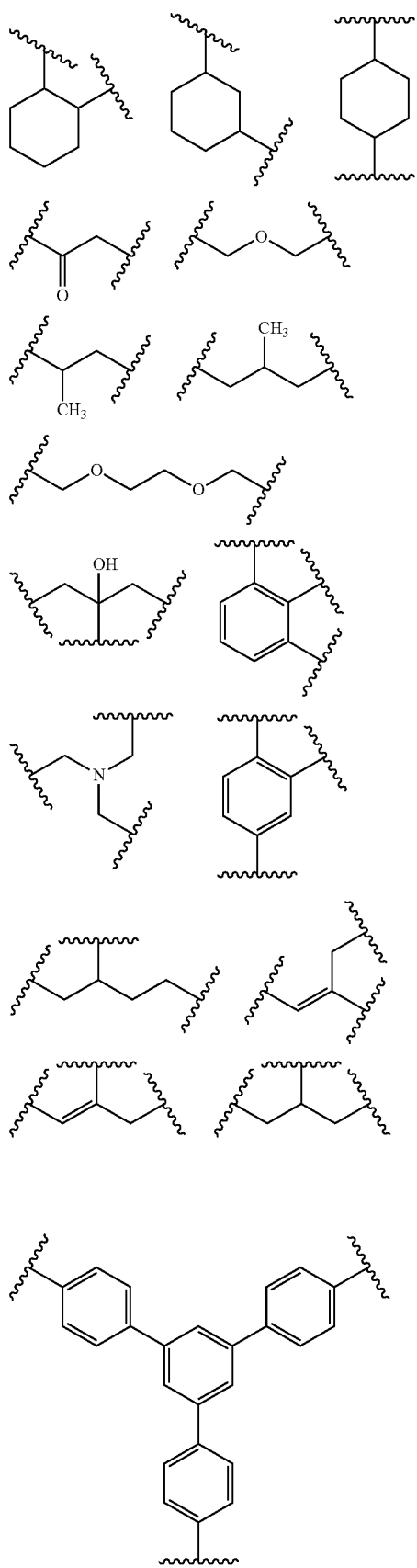
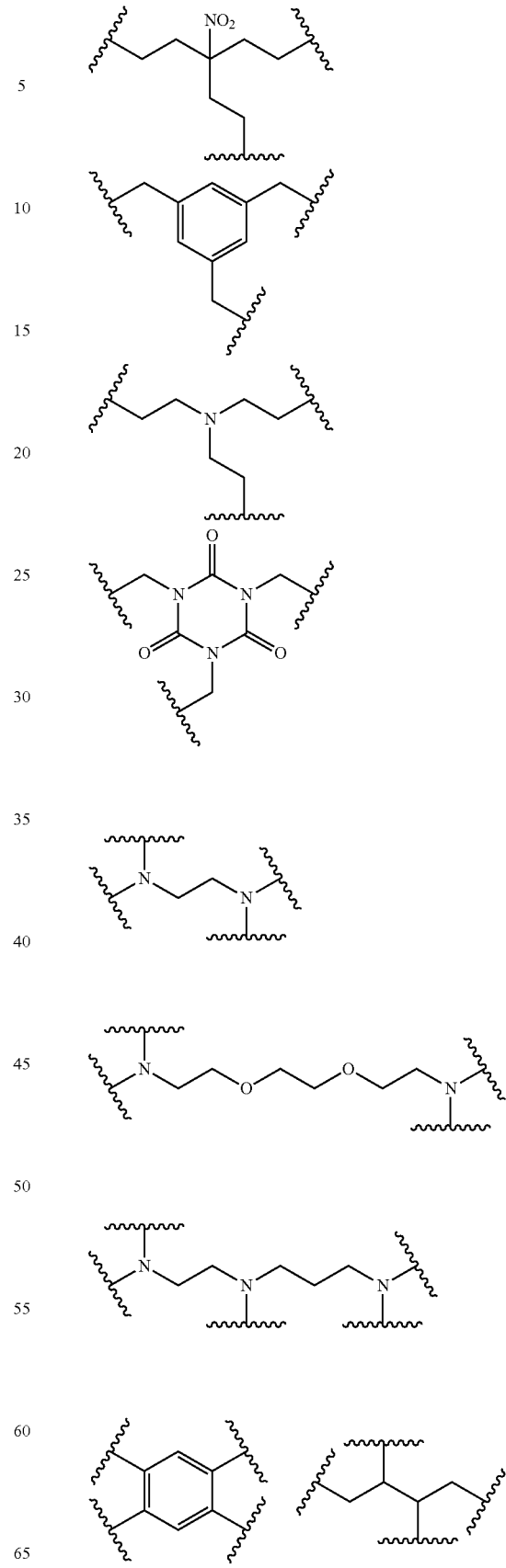

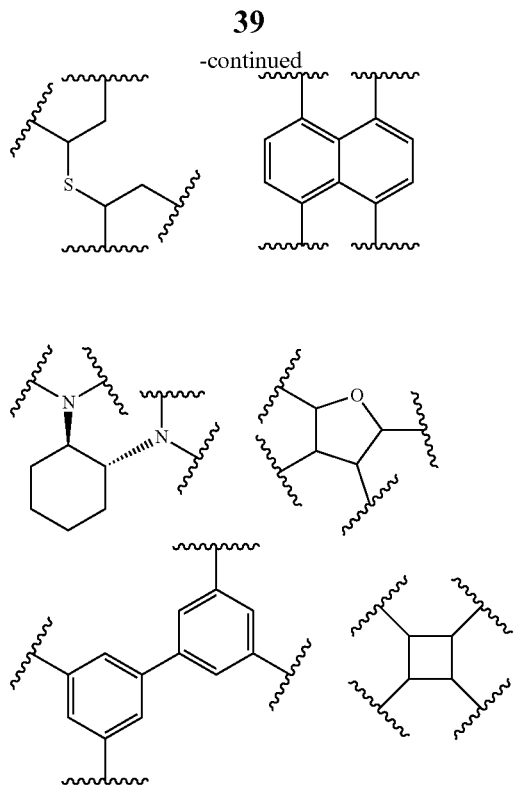
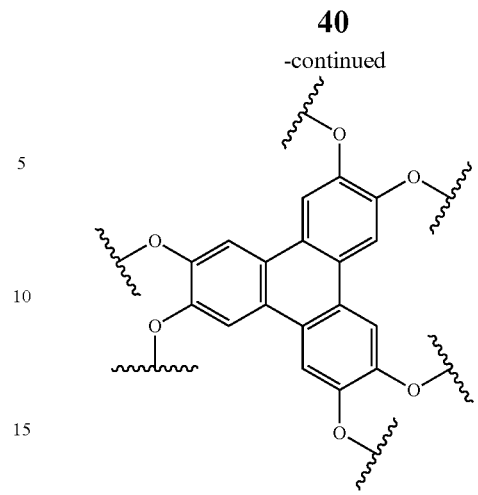

Preferred specific examples of the specific acylphosphine oxide compound will be illustrated below, but are not limited thereto. Meanwhile, n's at the bottom right of parentheses in Compounds B1-(10) to (12) represent an integer of 2 or more, m's at the bottom right of parentheses in Compound A2-(10), Compound B2-(10), and Compound B2-(11) represent an integer of 1 or more, and numerical values at the bottom right of parentheses of Compound B2-(12) and Compound B2-(13) represent a molar ratio.

Compound A1-(1)

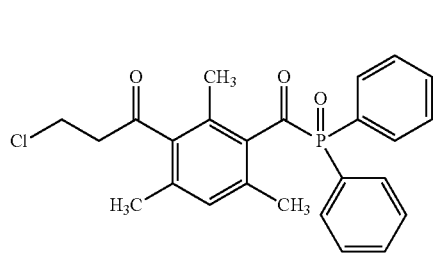

Compound A1-(2)

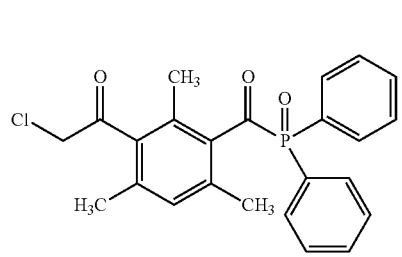

Compound A1-(3)

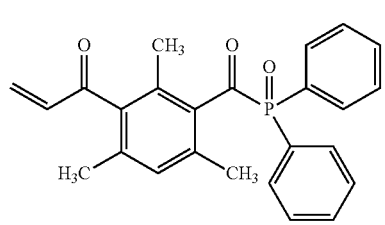

Compound A1-(4)

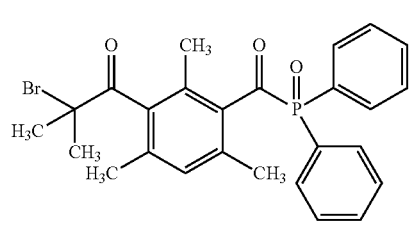

Compound A1-(5)

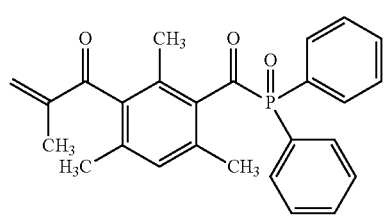

Compound A1-(6)
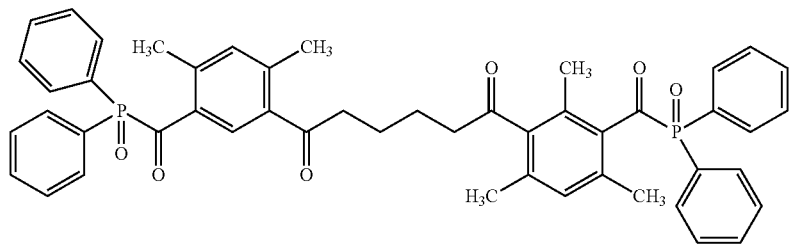
Compound A1-(7)
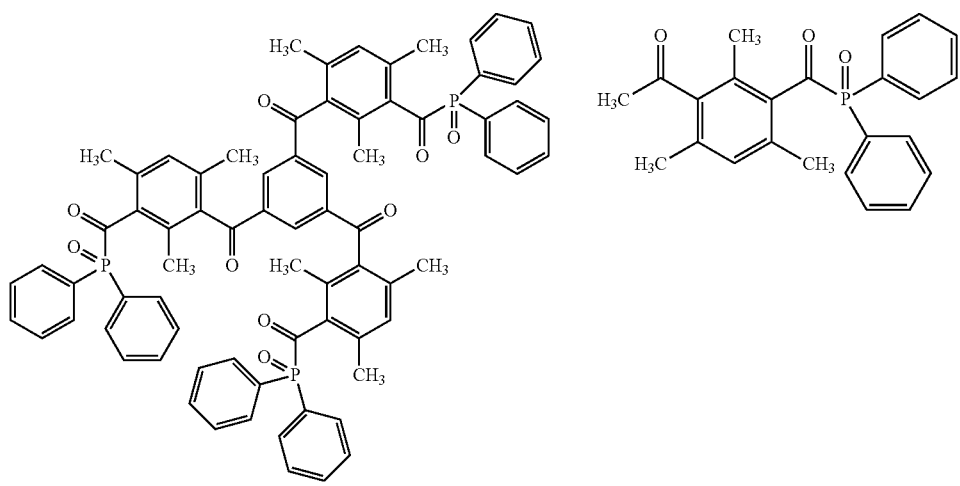
Compound A1-(8)
Compound A1-(9)
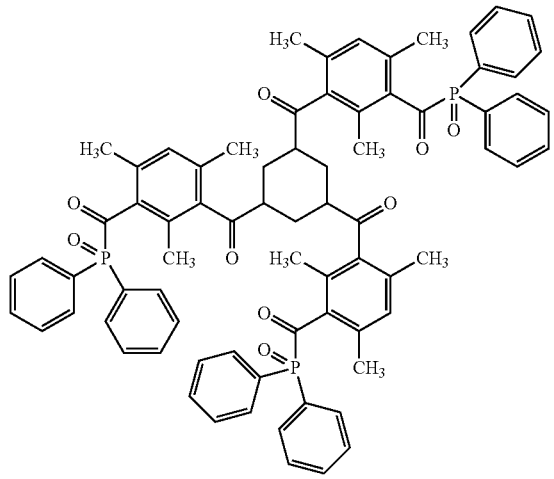
Compound B1-(1)
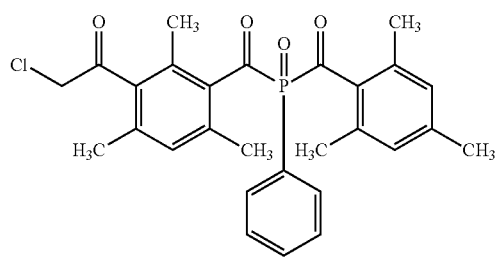
Compound B1-(2)
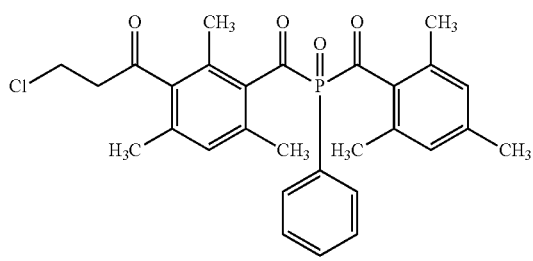

-continued
Compound B1-(3)
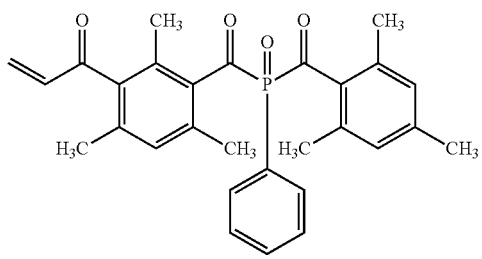
Compound B1-(4)
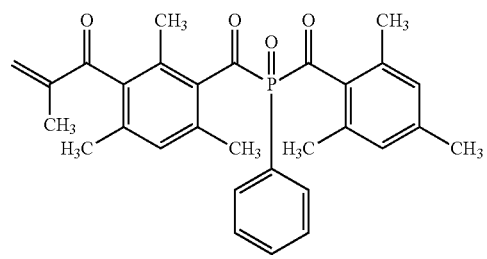
Compound B1-(5)
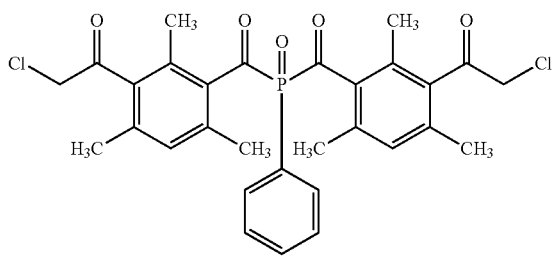
Compound B1-(6)
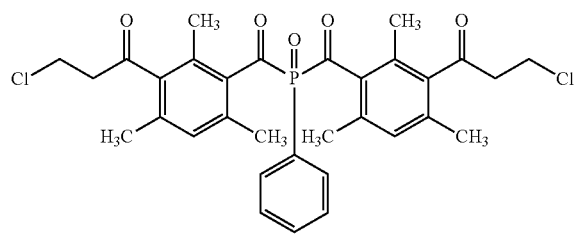
Compound B1-(7)
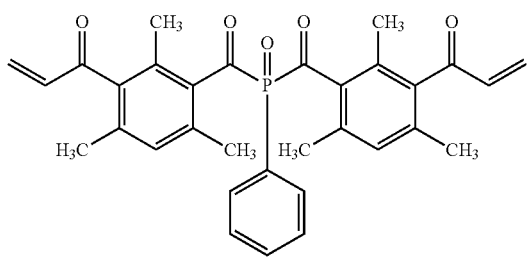
Compound B1-(8)
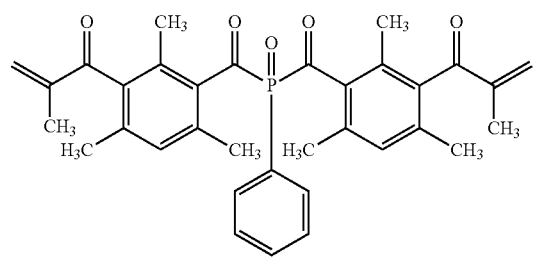
Compound B1-(9)
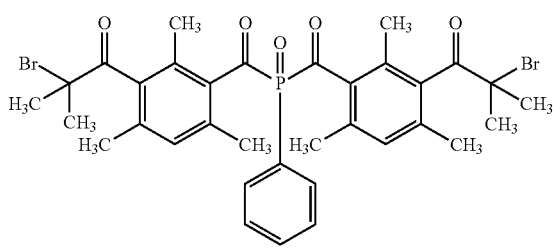
Compound B1-(10)
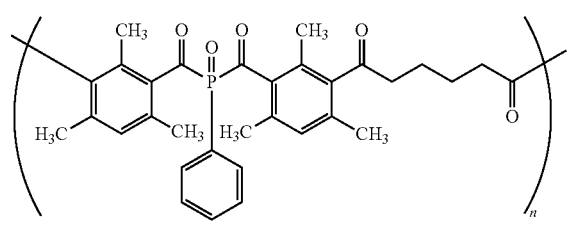
Compound B1-(11)
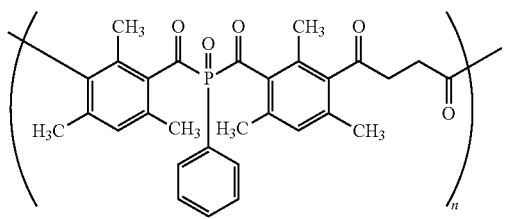
Compound B1-(12)
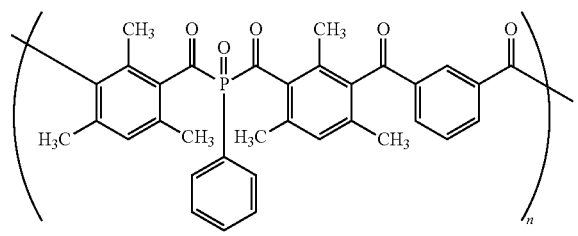

Compound A2-(1)
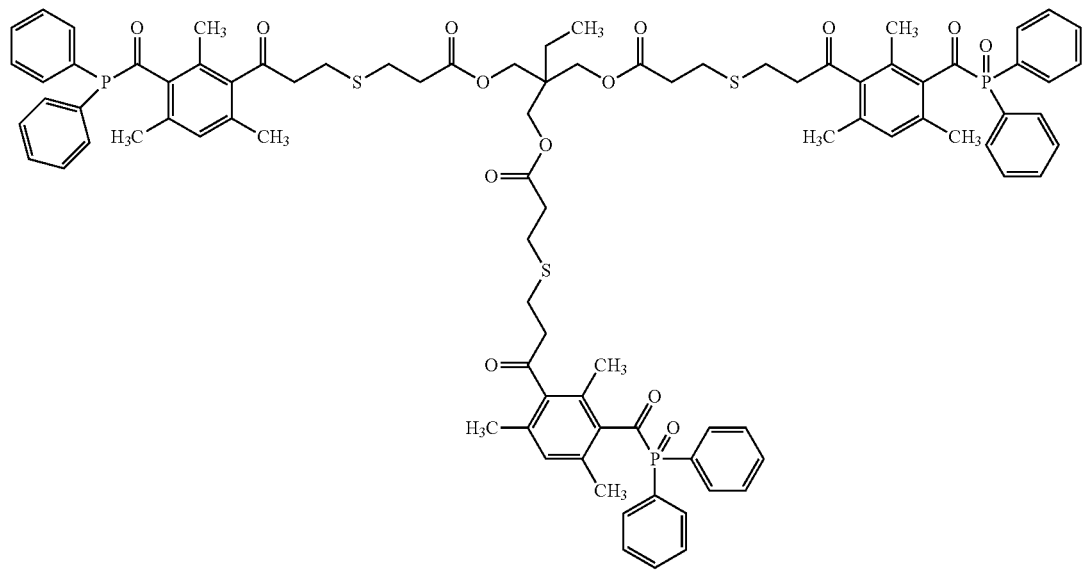
Compound A2-(2)
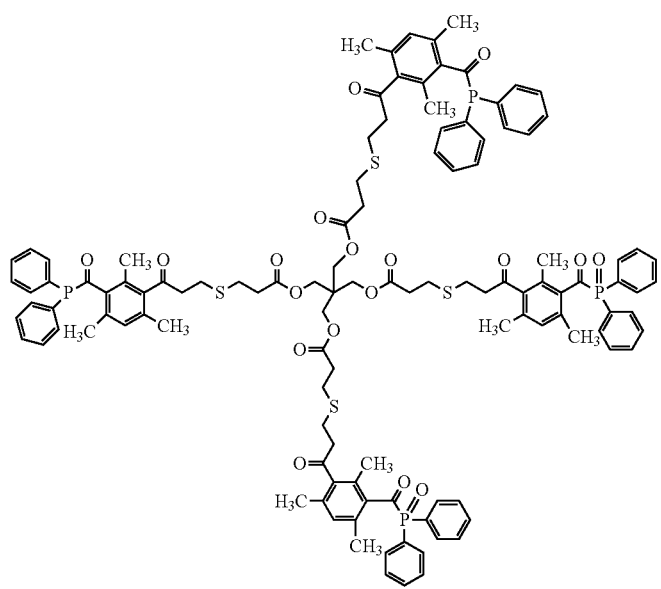

Compound A2-(3)
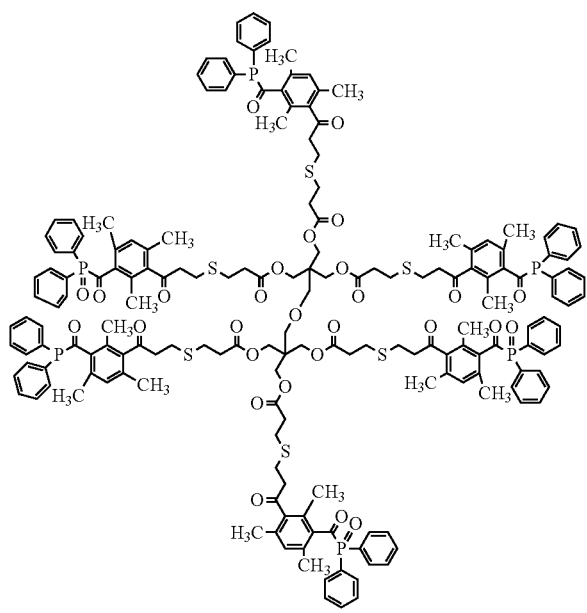
Compound A2-(4)
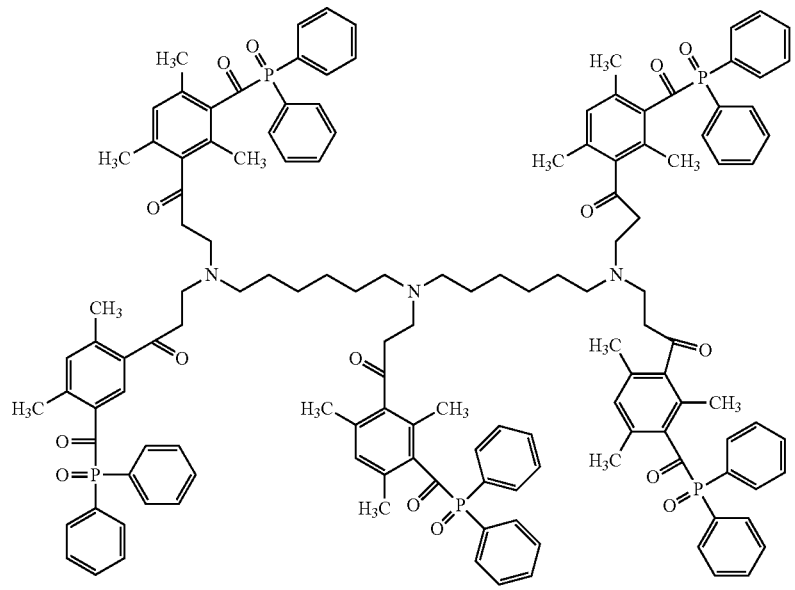

-continued
Compound A2-(5)
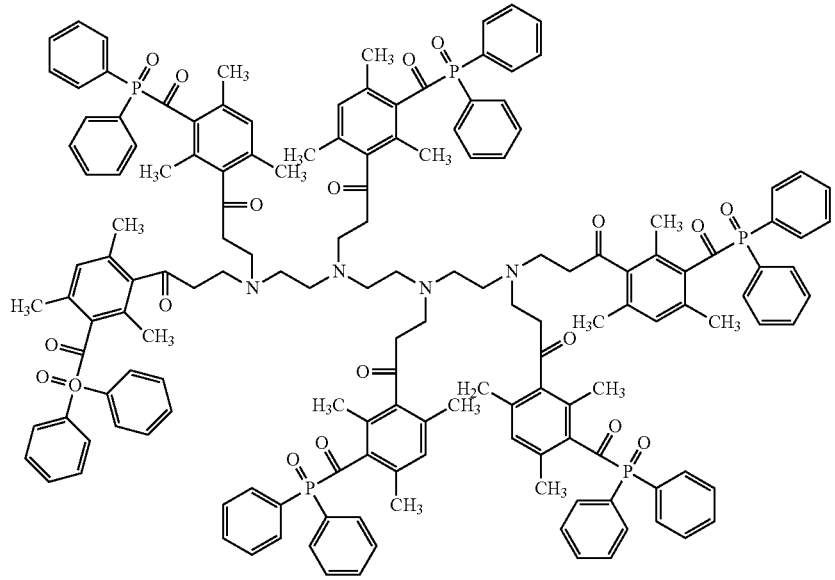
Compound A2-(6)
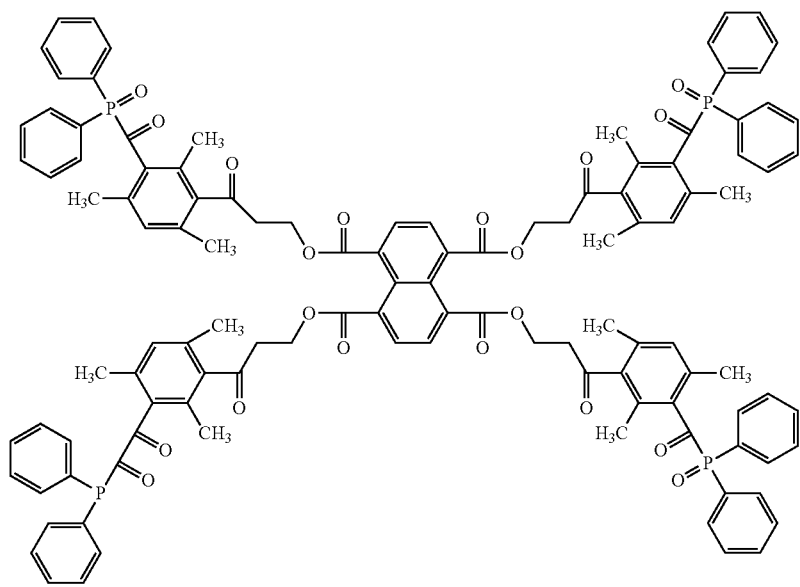

-continued
Compound A2-(7)
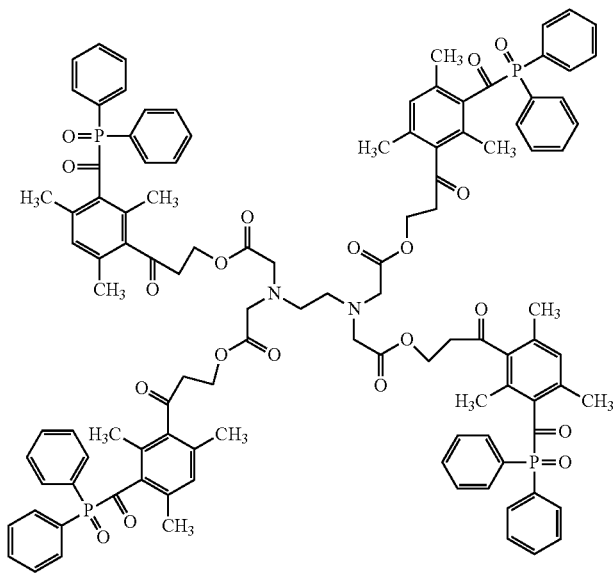
Compound A2-(8)
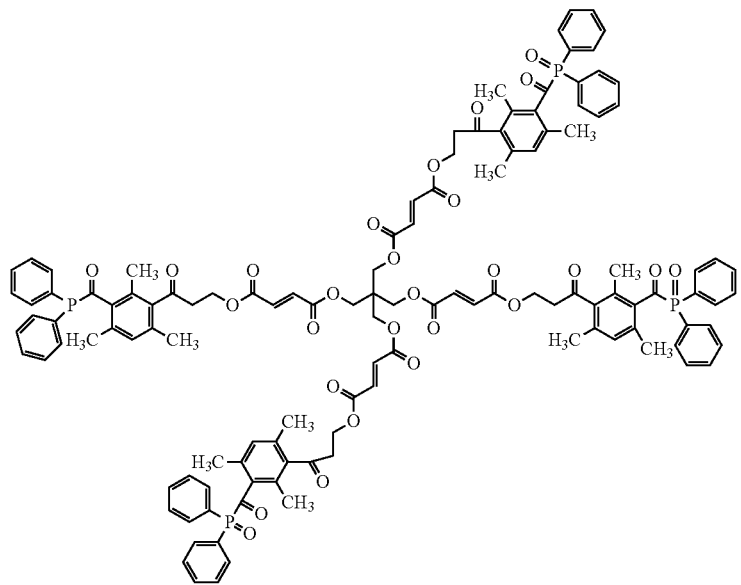

Compound A2-(9)
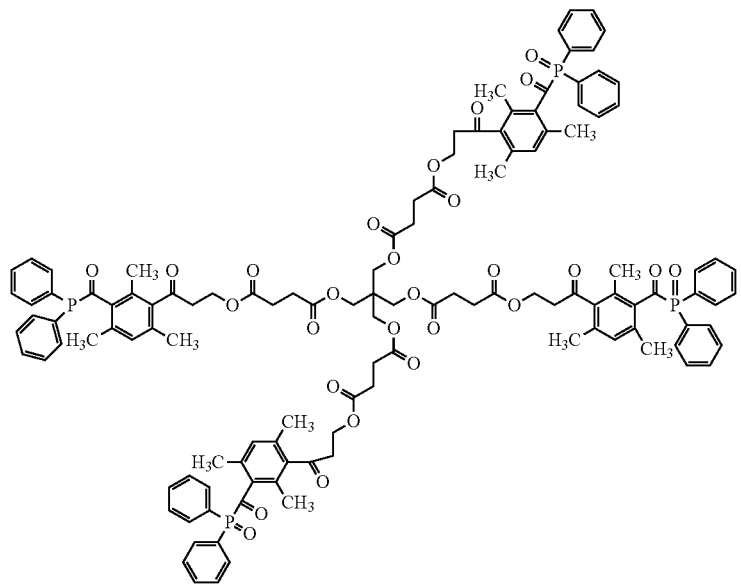
Compound A2-(10)
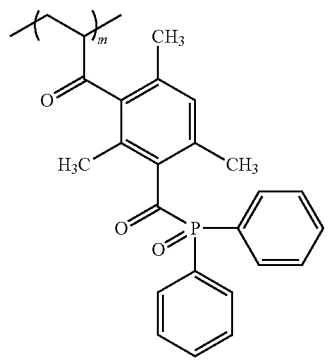
Compound B2-(1)
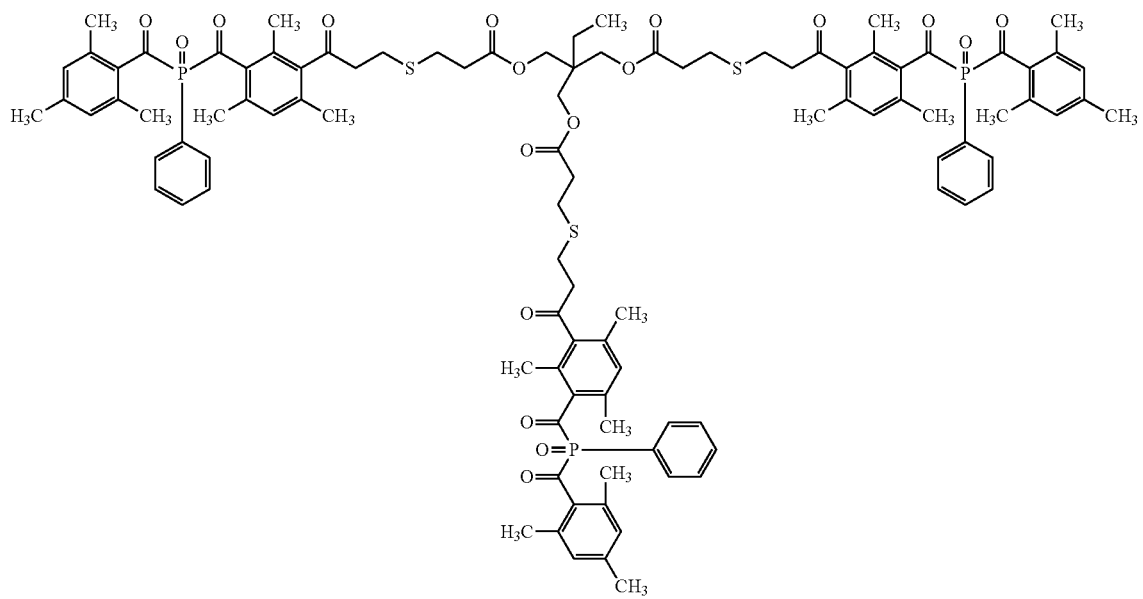

-continued
Compound B2-(2)
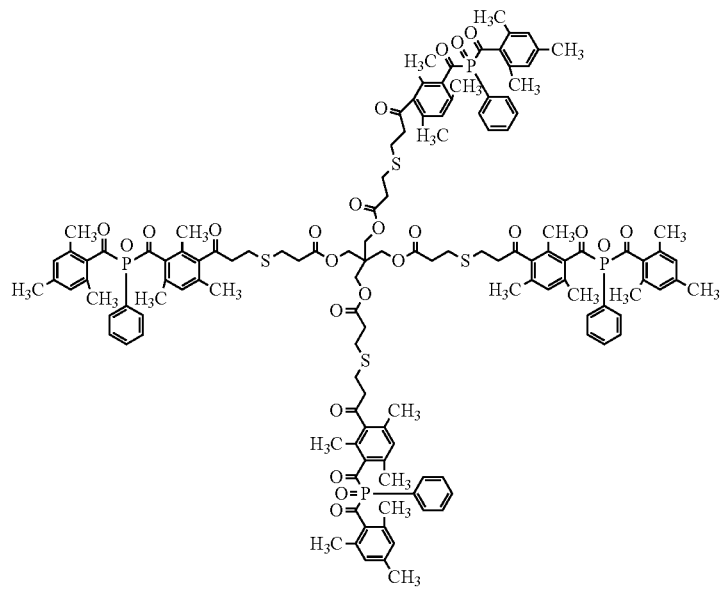
Compound B2-(3)
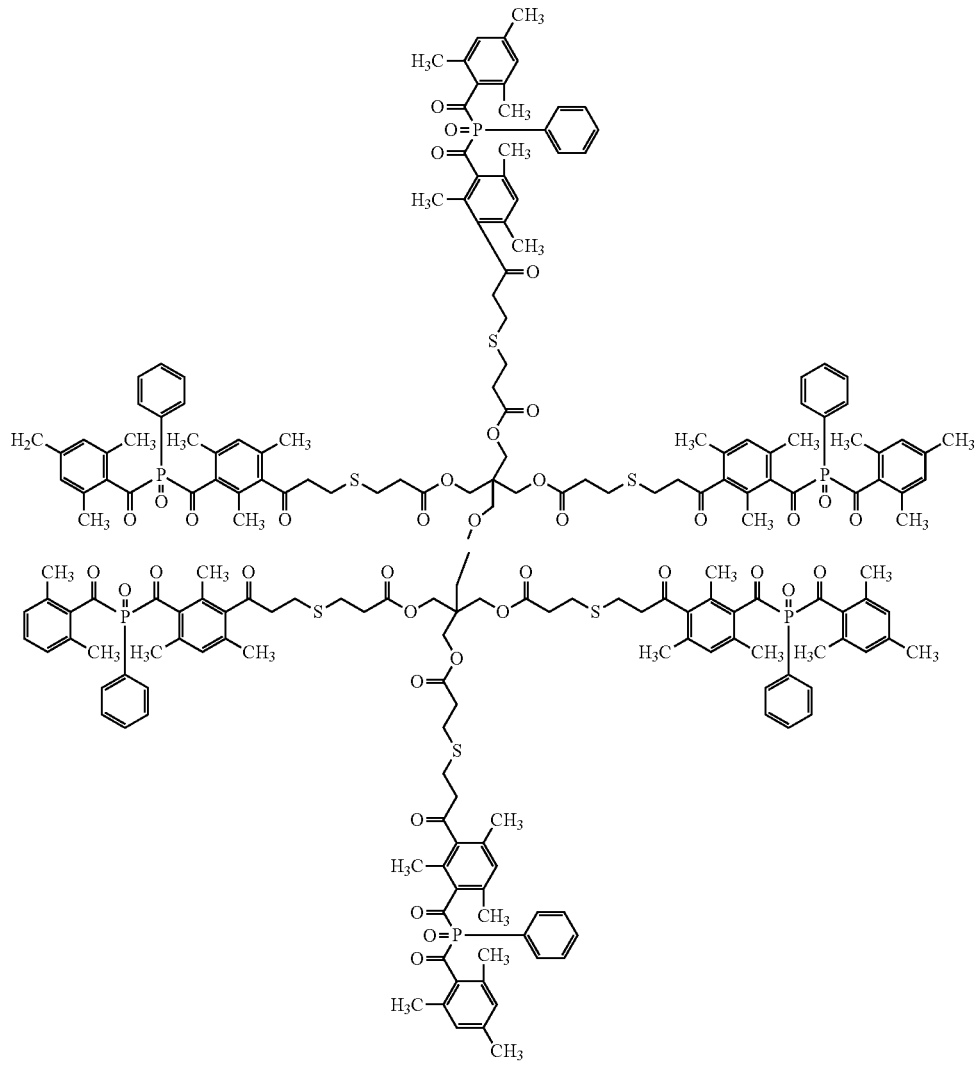

Compound B2-(4)
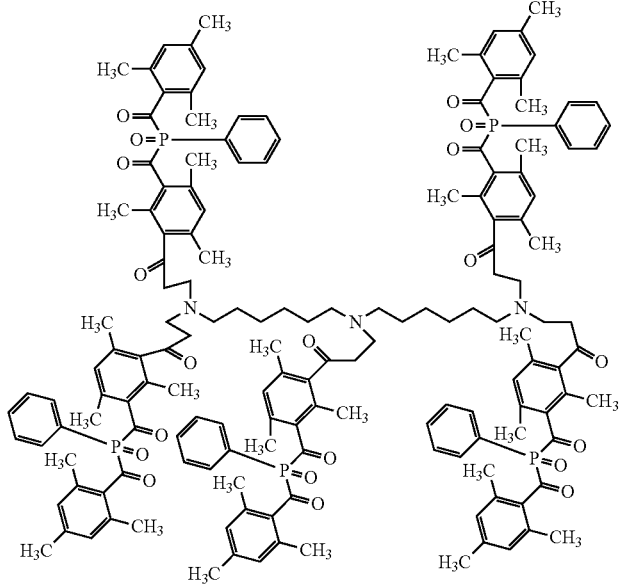
Compound B2-(5)
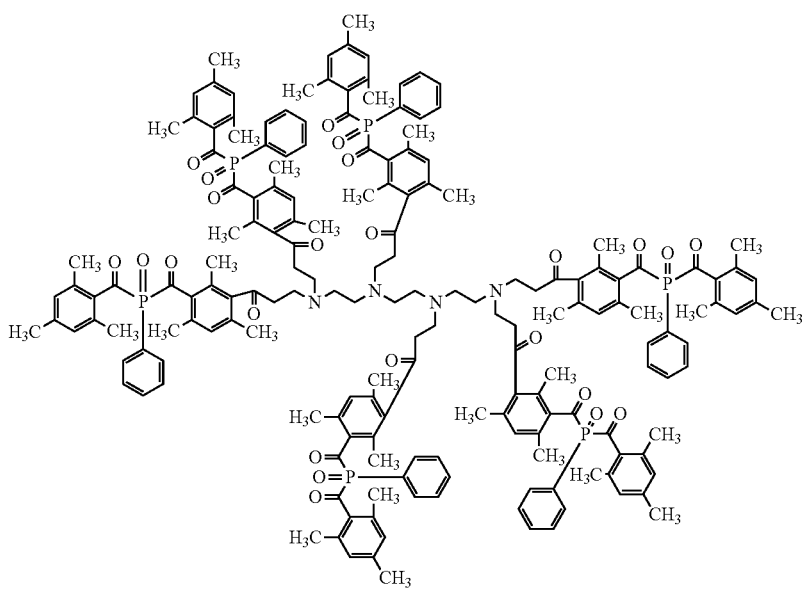

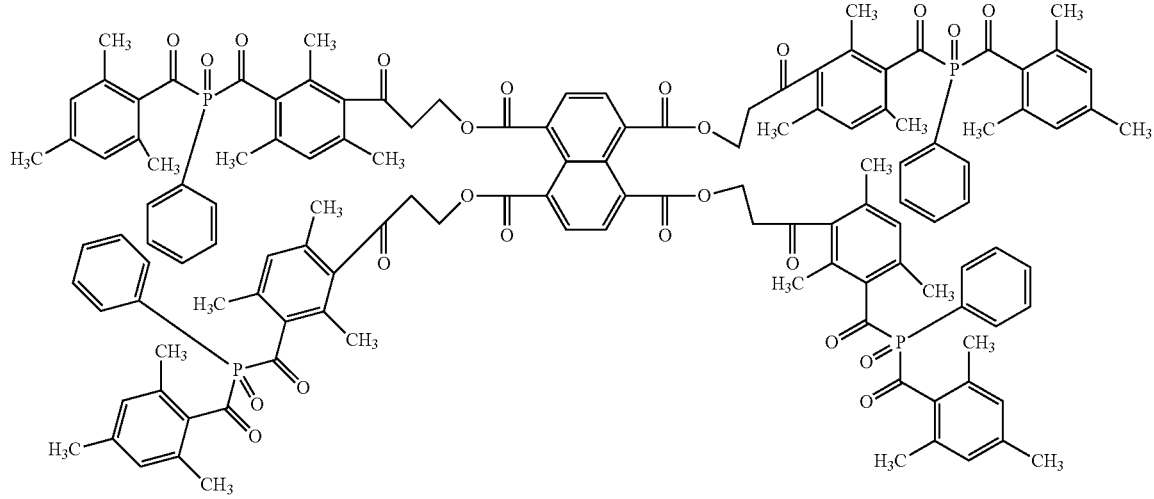
Compound B2-(6)
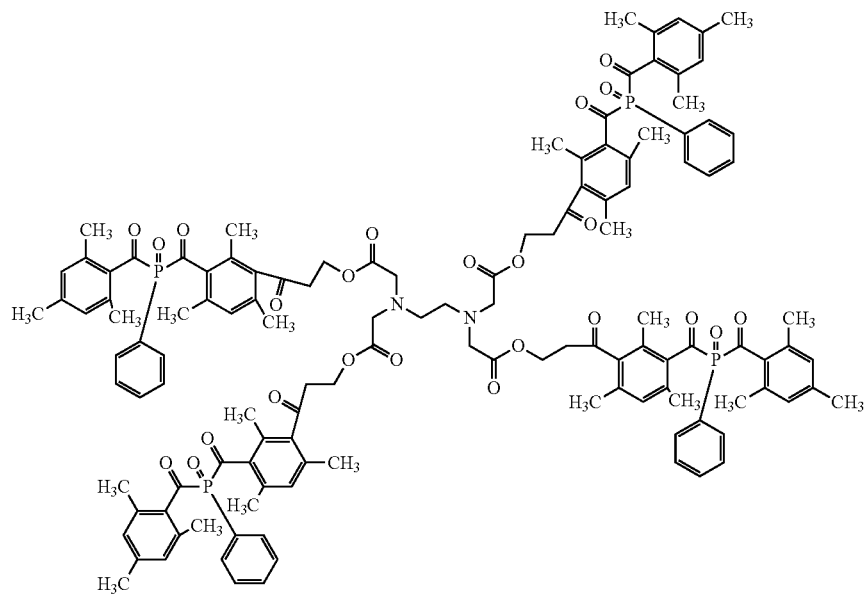
Compound B2-(7)

Compound B2-(8)
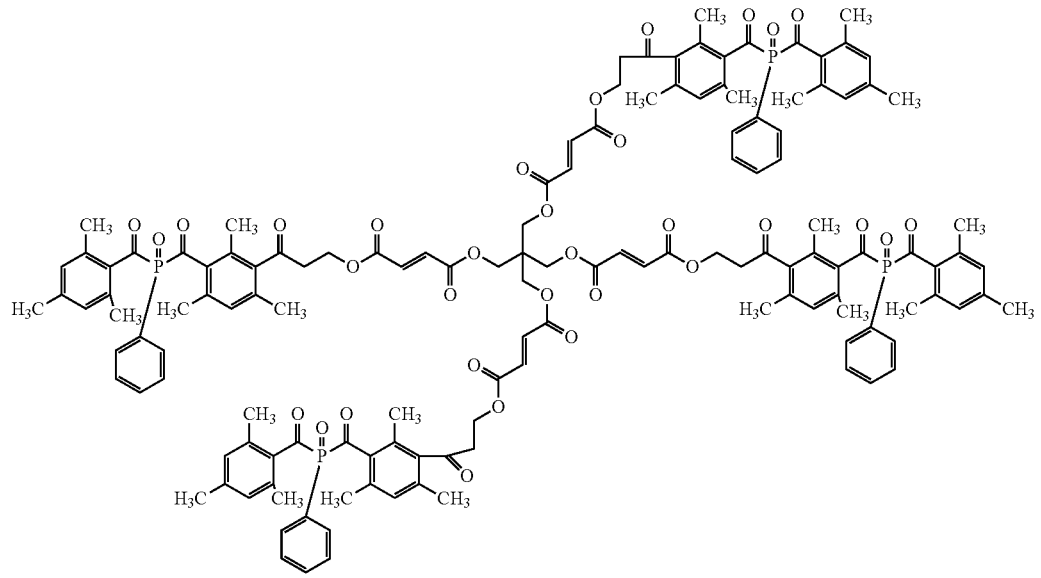
Compound B2-(9)
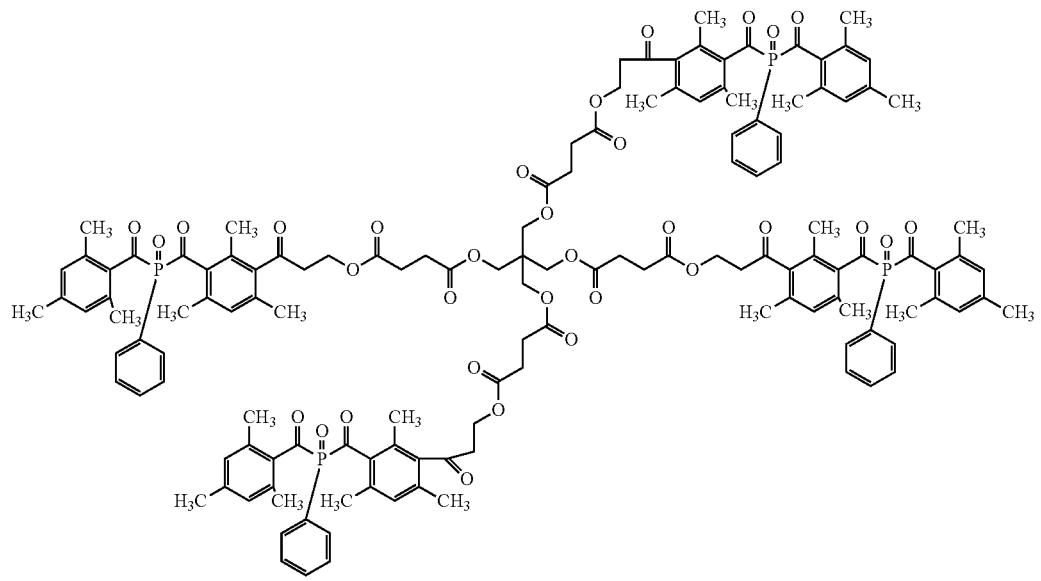
Compound B2-(10)                Compound B2-(11)
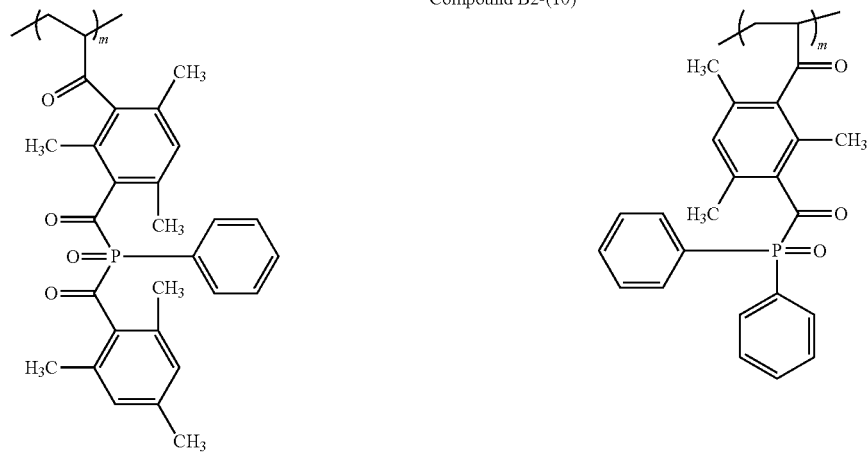

-continued
Compound B2-(12)
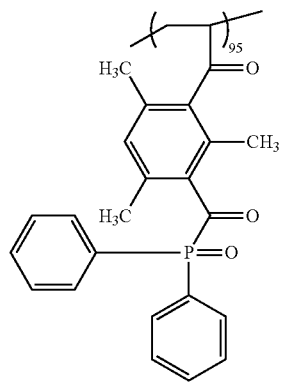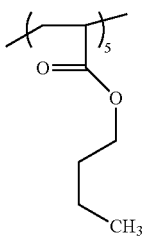
Compound B2-(13)
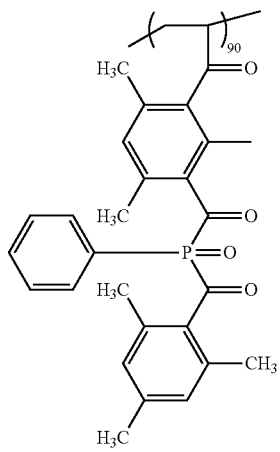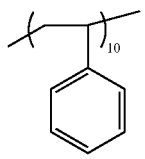
Compound A3-(1)
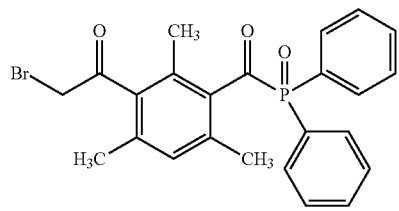
Compound A3-(2)
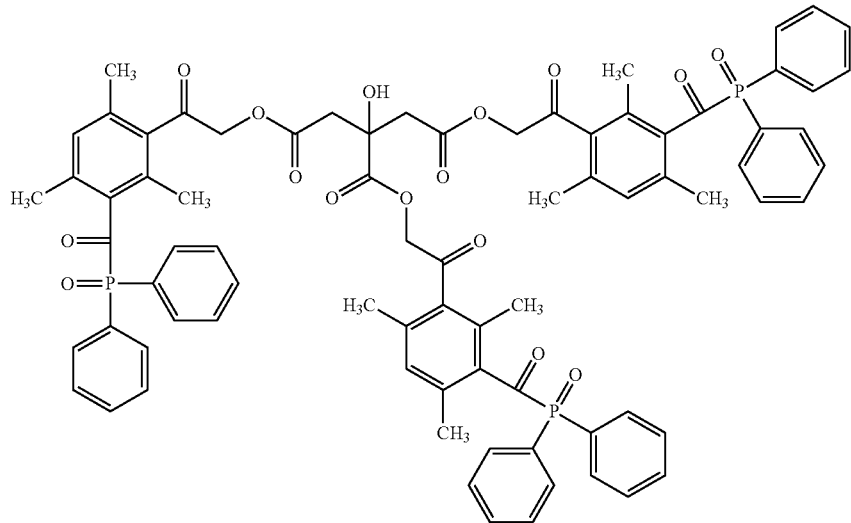

Compound A3-(3)
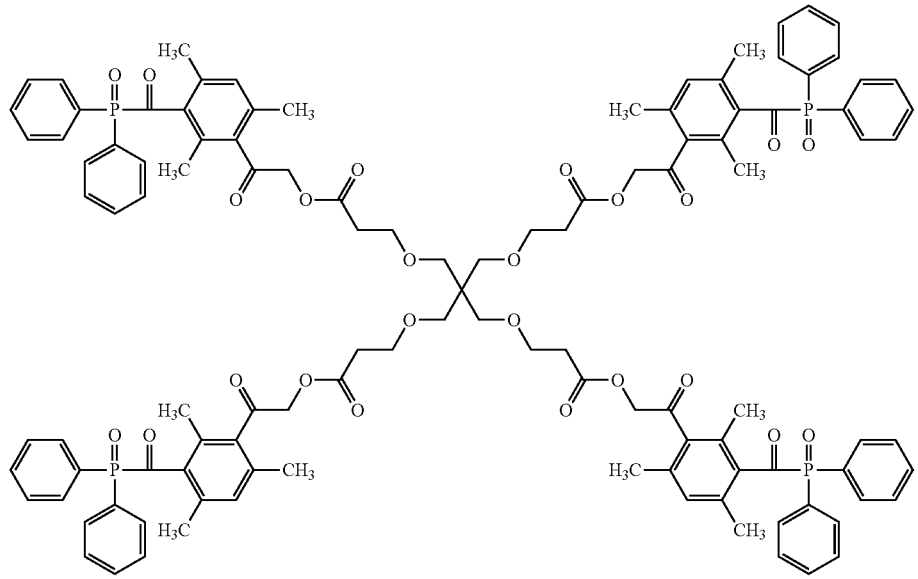
Compound A3-(4)
Compound A3-(5)
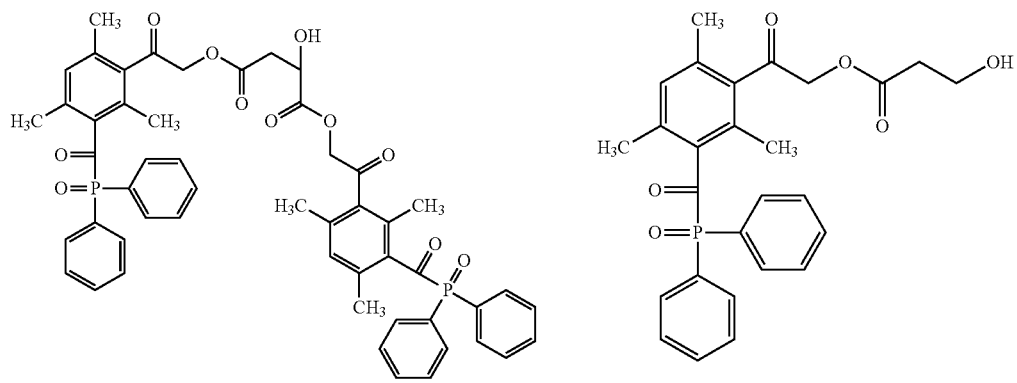
Compound A3-(6)
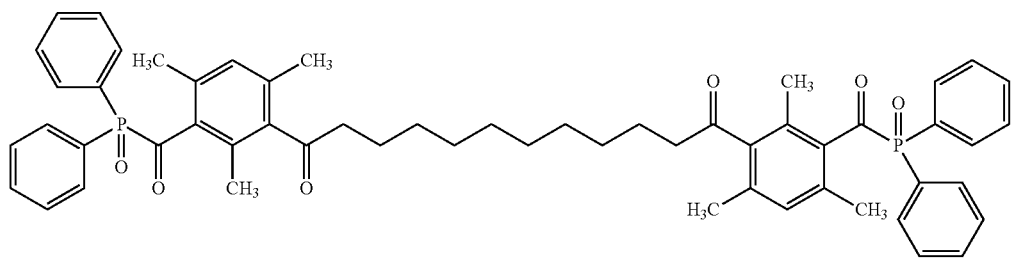
Compound A3-(7)
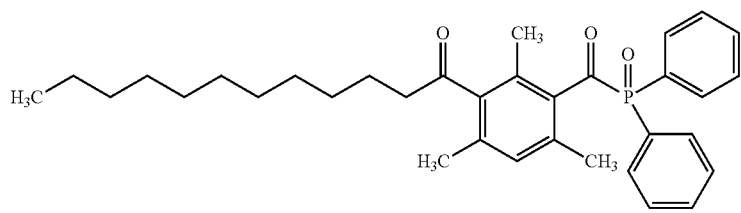

Compound A3-(8)
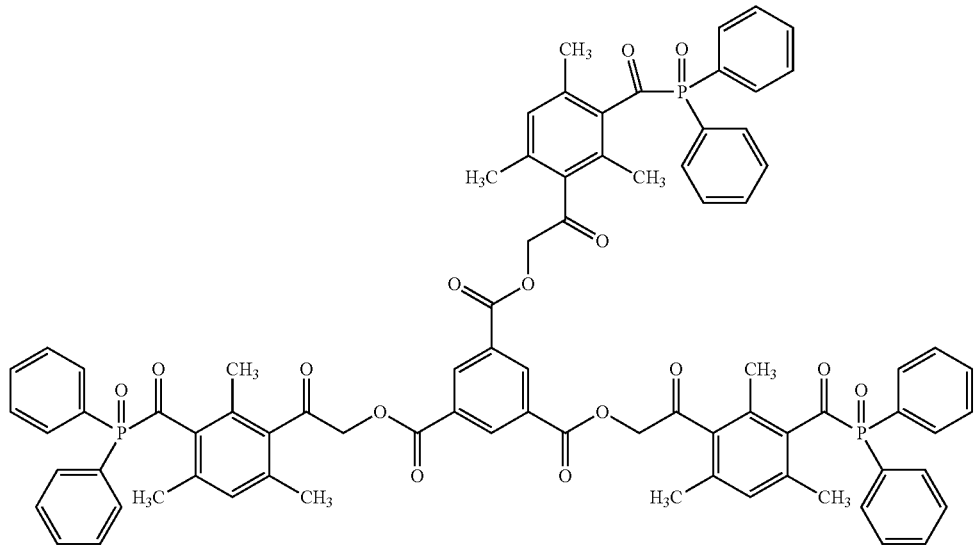
Compound A3-(9)
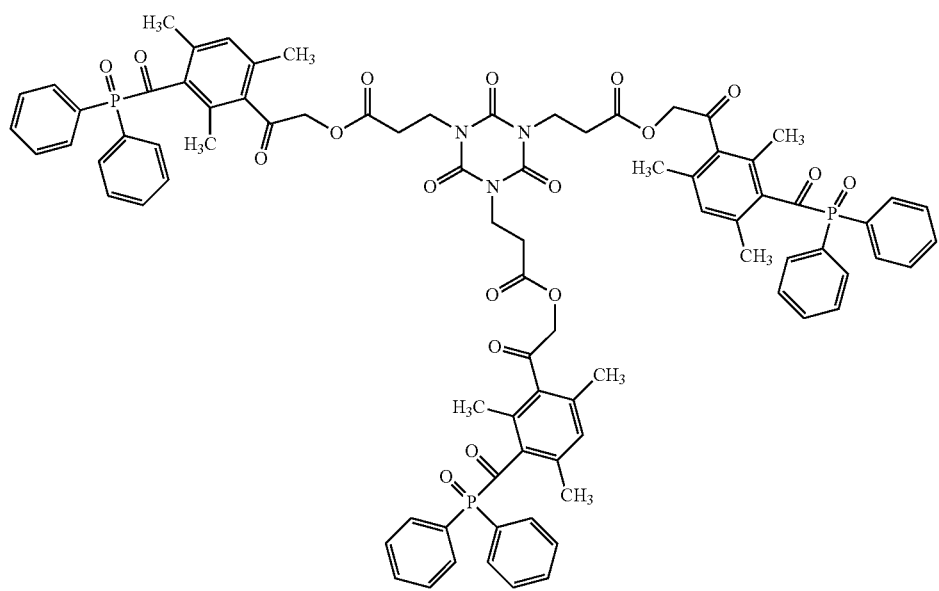

Compound A3-(10)

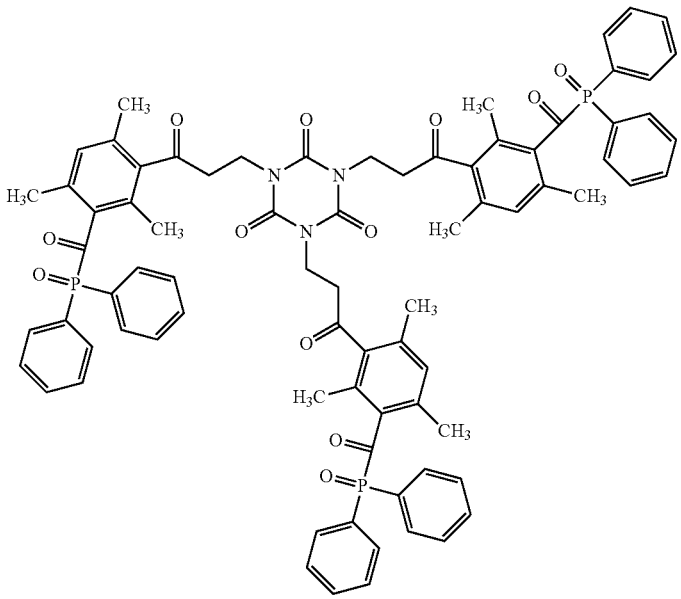

<Producing Method of Photopolymerization Initiator>

A producing method of a photopolymerization initiator of the present disclosure is not particularly limited, and preferred examples thereof include a method including a step of reacting an acylphosphine oxide compound having one or more aromatic acyl groups that bond to a phosphorus atom with an acid halide or an acid anhydride in the presence of a Lewis acid.

In a case in which a Friedel-Crafts acylation reaction is caused with respect to the acylphosphine oxide compound using an acid halide or an acid anhydride in the presence of a Lewis acid, it is possible to easily obtain the photopolymerization initiator of the present disclosure at a favorable yield.

The acylphosphine oxide compound having one or more aromatic acyl groups that bond to a phosphorus atom may be appropriately selected depending on a desired photopolymerization initiator, and preferred examples thereof include a monoaromatic acyldiaryl phosphine oxide compound and bisaromatic acylmonoaryl phosphine oxide compound.

The acid halide or the acid anhydride is preferably an acid chloride from the viewpoint of reactivity. In addition, the acid halide or the acid anhydride is preferably a carboxylic halide or a carboxylic anhydride and more preferably a carboxylic chloride.

As the Lewis acid, Lewis acids that are used in the Friedel-Crafts acylation reaction can be preferably used.

The Lewis acid being used is preferably a zinc compound such as zinc chloride, zinc bromide, or zinc acetate, an aluminum compound such as aluminum chloride, aluminum bromide, or diethylaluminum chloride, an iron compound such as iron chloride or iron bromide, a bismuth compound such as bismuth (III) chloride, a boron compound such as boron trifluoride, boron trichloride, or tris(pentafluorophenyl) boron, a titanium compound such as titanium tetrachloride, a zirconium compound such as zirconium chloride, a tin compound such as tin tetrachloride or tin trichloride, an indium compound such as indium chloride, or a trifluoromethane sulfonic acid compound that is stable in water or a hydrate thereof such as copper (II) trifluoromethanesulfonate, lanthanum (III) trifluoromethanesulfonate, zinc (II) trifluoromethanesulfonate, silver trifluoromethanesulfonate, ytterbium (III) trifluoromethanesulfonate, scandium (III) trifluoromethanesulfonate, hafnium (IV) trifluoromethanesulfonate, or ytterium (III) trifluoromethanesulfonate, more preferably an aluminum compound, an iron compound, a tin compound, or a zinc compound, and particularly preferably an aluminum compound, an iron compound, or a zinc compound. In the case of the above-described aspect, reactivity and compound stability are excellent, and furthermore, raw materials can be easily procured.

The reaction temperature and the reaction time in the step are not particularly limited, may be appropriately set depending on the progress status of the reaction, but the reaction temperature is preferably 0° C. to 40° C.

In the step, a solvent is preferably used. The solvent is not particularly limited, and examples thereof include a halogen-based solvent, an aliphatic hydrocarbon-based solvent, and nitrobenzene. Among these, a halogen-based solvent is preferred, and dichloromethane is particularly preferred.

In addition, after the step, purification is preferably carried out using a well-known method such as column chromatography, thin layer chromatography (TLC), recrystallization, or reprecipitation.

(Polymerizable Composition)

A polymerizable composition of the present disclosure includes the photopolymerization initiator of the present disclosure and a polymerizable compound.

The polymerizable composition of the present disclosure is an ink composition that can be cured by active radiation. The "active radiation" refers to radiation capable of imparting energy that generates initiating species in the polymerizable composition by irradiation with the active radiation, and examples thereof include an α ray, a γ ray, an X-ray, an ultraviolet ray, a visible light ray, an electron beam, and the like. Among these, from the viewpoint of curing sensitivity and the ease of device procurement, an ultraviolet ray and electron beam are preferred, and an ultraviolet ray is more preferred.

In addition, the polymerizable composition of the present disclosure is an active radiation-curable polymerizable composition and is preferably an oily polymerizable composition. The polymerizable composition of the present disclosure preferably does not contain water and a volatile solvent as much as possible, and, even in a case in which the polymerizable composition contains water and a volatile solvent, the content thereof is preferably 5% by mass or less, more preferably 1% by mass or less, and still more preferably 0.5% by mass or less of the total mass of the polymerizable composition.

In addition, the polymerizable composition of the present disclosure can be used in a variety of uses such as an ink composition, a resist, an image recording layer of a planographic printing plate, a coating agent, paint, an adhesive, a pressure sensitive adhesive, a coating, a functional film, a film, an optical material, a printing plate material, a semiconductor material, a recording material, a paper additive, a medical material, plastic, a functional gel, and a cosmetic material. Among these, the polymerizable composition preferably can be used as an ink composition and more preferably can be used as an ink composition for ink jet recording (also referred to as "ink jet ink composition").

In the polymerizable composition of the present disclosure, one kind of the photopolymerization initiator of the present disclosure may be used singly or two or more kinds of the photopolymerization initiators may be jointly used.

The content of the photopolymerization initiator of the present disclosure in the polymerizable composition of the present disclosure is not particularly limited, but is preferably 0.1% to 20% by mass, more preferably 1% to 15% by mass, still more preferably 3% to 10% by mass, and particularly preferably 4% to 8% by mass of the total mass of the polymerizable composition. In the above-described range, the curing property is excellent.

<Polymerizable Compound>

The polymerizable composition of the present disclosure includes a polymerizable compound.

The polymerizable compound is not particularly limited as long as the polymerizable compound is a compound which causes a polymerization reaction by imparting any type of energy to be cured and can be used in any form of a monomer, an oligomer, or a polymer, but a variety of well-known polymerizable monomers that are known as radical polymerizable monomers causing a polymerization reaction from an initiating species that is generated from a polymerization initiator which is added as desired are particularly preferred.

In addition, the polymerizable compound is preferably an ethylenically unsaturated compound.

One kind of the polymerizable compound can be used singly or two or more kinds of the polymerizable compounds can be used in a mixed form for the purpose of adjusting the reaction rate, the physical properties of cured films, the physical property of the composition, and the like. In addition, the polymerizable compound may be a monofunctional compound or a polyfunctional compound. There is a tendency that an increase in the fraction of the monofunctional polymerizable compound is more likely to produce a soft cured substance and an increase in the fraction of the polyfunctional polymerizable compound produces a superior curing property. Therefore, the fractions of the monofunctional polymerizable compound and the polyfunctional polymerizable compound are arbitrarily determined depending on use.

As the polymerizable compound, it is possible to preferably use a variety of well-known radical polymerizable compounds that cause a polymerization reaction from an initiating species which is generated from a photo-radical initiator.

Examples of the radical polymerizable compound include (meth)acrylates, (meth)acrylamides, aromatic vinyls, and the like. Meanwhile, in the present specification, there are cases in which any or both of "acrylate" and "methacrylate" are indicated as "(meth)acrylate" and any or both of "acryl" and "methacryl" are indicated as "(meth)acryl".

Examples of the (meth)acrylates that are used as the radical polymerizable compound include monofunctional (meth)acrylate, difunctional (meth)acrylate, trifunctional (meth)acrylate, tetrafunctional (meth)acrylate, pentafunctional (meth)acrylate, hexafunctional (meth)acrylate, and the like.

Examples of the monofunctional (meth)acrylate include hexyl (meth)acrylate, 2-ethylhexyl (meth)acrylate, tert-octyl (meth)acrylate, isoamyl (meth)acrylate, decyl (meth)acrylate, isodecyl (meth)acrylate, stearyl (meth)acrylate, isostearyl (meth)acrylate, cyclohexyl (meth)acrylate, 4-n-butylcyclohexyl (meth)acrylate, bornyl (meth)acrylate, isobornyl (meth)acrylate, benzyl (meth)acrylate, 2-ethylhexyl diglycol (meth)acrylate, butoxyethyl (meth)acrylate, 2-chloroethyl (meth)acrylate, 4-bromobutyl (meth)acrylate, cyanoethyl (meth)acrylate, benzyl (meth)acrylate, butoxymethyl (meth)acrylate, 3-methoxybutyl (meth)acrylate, 2-(2-butoxyethoxy)ethyl (meth)acrylate, 2-(2-methoxyethoxy)ethyl (meth)acrylate, 2,2,2-tetrafluoroethyl (meth)acrylate, 1H,1H,2H,2H-perfluorodecyl (meth)acrylate, 4-butylphenyl (meth)acrylate, phenyl (meth)acrylate, 2,4,5-tetramethylphenyl (meth)acrylate, 4-chlorophenyl (meth)acrylate, phenoxymethyl (meth)acrylate, phenoxyethyl (meth)acrylate, glycidyl (meth)acrylate, glycidyloxybutyl (meth)acrylate, glycidyloxyethyl (meth)acrylate, glycidyloxypropyl (meth)acrylate, tetrahydrofurfuryl (meth)acrylate, 2-hydroxyethyl (meth)acrylate, 3-hydroxypropyl (meth)acrylate, 2-hydroxypropyl (meth)acrylate, 2-hydroxybutyl (meth)acrylate, 4-hydroxybutyl (meth)acrylate, 3-hydroxybutyl (meth)acrylate, dimethylaminoethyl (meth)acrylate, diethylaminoethyl (meth)acrylate, dimethylaminopropyl (meth)acrylate, diethylaminopropyl (meth)acrylate, trimethoxysilylpropyl (meth)acrylate, trimethylsilylpropyl (meth)acrylate, polyethylene oxide monomethyl ether (meth)acrylate, oligoethylene oxide monomethyl ether (meth)acrylate, polyethylene oxide (meth)acrylate, oligoethylene oxide (meth)acrylate, oligoethylene oxide monoalkyl ether (meth)acrylate, polyethylene oxide monoalkyl ether (meth)acrylate, dipropylene glycol (meth)acrylate, polypropylene oxide monoalkyl ether (meth)acrylate, oligopropylene oxide monoalkyl ether (meth)acrylate, 2-methacryloyloxy ethyl succinate, 2-methacryloyloxy hexahydrophthalate, 2-methacryloyloxyethyl-2-hydroxypropyl phthalate, butoxydiethylene glycol (meth)acrylate, trifluoroethyl (meth)acrylate, perfluorooctylethyl (meth)acrylate, 2-hydroxy-3-phenoxypropyl (meth)acrylate, ethylene oxide (EO)-modified phenol (meth)acrylate, EO-modified cresol (meth)acrylate, EO-modified nonylphenol (meth)acrylate, propylene oxide (PO)-modified nanophenol (meth)acrylate, EO-modified-2-ethylhexyl (meth)acrylate, dicyclopentenyl (meth)acrylate, dicyclopentenyloxyethyl (meth) acrylate, dicyclopentanyl (meth)acrylate, (3-ethyl-3-oxetanylmethyl) (meth)acrylate, and phenoxyethylene glycol (meth)acrylate.

Examples of the difunctional (meth)acrylate include 1,6-hexanediol di(meth) acrylate, 1,10-decanediol di(meth)acrylate, neopentyl glycol di(meth)acrylate, 2,4-methyl-1,5-pentanediol di(meth)acrylate, 3-methyl-1,5-pentanediol di(meth)acrylate, butylethylpropanediol di(meth)acrylate, ethoxylated cyclohexane di(meth)acrylate, polyethylene glycol di(meth)acrylate, oligoethylene glycol di(meth)acrylate, ethylene glycol di(meth)acrylate, 2-ethyl-2-butylbutanediol di(meth)acrylate, hydroxypivalic acid neopentyl glycol di(meth)acrylate, EO-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth) acrylate, propoxylated ethoxylated bisphenol A di(meth) acrylate, tricyclodecane di(meth)acrylate, dipropylene glycol di(meth)acrylate, tripropylene glycol di(meth)acrylate, PO-modified neopentyl glycol di(meth)acrylate, and the like.

Examples of the trifunctional (meth)acrylate include trimethylolpropane tri(meth)acrylate, trimethylolethane tri (meth)acrylate, alkylene oxide-modified tri(meth)acrylate of trimethylol propane, pentaerythritol tri(meth)acrylate, dipentaerythritol tri(meth)acrylate, trimethylolpropane tri ((meth)acryloyloxypropyl) ether, isocyanuric acid alkylene oxide-modified tri(meth)acrylate, propionic acid dipentaerythritol tri(meth)acrylate, tri((meth)acryloyloxyethyl) isocyanurate, hydroxypivaldehyde-modified dimethylol propane tri(meth)acrylate, sorbitol tri(meth)acrylate, propoxylated trimethylol propane tri(meth)acrylate, ethoxylated glycerin triacrylate, and the like.

Examples of the tetrafunctional (meth)acrylate include pentaerythritol tetra(meth)acrylate, sorbitol tetra(meth)acrylate, ditrimethylolpropane tetra(meth)acrylate, propionic acid dipentaerythritol tetra(meth)acrylate, ethoxylated pentaerythritol tetra(meth)acrylate, and the like.

Examples of the pentafunctional (meth)acrylate include sorbitol penta(meth)acrylate and dipentaerythritol penta(meth)acrylate.

Examples of the hexafunctional (meth)acrylate include dipentaerythritol hexa(meth)acrylate, sorbitol hexa(meth)acrylate, alkylene oxide-modified hexa(meth)acrylate of phosphazene, ε-caprolactone-modified dipentaerythritol hexa(meth)acrylate, and the like.

Examples of the (meth)acrylamides that are used as the radical polymerizable compound include (meth)acrylamide, N-methyl(meth)acrylamide, N-ethyl(meth)acrylamide, N-propyl(meth)acrylamide, N-n-butyl(meth)acrylamide, N-t-butyl(meth)acrylamide, N-butoxymethyl(meth)acrylamide, N-isopropyl(meth)acrylamide, N-methylol(meth) acrylamide, N,N-dimethyl(meth)acrylamide, N,N-diethyl (meth)acrylamide, and (meth)acryloylmorpholine.

Examples of the aromatic vinyls that are used as the radical polymerizable compound include styrene, dimethylstyrene, trimethylstyrene, isopropylstyrene, chloromethylstyrene, methoxystyrene, acetoxystyrene, chlorostyrene, dichlorostyrene, bromostyrene, methyl vinylbenzoic acid ester, 3-methylstyrene, 4-methylstyrene, 3-ethylstyrene, 4-ethylstyrene, 3-propyl styrene, 4-propyl styrene, 3-butyl styrene, 4-butyl styrene, 3-hexyl styrene, 4-hexyl styrene, 3-octyl styrene, 4-octyl styrene, 3-(2-ethylhexyl) styrene, 4-(2-ethylhexyl) styrene, allylstyrene, isopropenyl styrene, butenylstyrene, octenylstyrene, 4-t-pentoxycarbonylstyrene, 4-t-butoxystyrene, and the like.

Furthermore, examples of the radical polymerizable compound that is used in the present disclosure include vinyl esters (vinyl acetate, vinyl propionate, vinyl versatate, and the like), allyl esters (allyl acetate and the like), halogen-containing monomers (vinylidene chloride, vinyl chloride, and the like), vinyl ethers (methylvinyl ether, butylvinyl ether, hexylvinyl ether, methoxyvinyl ether, 2-ethylhexylvinyl ether, methoxyethylvinyl ether, cyclohexylvinyl ether, chloroethylvinyl ether, triethylene glycol divinyl ether, and the like), vinyl cyanides ((meth)acrylonitrile and the like), olefins (ethylene, propylene, and the like), N-vinyl lactams (N-vinyl caprolactam and the like), and the like.

More specifically, it is possible to use the commercially available products described in "Crosslinking Agent Handbook" by Shinjo Yamashita (1981, Taiseisha Ltd.); "UVEB Curing Handbook (Raw Material Edition)" by Kiyomi Kato (1985, Polymer Publication Association); "Applications and Markets of UVEB Curing Technology" by RadTech Japan, page 79 (1989, published by CMC); "Polyester Resin Handbooks" by Eiichiro Takiyama (1988, manufactured by Nikkan Kogyo Shimbun, Ltd.), and the like and radical polymerizable or crosslinking monomers, oligomers, and polymers that are well-known in the industrial field.

One kind of the polymerizable compound may be used singly or two or more kinds of the polymerizable compounds may be jointly used. In a case in which two or more kinds of the polymerizable compounds are jointly used, a combination of (meth)acrylates and vinyl ethers is preferred from the viewpoint of the curing property. In addition, in the polymerizable compound of the present disclosure, the content of a vinyl ether is preferably 1% to 40% by mass, more preferably 2% to 30% by mass, and particularly preferably 8% to 25% by mass of the total mass of (meth) acrylate.

The content of the polymerizable compound in the polymerizable composition of the present disclosure is also dependent on the use thereof, but is preferably 10% to 95% by mass and more preferably 20% to 90% by mass of the total mass of the polymerizable composition from the viewpoint of the curing property.

In addition, the content ratio (mass ratio) between the photopolymerization initiator of the present disclosure and the polymerizable compound in the polymerizable composition of the present disclosure is preferably 1:5 to 1:1,000, more preferably 1:7 to 1:200, and still more preferably 1:10 to 1:100 (the photopolymerization initiator: the polymerizable compound).

<Colorant>

In the case of being used in an ink composition or the like, the polymerizable composition of the present disclosure may include a colorant.

The colorant is not particularly limited, but is preferably a pigment or an oil-soluble dye which has excellent weather fastness and rich color reproducibility, and can be arbitrarily selected from well-known colorants such as soluble dyes and used. As the colorant, a compound that does not function as a polymerization inhibitor is preferably selected since the compound does not degrade the sensitivity of a curing reaction by active radiation.

The pigment is not particularly limited and can be appropriately selected according to the purpose, and examples thereof include well-known organic pigments, inorganic pigments, and the like, and additionally, further include resin particles dyed by a dye and commercially available pigment dispersions or surface-treated pigments (for example, a dispersion obtained by dispersing a pigment in an insoluble resin or the like as a dispersion medium, a pigment having a surface on which a resin is grafted, and the like). Meanwhile, examples of the pigment include the pigments described in "Pigment Dictionaries" (2000) by Seishirou Itoh, W. Herbst, K. Hunger "Industrial Organic Pigments", JP2002-12607A, JP2002-188025A, JP2003-26978A, and JP2003-342503A.

Examples of the organic pigment and the inorganic pigment include a yellow pigment, a magenta pigment, a blue or cyan pigment, a green pigment, an orange pigment, a brown pigment, a violet pigment, a black pigment, a white pigment, and the like.

The yellow pigment is a pigment exhibiting a yellow color, and examples thereof include monoazo pigments such as C. I. Pigment Yellow 1 (Fast Yellow G and the like) and C. I. Pigment Yellow 74, disazo pigments such as C. I. Pigment Yellow 12 (Disazo Yellow and the like), C. I. Pigment Yellow 17, C. I. Pigment Yellow 97, C. I. Pigment Yellow 3, C. I. Pigment Yellow 16, C. I. Pigment Yellow 83, C. I. Pigment Yellow 155, and C. I. Pigment Yellow 219, non-benzidine-based azo pigments such as C. I. Pigment Yellow 180, azo lake pigments such as C. I. Pigment Yellow 100 (Tartrazine Yellow Lake and the like), condensed azo pigments such as C. I. Pigment Yellow 95 (Condensed Azo Yellow and the like), C. I. Pigment Yellow 93, C. I. Pigment Yellow 94, C. I. Pigment Yellow 128, and C. I. Pigment Yellow 166, acidic dye lake pigments such as C. I. Pigment Yellow 115 (Quinoline Yellow Lake and the like), basic dye lake pigments such as C. I. Pigment Yellow 18 (Thioflavin Lake and the like), anthraquinone pigments such as C. I. Pigment Yellow 24 (Flavanthrone Yellow and the like), quinophthalone pigments such as C. I. Pigment Yellow 110 (Quinophthalone Yellow and the like), isoindoline pigments such as C. I. Pigment Yellow 139 (Isoindoline Yellow and the like), pyrazolone pigments such as C. I. Pigment Yellow 60 (Pyrazolone Yellow and the like), acetron pigments such as C. I. Pigment Yellow 120, C. I. Pigment Yellow 154, C. I. Pigment Yellow 167, C. I. Pigment Yellow 151, C. I. Pigment Yellow 175, C. I. Pigment Yellow 180, C. I. Pigment Yellow 181, C. I. Pigment Yellow 185, and C. I. Pigment Yellow 194, metal complex salt pigments such as C. I. Pigment Yellow 150, nitroso pigments such as C. I. Pigment Yellow 153 (Nickel Nitroso Yellow and the like), metal complex salt azomethine pigments such as C. I. Pigment Yellow 117 (Copper Azomethine Yellow and the like), and the like.

The magenta pigment is a pigment exhibiting a red or magenta color, and examples thereof include monoazo-based pigments such as C. I. Pigment Red 3 (Toluidine Red and the like), B-naphthol pigments such as C. I. Pigment Red 1, C. I. Pigment Red 4, and C. I. Pigment Red 6, disazo pigments such as C. I. Pigment Red 38 (Pyrazolone Red B and the like), azo lake pigments such as C. I. Pigment Red 53:1 (Lake Red C and the like), C. I. Pigment Red 57:1 (Brilliant Carmine 6B and the like), C. I. Pigment Red 52:1, and C. I. Pigment Red 48 (B-Oxynaphthoic Acid Lake and the like), condensed azo pigments such as C. I. Pigment Red 144, C. I. Pigment Red 166, C. I. Pigment Red 220, C. I. Pigment Red 214, C. I. Pigment Red 221, C. I. Pigment Red 242 (Condensed Azo Red and the like), acidic dye lake pigments such as C. I. Pigment Red 174 (Phloxine B Lake and the like), C. I. Pigment Red 172 (Ellis Rosin Lake and the like), basic dye lake pigments such as C. I. Pigment Red 81 (Rhodamine 6G' Lake and the like), anthraquinone-based pigments such as C. I. Pigment Red 177 (Dianthraquinonyl Red and the like), thioindigo pigments such as C. I. Pigment Red 88 (Thioindigo Bordeaux and the like), perinone pigments such as C. I. Pigment Red 194 (Perinone Red and the like), perylene pigments such as C. I. Pigment Red 149, C. I. Pigment Red 179, C. I. Pigment Red 178, C. I. Pigment Red 190, C. I. Pigment Red 224, and C. I. Pigment Red 123, quinacridone pigments such as C. I. Pigment Violet 19 (unsubstituted quinacridone), C. I. Pigment Red 122, C. I. Pigment Red 262, C. I. Pigment Red 207, and C. I. Pigment Red 209, isoindolinone pigments such as C. I. Pigment Red 180 (Isoindolinone Red 2BLT and the like), alizarin lake pigments such as C. I. Pigment Red 83 (Madder Lake and the like), naphtholon pigments such as C. I. Pigment Red 171, C. I. Pigment Red 175, C. I. Pigment Red 176, C. I. Pigment Red 185, and C. I. Pigment Red 208, naphthol AS-based pigments such as C. I. Pigment Red 247, naphthol AS pigments such as C. I. Pigment Red 2, C. I. Pigment Red 5, C. I. Pigment Red 21, C. I. Pigment Red 170, C. I. Pigment Red 187, C. I. Pigment Red 256, C. I. Pigment Red 268, and C. I. Pigment Red 269, diketo-pyrrolo-pyrrole pigments such as C. I. Pigment Red 254, C. I. Pigment Red 255, C. I. Pigment Red 264, and C. I. Pigment Red 272, and the like.

The cyan pigment is a pigment exhibiting a blue or cyan color, and examples thereof include disazo-based pigments such as C. I. Pigment Blue 25 (Dianisidine Blue and the like), phthalocyanine pigments such as C. I. Pigment Blue 15, C. I. Pigment Blue 15:1, C. I. Pigment Blue 15:2, C. I. Pigment Blue 15:3, C. I. Pigment Blue 15:4, C. I. Pigment Blue 15:6, and C. I. Pigment Blue 16 (Phthalocyanine Blue and the like), acidic dye lake pigments such as C. I. Pigment Blue 24 (Peacock Blue Lake and the like), basic dye lake pigments such as C. I. Pigment Blue 1 (Victoria Pure Blue BO Lake and the like), anthraquinone-based pigments such as C. I. Pigment Blue 60 (Indanthrone Blue and the like), alkali blue pigments such as C. I. Pigment Blue 18 (Alkali Blue V-5:1), and the like.

The green pigment is a pigment exhibiting a green color, and examples thereof include phthalocyanine pigments such as C. I. Pigment Green 7 (Phthalocyanine Green) and C. I. Pigment Green 36 (Phthalocyanine Green), azo metal complex pigments such as C. I. Pigment Green 8 and C. I. Pigment Green 10, and the like.

The orange pigment is a pigment exhibiting an orange color, and examples thereof include isoindoline-based pigments such as C. I. Pigment Orange 66 (Isoindoline Orange), anthraquinone-based pigments such as C. I. Pigment Orange 51 (Dichloropyranthrone Orange), B-naphtol pigments such as C. I. Pigment Orange 2, C. I. Pigment Orange 3, and C. I. pigment Orange 5, naphthol AS pigments such as C. I. Pigment Orange 4, C. I. Pigment Orange 22, C. I. Pigment Orange 24, C. I. Pigment Orange 38, and C. I. Pigment Orange 74, isoindolinone pigments such as C. I. Pigment Orange 61, perinone pigments such as C. I. Pigment Orange 43, disazo pigments such as C. I. Pigment Orange 15 and C. I. Pigment Orange 16, quinacridone pigments such as C. I. Pigment Orange 48 and C. I. Pigment Orange 49, acetolone pigments such as C. I. Pigment Orange 36, C. I. Pigment Orange 62, C. I. Pigment Orange 60, C. I. Pigment Orange 64, and C. I. Pigment Orange 72, pyrazolone pigments such as C. I. Pigment Orange 13 and C. I. Pigment Orange 34, and the like.

The brown pigment is a pigment exhibiting a brown color, and examples thereof include naphtholon pigments such as C. I. Pigment Brown 25 and C. I. Pigment Brown 32 and the like.

The violet pigment is a pigment exhibiting a violet color, and examples thereof include naphtholon pigments such as C. I. Pigment Violet 32, perylene pigments such as C. I. Pigment Violet 29, naphthol AS pigments such as C. I. Pigment Violet 13, C. I. Pigment Violet 17, and C. I. Pigment Violet 50, dioxazine pigment such as C. I. Pigment Violet 23 and C. I. Pigment Violet 37, and the like.

The black pigment is a pigment exhibiting a black color, and examples thereof include carbon black such as MOGUL E, titanium black, indazine pigments such as C. I. Pigment Black 1 (Aniline Black), perylene pigments such as C. I. Pigment Black 31 and C. I. Pigment Black 32, and the like.

Examples of the white pigment include basic lead carbonate ($2PbCO_3Pb(OH)_2$, so-called silver white), zinc oxide (ZnO, so-called zinc white), titanium oxide ($TiO_2$, so-called titanium white), strontium titanate ($SrTiO_3$, so-called titanium strontium white), and the like. Inorganic particles that are used in the white pigment may be a single body or may be, for example, an oxide of silicon, aluminum, zirconium, titanium, or the like, an organic metal compound, or composite particles with an organic compound.

Among these, the titanium oxide is preferably used since the titanium oxide has a smaller specific weight and a larger refractive index than other white pigments and is also chemically and physically stable and thus have a great covering force and a great coloring force as a pigment and, furthermore, has excellent durability with respect to acids, alkalis, and other environments. Meanwhile, other white pigments (which may be white pigments other than the white pigments described above) may be jointly used with the titanium oxide.

For the dispersion of the pigment, it is possible to preferably use a dispersion apparatus, for example, a ball mill, a sand mill, an attritor, a roll mill, a jet mill, a homogenizer, a paint shaker, a kneader, an agitator, a Henschel mixer, a colloid mill, an ultrasound homogenizer, a pearl mill, or a wet-type jet mill.

In the present disclosure, during the dispersion of the pigment, a dispersant described below is particularly preferably added.

In addition, during the dispersion of the pigment, as a dispersion aid, a synergist suitable for a variety of pigments may be added as necessary. The content of the dispersion aid in the polymerizable composition is preferably 1 to 50 parts by mass with respect to 100 parts by mass of the pigment.

The dispersion medium that is used during the dispersion of the pigment in the polymerizable composition is not particularly limited and can be appropriately selected depending on the purpose, and, for example, the polymerizable compound having a low molecular weight may be used as the dispersion medium or the solvent may be used as the dispersion medium. However, the polymerizable composition of the present disclosure is a radiation-curable polymerizable composition, and, for example, since the polymerizable composition is cured after being applied onto a recording medium, solvents are preferably not contained. This is because, in a case in which a solvent remains in a cured substance, the solvent resistance deteriorates, and a problem of a volatile organic compound (VOC) of the remaining solvent is caused. Therefore, it is preferable to use the polymerizable compound as the dispersion medium and select, particularly, a polymerizable compound having the lowest viscosity from the viewpoint of improving dispersion suitability or the handleability of the polymerizable composition.

The average particle diameter of the pigment is not particularly limited, and can be appropriately selected depending on the purpose, but is preferably approximately 0.01 µm to 0.4 µm and more preferably 0.02 µm to 0.2 µm since the color developability becomes superior as the particles become finer. In addition, the maximum particle diameter of the pigment is preferably 3 µm or less and more preferably 1 µm or less. The particle diameter of the pigment can be adjusted by means of the selection of the pigment, the dispersant, and a dispersion medium, the setting of dispersion conditions and filtration conditions, and the like, and it is possible to suppress the clogging of head nozzles and maintain the preservation stability of ink, the ink transparency, and the curing sensitivity by controlling the particle diameter of the pigments.

Meanwhile, the particle diameter of the pigment can be measured using a well-known measurement method. Specifically, the particle diameter can be measured using a centrifugal sedimentation light transmission method, an X-ray transmission method, a laser diffraction and scattering method, or a dynamic light scattering method.

One kind of the colorant may be used singly or two or more kinds of the colorants may be jointly used.

The content of the colorant in the polymerizable composition is appropriately selected depending on color and intended uses and is preferably 0.01% to 30% by mass of the mass of the entire polymerizable composition.

<Additional Polymerization Initiators>

The polymerizable composition of the present disclosure may further contain an additional polymerization initiator other than the photopolymerization initiator of the present disclosure as necessary, but preferably does not contain any additional polymerization initiator.

Examples of the additional polymerization initiator include photopolymerization initiators other than the photopolymerization initiator of the present disclosure and thermopolymerization initiators, polymerization initiators for radical polymerization or cation polymerization are preferred, and radical polymerization initiators are particularly preferred. It is possible to use, for example, the polymerization initiator described in JP2009-138172A.

One kind of the additional polymerization initiator may be used singly or two or more kinds of the additional polymerization initiators may be jointly used.

The total content of the additional polymerization initiators is preferably 10% by mass or less, more preferably 5% by mass or less, still more preferably 1% by mass or less, and particularly preferably 0% by mass of the entire polymerizable composition. In the above-described range, the curing property is excellent.

In addition, the total content of the additional polymerization initiator is preferably smaller than the content of the photopolymerization initiator of the present disclosure.

<Dispersant>

The polymerizable composition of the present disclosure may further contain a dispersant. Particularly, in a case in which the pigment is used, the polymerizable composition preferably contains a dispersant in order to stably disperse the pigment in the polymerizable composition. The dispersant is preferably a polymer dispersant. Meanwhile, the "polymer dispersant" in the present disclosure refers to a dispersant having a weight-average molecular weight of 1,000 or more.

Examples of the polymer dispersant include DISPERBYK-101, DISPERBYK-102, DISPERBYK-103, DISPERBYK-106, DISPERBYK-111, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-174, and DISPERBYK-182 (manufactured by BYK Chemie); EFKA4010, EFKA4046, EFKA4080, EFKA5010, EFKA5207, EFKA5244, EFKA6745, EFKA6750, EFKA7414, EFKA745, EFKA7462, EFKA7500, EFKA7570, EFKA7575, EFKA7580, and EFKA7701 (manufactured by Efka Additives); DISPERSE AID 6, DISPERSE AID 8, DISPERSE AID 15, and DISPERSE AID 9100 (manufactured by San Nopco Limited); a variety of SOLSPERSE dispersants (manufactured by Noveon) such as SOLSPERSE 3000, 5000, 9000, 12000, 13240, 13940, 17000, 22000, 24000, 26000, 28000, 32000, 36000, 39000, 41000, and 71000; ADEKA PLURONIC L31, F38, L42, L44, L61, L64, F68, L72, P95, F77, P84, F87, P94, L101, P103, F108, L121, and P-123 (manufactured by ADEKA Corporation), IONET S-20 (manufactured by Sanyo Chemical Industries, Ltd.), DISPALON KS-860, 873SN, 874 (polymer dispersants), #2150 (aliphatic polyhydric carboxylic acid), and #7004 (polyether ester-type dispersant) (manufactured by Kusumoto Chemicals, Ltd.).

The content of the dispersant in the polymerizable composition is appropriately selected depending on intended uses and is preferably 0.05% to 15% by mass of the mass of the entire polymerizable composition.

<Surfactant>

The polymerizable composition of the present disclosure may further contain a surfactant.

Examples of the surfactant include the surfactants described in JP1987-173463A (JP-S62-173463A) and JP1987-183457A (JP-S62-183457A). Examples thereof include anionic surfactants such as dialkyl sulfosuccinates, alkylnaphthalene sulfonates, and fatty acid salts, nonionic surfactants such as polyoxyethylene alkyl ethers, polyoxyethylene alkyl allyl ethers, acetylene glycols, polyoxyethylene·polyoxypropylene block copolymers, and cationic surfactants such as alkyl amine salts and quaternary ammonium salts. In addition, as the surfactant, fluorine-based surfactants (for example, an organic fluoro compound and the like) or silicone-based surfactants (for example, a polysiloxane compound and the like) may be used. The organic fluoro compound is preferably hydrophobic. Examples of the organic fluoro compound include fluorine-based surfactants, oil-form fluorine-based compounds (for example, fluorine oil), and solid-like fluorine compound resins (for example, tetrafluoroethylene resins) and include the compounds described in JP1982-9053B (JP-S57-9053B) (Sections 8 to 17) and JP1987-135826A (JP-S62-135826A). The polysiloxane compound is preferably a modified polysiloxane compound in which an organic group is introduced into some of methyl groups in dimethyl polysiloxane. Examples of modification include polyether modification, methyl styrene modification, alcohol modification, alkyl modification, aralkyl modification, fatty acid ester modification, epoxy modification, amine modification, amino modification, mercapto modification, and the like, but the modification is not particularly limited thereto. These modification methods may be used in combination. In addition, among these, a polyether-modified polysiloxane compound is preferred from the viewpoint of the improvement of jetting stability in an ink jet. Examples of the polyether-modified polysiloxane compound include SILWET L-7604, SILWET L-7607N, SILWET FZ-2104, and SILWET FZ-2161 (manufactured by Nippon Unika Co., Ltd.), BYK306, BYK307, BYK331, BYK333, BYK347, and BYK348 (manufactured by BYK Chemie), KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (manufactured by Shin-Etsu Chemical Co., Ltd.).

Among these, silicone-based surfactants are preferred.

The content of the surfactant in the polymerizable composition of the present disclosure is appropriately selected depending on intended uses and is preferably 0.0001% to 1% by mass of the mass of the entire polymerizable composition.

<Solvent>

The polymerizable composition of the present disclosure may further contain a solvent.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic solvents such as benzene and toluene, ester-based solvents such as ethyl acetate, butyl acetate, and isopropyl acetate, ether-based solvents such as diethyl ether, tetrahydrofuran, and dioxane, glycol ether-based solvents such as ethylene glycol monomethyl ether, ethylene glycol dimethyl ether, and tripropylene glycol monomethyl ether, cyclic ester-based solvents such as γ-butyrolactone, amide-based solvents such as 2-methyl pyrrolidone and 2-pyrrolidone, and the like.

In this case, the addition of the solvent that does not cause any problem with the solvent resistance or VOC is effective, and the amount of the solvent is preferably 0.1% to 5% by mass and more preferably 0.1% to 3% by mass of the total mass of the polymerizable composition.

To the polymerizable composition, a solvent may be added as a dispersion medium for a variety of components such as the pigment, or the polymerizable compound may be used as a dispersion medium without adding any solvents, but the polymerizable composition preferably does not contain any solvents.

<Sensitizer>

The polymerizable composition of the present disclosure may further contain a sensitizer.

Examples of the sensitizer include polynuclear aromatic compounds (for example, pyrene, perylene, triphenylene, 2-ethyl-9,10-dimethoxyanthracene, and the like), xanthenes (for example, fluorescein, eosin, erythrosin, rhodamine B, rose bengal, and the like), cyanines (for example, thiacarbocyanine, oxacarbocyanine, and the like), merocyanines (for example, merocyanine, carbomerocyanine, and the like), thiazines (for example, thionine, methylene blue, toluidine blue, and the like), acridines (for example, acridine orange, chloroflavin, acriflavine, and the like), anthraquinones (for example, anthraquinone and the like), squaryliums (for example, squalium and the like), coumarins (for example, 7-diethylamino-4-methylcoumarin and the like), thioxanthones (for example, isopropylthioxanthone and the like), thiochromanones (for example, thiochromanone and the like), and the like. Among these, thioxanthones are preferred as the sensitizer. Examples of the thioxanthones include diethylthioxanthone (DETX), isopropylthioxanthone (ITX), SP7010 (manufactured by Lambson Limited), and the like. Additionally, the sensitizers described in WO2013/146062A also can be used.

<Additional Additives>

The polymerizable composition of the present disclosure may further contain additional additives depending on a variety of uses.

As the additional additives, a variety of well-known additives can be used.

As the additional additives, it is possible to add, for example, an alkali-soluble resin, a co-sensitizer, an ultraviolet absorbent, a basic compound, a leveling additive, a matting agent, a wax, a polymerization inhibitor, an antioxidant, a viscosity imparting agent, and the like.

In a case in which the polymerizable composition of the present disclosure is used as the ink jet ink composition, in consideration of the jettability from an ink jet nozzle of the polymerizable composition, the viscosity of the polymerizable composition at the temperature during jetting is preferably 0.5 to 30 mPa·s, more preferably 0.5 to 20 mPa·s, and most preferably 1 to 15 mPa·s. The compositional ratio is preferably adjusted and determined so as to obtain a viscosity in the above-described range.

Meanwhile, the viscosity of the polymerizable composition at 25° C. (room temperature) is preferably 1 mPa·s or more and 200 mPa·s or less, more preferably 2 mPa·s or more and 50 mPa·s or less, and still more preferably 2.5 mPa·s or more and 30 mPa·s or less. In a case in which the viscosity at room temperature is set to be high, even in the case of using a porous recording medium, the permeation of the polymerizable composition into the recording medium is prevented, it becomes possible to reduce non-cured monomers, furthermore, it is possible to suppress the bleeding of dots during the landing of liquid droplets, and consequently, image quality improves. In addition, in a case in which the viscosity of the polymerizable composition at 25° C. is 200 mPa·s or less, the delivery of the polymerizable composition to an ink jet head or the like in a device is easy.

Meanwhile, as the viscosity of the composition of the present disclosure, a value measured using VISCOMETER TV-22 (manufactured by Toki Sangyo Co., Ltd.) under the above-described temperature condition is used.

In a case in which the polymerizable composition of the present disclosure is used as the ink jet ink composition, the surface tension of the polymerizable composition is preferably 20 to 40 mN/m and more preferably 23 to 35 mN/m. In a case in which recording is carried out on a variety of recording media such as a polyolefin, PET, coated paper, and uncoated paper, the surface tension is preferably 20 mN/m or more from the viewpoint of bleeding and permeation and preferably 40 mN/m or less from the viewpoint of wettability.

Meanwhile, as the surface tension of the composition of the present disclosure, a value measured using Automatic Surface Tensiometer CBVP-Z (manufactured by Kyowa Interface Science Co., Ltd.) under a condition of a liquid temperature of 25° C.

(Ink Jet Recording Method)

The polymerizable composition of the present disclosure can be preferably used as the ink jet ink composition.

An ink jet recording method of the present disclosure is not particularly limited, but preferably includes a step of jetting the polymerizable composition of the present disclosure onto a recording medium (a support, a recording material, or the like) using an ink jet method and a step of curing the polymerizable composition by irradiating the jetted polymerizable composition with active radiation. The ink jet recording method of the present disclosure includes the above-described two steps, thereby forming an image on a recording medium using the cured polymerizable composition.

In addition, a printed article of the present disclosure is a printed article recorded using the polymerizable composition of the present disclosure and preferably a printed article recorded using the ink jet recording method of the present disclosure.

In the ink jet recording method of the present disclosure, it is possible to use an ink jet recording device described below in detail.

<Ink Jet Recording Device>

The ink jet recording device that can be used in the ink jet recording method of the present disclosure is not particularly limited, and a well-known ink jet recording device capable of achieving a target resolution can be arbitrarily selected and used. That is, any well-known ink jet recording devices including commercially available products can be used to jet the polymerizable composition to a recording medium in the ink jet recording method of the present disclosure.

Examples of the ink jet recording device that can be used in the present disclosure include devices including an ink supply system, a temperature sensor, and an active energy ray source.

The ink supply system is made up of, for example, a base tank including the polymerizable composition of the present disclosure, a supply pipe, an ink supply tank immediately ahead of an ink jet head, a filter, and a piezo-type ink jet head. The piezo-type ink jet head can be driven so as to be capable of jetting multi-sized dots of preferably 1 to 100 pl and more preferably 8 to 30 pl at a resolution of preferably 320×320 to 4,000×4,000 dpi, more preferably 400×400 to 1,600×1,600 dpi, and still more preferably 720×720 dpi. Meanwhile, "dots per inch (dpi)" mentioned in the present disclosure refers to the number of dots per 2.54 cm.

As described above, the polymerizable composition to be jetted as the polymerizable composition of the present disclosure is preferably maintained at a constant temperature, and thus the ink jet recording device preferably includes means for stabilizing the polymerizable composition temperature. Portions in which the temperature is maintained constant are all of pipe systems and members from an ink tank (an intermediate tank in a case in which there is the intermediate tank) to a nozzle injection surface. That is, heat insulation and heating can be carried out in a portion from the ink supply tank to the ink jet head.

The temperature control method is not particularly limited, but it is preferable to, for example, provide a plurality of temperature sensors in the respective pipe portions and control heating depending on the flow rate of the polymerizable composition and the environmental temperature. The temperature sensors can be provided in the ink supply tank and the vicinity of a nozzle of the ink jet head. In addition, a head unit that heats the polymerizable composition is preferably thermally shielded or insulated so as to prevent the device main body from being affected by the external temperature. In order to shorten the printing initiation time necessary for heating or reduce the loss of heat energy, it is preferable to thermally insulate a heating unit from other portions and decrease the heat capacity of the entire heating unit.

In addition, the temperature of the polymerizable composition during jetting is preferably maintained constant as much as possible. It is appropriate to set the control width of the temperature of the polymerizable composition during jetting to preferably the set temperature±5° C., more preferably the set temperature±2° C., and still more preferably the set temperature±1° C.

Next, irradiation with active radiation will be described.

The polymerizable composition jetted onto the recording medium cures by irradiation with active radiation. This is because the polymerization initiator that is included in the polymerizable composition of the present disclosure degrades by irradiation with active radiation and generates a polymerization initiating species such as a radical, and a polymerization reaction of the polymerizable compound is initiated and accelerated due to the function of the initiating species. At this time, in a case in which a sensitizer is present together with the polymerization initiator in the polymerizable composition, the sensitizer in the system absorbs active radiation, thus moves into an excited state, and comes into contact with the polymerization initiator so as to accelerate the degradation of the polymerization initiator, whereby it is possible to achieve a curing reaction with a higher sensitivity.

Here, as the active radiation being used, it is possible to use an α ray, a γ ray, an electron beam, an X-ray, an ultraviolet ray, a visible ray, an infrared ray, or the like. The peak wavelength of the active radiation is also dependent on the absorption characteristics of the sensitizer, and is, for example, preferably 200 to 600 nm, more preferably 300 to 450 nm, and still more preferably 320 to 420 nm. The active energy ray is particularly preferably an ultraviolet ray having a peak wavelength in a range of 340 to 400 nm.

In addition, the polymerization initiation system of the polymerizable composition of the present disclosure is a low-power active energy ray having a sufficient sensitivity. Therefore, it is appropriate to cure the polymerizable composition at an exposed surface illuminance of preferably 10 to 4,000 mW/cm$^2$ and more preferably 20 to 2,500 mW/cm$^2$.

As an active radiation source, a mercury lamp, a gas laser, a solid-state laser, or the like is mainly used, and, as a light source that is used to cure an ultraviolet ray-photocurable ink jet ink composition, a mercury lamp and a metal halide lamp are widely known. However, from the viewpoint of the current environmental protection, the removal of mercury is strongly desired, and the replacement into a GaN-based semiconductor ultraviolet light emitting device is extremely useful in an industrial and environmental sense. Furthermore, an LED (UV-LED) and an LD (UV-LD) are small-sized, long-service life, high-efficiency, and low-cost light sources and are expected as a photocurable ink jet light source.

In addition, a light emitting diode (LED) and a laser diode (LD) can be used as the active radiation source. Particularly, in a case in which an ultraviolet ray source is required, a violet LED and an ultraviolet LD can be used. For example, Nichia Corporation launches an ultraviolet LED in which the main emission spectrum has a wavelength between 365 nm and 420 nm. Furthermore, in a case in which a shorter wavelength is required, the specification of U.S. Pat. No. 6,084,250A discloses an LED capable of emitting active radiation having a center between 300 nm and 370 nm. In addition, other ultraviolet LEDs can be procured, and irradiation with radiation having a different ultraviolet band is possible. In the present disclosure, a particularly preferred active energy ray source is a UV-LED and a UV-LED having a peak wavelength particularly preferably at 340 to 400 nm.

Meanwhile, the maximum illuminance of the LED on the recording medium is preferably 10 to 2,000 mW/cm$^2$, more preferably 20 to 1,000 mW/cm$^2$, and particularly preferably 50 to 800 mW/cm$^2$.

The polymerizable composition of the present disclosure is appropriately irradiated with the above-described active radiation for preferably 0.01 to 120 seconds and more preferably 0.1 to 90 seconds.

The irradiation conditions and the basic irradiation method of the active radiation are disclosed by JP1985-132767A (JP-S60-132767A). Specifically, light sources are provided on both sides of a head unit including a jetting device of the polymerizable composition, and the head unit and the light sources are scanned in a so-called shuttle manner, thereby carrying out the irradiation. The irradiation with the active radiation is carried out for a certain time (preferably 0.01 to 0.5 seconds, more preferably 0.01 to 0.3 seconds, and still more preferably 0.01 to 0.15 seconds) after the landing of the polymerizable composition. In a case in which the time taken from the landing of the polymerizable composition to the irradiation is controlled to be extremely short as described above, it becomes possible to prevent the polymerizable composition landed on the recording medium from bleeding before being cured. In addition, it is possible to expose the polymerizable composition before the polymerizable composition permeates into a deep portion of a porous recording medium which the light source does not reach, and thus the remaining of unreacted monomers can be suppressed, which is preferable.

Furthermore, the curing may be completed using a different light source that does not accompany driving. WO99/54415A discloses a method in which an optical fiber is used as an irradiation method or a method in which a recording portion is irradiated with UV light by striking a collimated light source to a mirror surface provided on a side surface of the head unit, and these curing methods can also be applied to the ink jet recording method of the present disclosure.

The polymerizable composition of the present disclosure is preferably used in a form of an ink set made up of a plurality of ink jet ink compositions.

In the ink jet recording method of the present disclosure, the order of individual ink compositions (polymerizable compositions) to be jetted is not particularly limited, but it is preferable to impart a coloring ink composition (polymerizable composition) having a high brightness to the recording medium, and, in a case in which yellow, cyan, magenta, and black are used, it is preferable to impart yellow, cyan, magenta, and black in this order onto the recording medium. In addition, in a case in which white is added to the above-described colors and used, it is preferable to impart white, yellow, cyan, magenta, and black in this order onto the recording medium. Furthermore, the present disclosure is not limited thereto, it is also possible to preferably use an ink set of the present disclosure which includes ink compositions (polymerizable compositions) of at least seven colors of yellow, light cyan, light magenta, cyan, magenta, black, and white, and, in this case, it is preferable to impart white, light cyan, light magenta, yellow, cyan, magenta, and black in this order onto the recording medium.

<Recording Medium>

The recording medium to which the polymerizable composition of the present disclosure can be applied is not particularly limited, and it is possible to use paper such as ordinary uncoated paper and coated paper, a variety of nonabsorbent resin materials that are used for so-called soft packaging, and resin films obtained by forming the above-described resin materials in a film shape.

Examples of a variety of plastic films include polyethylene terephthalate (PET) films, biaxially oriented polystyrene (OPS) films, biaxially oriented polypropylene (OPP) films, biaxially oriented nylon (ONy) films, polyvinyl chloride (PVC) films, polyethylene (PE) films, cellulose triacetate (TAC) films, and the like.

Additionally, examples of plastic that can be used as the recording medium material include polycarbonate, acrylic resins, acrylonitrile-butadiene-styrene (ABS) copolymers, polyacetal, polyvinyl alcohol (PVA), rubber, and the like. In addition, metals or glass are also used as the recording medium.

The polymerizable composition of the present disclosure contains the polymerization initiator of the present disclosure and thus can be preferably used as a curable ink jet ink composition that can be cured by irradiation with the active radiation. In addition, the polymerizable composition of the present disclosure is also capable of directly forming high-quality images on a nonabsorbent recording medium on the basis of digital data and is thus preferably used for the production of printed articles having a large area.

The polymerizable composition of the present disclosure contains the polymerization initiator of the present disclosure and thus can be cured with a low exposure amount. Therefore, it is considered that the use of an inexpensive light source having a low exposure intensity reduces systems or running costs and the shortening of the exposure time contributes to an improvement of the printing rate. Furthermore, the fast curing rate after exposure enables the suppression of the bleeding of images, and clear images can be formed.

(Acylphosphine Oxide Compound)

An acylphosphine oxide compound of the present disclosure has a partial structure represented by Formula 1 or Formula 2.

Formula 1

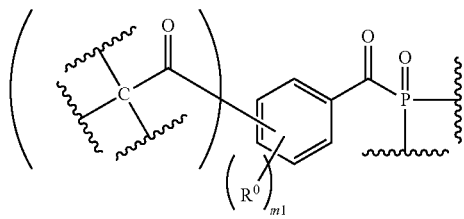

Formula 2

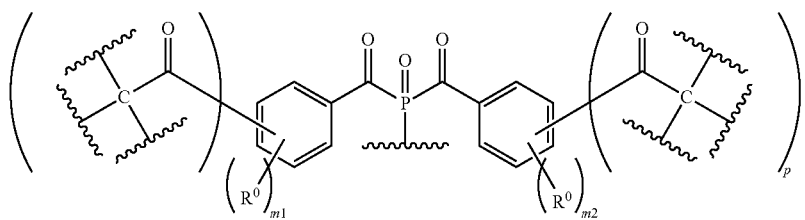

In Formula 1 and Formula 2, $R^0$'s each independently represent an alkyl group, an aryl group, or an alkoxy group, m1 represents an integer of 0 to 4, m2 represents an integer of 0 to 5, n represents an integer of 1 to 3, p represents an integer of 0 to 3, and a wavy line portion represents a bonding position to other structures.

In addition, the acylphosphine oxide compound of the present disclosure preferably has a partial structure represented by Formula 1-00 or Formula 2-00.

Formula 1-00

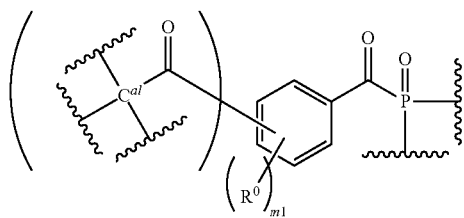

Formula 2-00

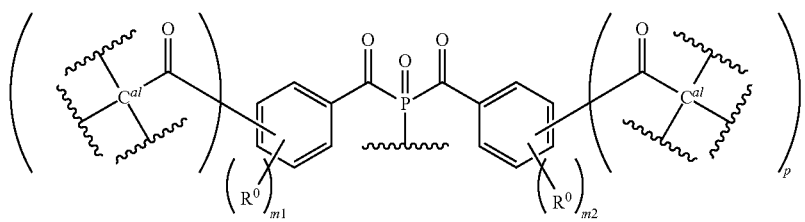

In Formula 1-00 and Formula 2-00, C' represents an aliphatic carbon atom, $R^0$'s each independently represent an alkyl group, an aryl group, or an alkoxy group, m1 represents an integer of 0 to 4, m2 represents an integer of 0 to 5, n represents an integer of 1 to 3, p represents an integer of 0 to 3, and a wavy line portion represents a bonding position to other structures.

Furthermore, the acylphosphine oxide compound of the present disclosure is more preferably represented by any of Formula 1-0, Formula 2-0, Formula 3, and Formula 4.

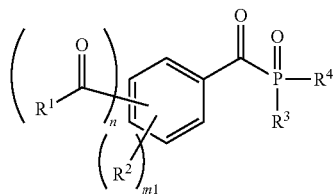

Formula 1-0

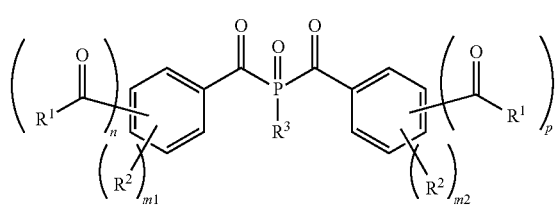

Formula 2-0

In Formula 1-0 and Formula 2-0, $R^1$'s each independently represent a monovalent hydrocarbon group in which a part of a hydrocarbon chain may be substituted with a carbonyl group, an ester bond, an amide bond, an oxygen atom, NR, and/or a sulfur atom, a linking group that links to a main chain of an oligomer or a polymer, or a linking group that links to $R^1$ of another acylphosphine oxide compound represented by Formula 1-0 or Formula 2-0 to form an oligomer or a polymer, R represents a hydrogen atom, an alkyl group, or an aryl group, $R^2$ to $R^4$ each independently represent an alkyl group, an aryl group, or an alkoxy group, m1 represents an integer of 0 to 4, m2 represents an integer of 0 to 5, n represents an integer of 1 to 3, and p represents an integer of 0 to 3.

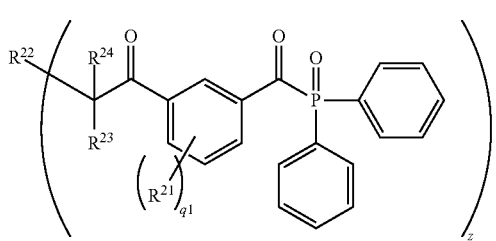

Formula 3

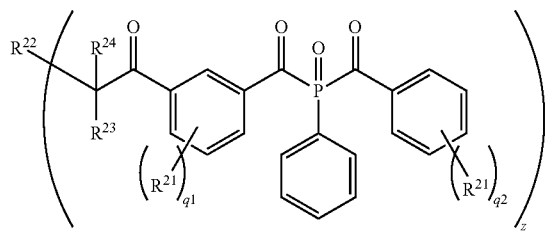

Formula 4

In Formula 3 and Formula 4, $R^{21}$'s each independently represent an alkyl group, an aryl group, or an alkoxy group, $R^{22}$ represents a z-valent organic group, $R^{23}$ and $R^{24}$ each independently represent a hydrogen atom or a monovalent hydrocarbon group in which a part of a hydrocarbon chain may be substituted with a carbonyl group, an ester bond, an amide bond, an oxygen atom, NR, and/or a sulfur atom, R represents a hydrogen atom, an alkyl group, or an aryl group, q1 represents an integer of 0 to 4, q2 represents an integer of 0 to 5, and z represents an integer of 2 to 10.

Preferred aspects of the acylphosphine oxide compound of the present disclosure are the same as the above-described preferred aspects of the photopolymerization initiator of the present disclosure respectively.

The acylphosphine oxide compound of the present disclosure can be preferably used as a photopolymerization initiator.

In addition, the acylphosphine oxide compound of the present disclosure is more preferably represented by Formula A or Formula B.

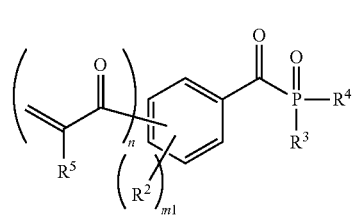

Formula A

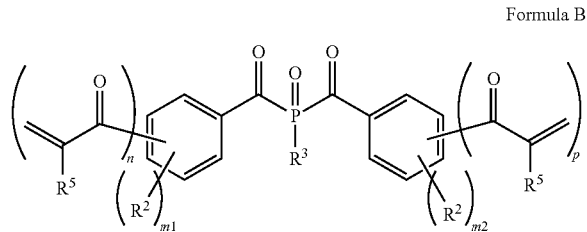

Formula B

In Formula A and Formula B, $R^2$ to $R^4$ each independently represent an alkyl group, an aryl group, or an alkoxy group, $R^5$'s each independently represent a hydrogen atom or a methyl group, m1 represents an integer of 0 to 4, m2 represents an integer of 0 to 5, n represents an integer of 1 to 3, and p represents an integer of 0 to 3.

$R^2$ to $R^4$, m1, m2, n, and p in Formula A and Formula B are the same as $R^2$ to $R^4$, m1, m2, n, and p in Formula 1-0 and Formula 2-0, and preferred aspects thereof are also the same respectively.

$R^5$ is preferably a hydrogen atom.

The acylphosphine oxide compound represented by Formula A or Formula B can be preferably used as a photopolymerization initiator and a raw material of the photopolymerization initiator.

The producing method of the acylphosphine oxide compound of the present disclosure is not particularly limited, the acylphosphine oxide compound may be produced using a well-known producing method, and the above-described producing method of the photopolymerization initiator is preferably exemplified.

In addition, preferred examples of the forming method of an acrylic group in the acylphosphine oxide compound represented by Formula A or Formula B include a method in which a desorption reaction is caused from a structure represented by X—CH$_2$—CH(R$^5$)—CO— using a leaving group X, thereby forming an acrylic group. As the leaving group, a chlorine atom and a bromine atom are preferably exemplified.

EXAMPLES

Hereinafter, an embodiment of the present invention will be specifically described using examples, but the embodiment of the present invention is not limited to these examples. Meanwhile, unless particularly otherwise described, "parts" and "%" are mass-based.

Compounds A1-(1) to (7), A2-(1) to (10), B1-(1) to (10), B2-(1) to (13), and A3-(1) to (10) used in the examples are the same compound as the above-described compounds A1-(1) to (7), A2-(1) to (10), B1-(1) to (10), B2-(1) to (13), and A3-(1) to (10) respectively.

Example 1

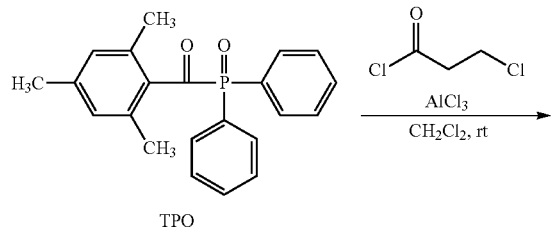

TPO

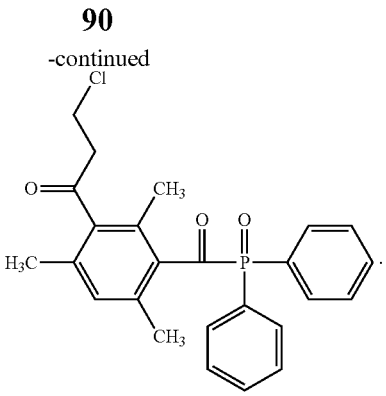

Dichloromethane (CH$_2$Cl$_2$) (570 ml) was added to and dissolved in TPO (30.0 g, 86.1 mmol, LUCIRIN (registered trademark) TPO manufactured by BASF Japan Ltd.), and then anhydrous aluminum (III) chloride (AlCl$_3$, 45.9 g, 344.5 mmol) was added thereto in a split manner and stirred so as to be dissolved. After that, 3-chloropropionic acid chloride (49.7 m1, 516.7 mmol) was added dropwise thereto and stirred at room temperature (rt, 10° C. to 35° C. which will be true in the following description) for seven hours. A reaction liquid was slowly added dropwise to ice water so as to stop the reaction, then, extracted using dichloromethane, washed with water, and dried using magnesium sulfate. The reaction liquid was filtered, the filtrate was condensed, then, purified using a silica gel column (hexane/ethyl acetate=50/50 (volume ratio)), and then dispersed using hexane, thereby obtaining a solid. The solid was filtered and washed with hexane, thereby obtaining a white target compound A1-(1) (28.2 g, 75%).

$^1$H NMR (CDCl3, 400 MHz) δ: 1.89 (3H, s), 2.05 (3H, s), 2.20 (3H, s), 3.13 (2H, t, d=8.0 Hz), 3.84 (2H, t, d=8.0 Hz), 6.88 (1H, s), 7.50-7.61 (6H, m), 7.97-8.05 (4H, m).

Example 2

A compound A1-(2) was obtained in the same manner as the compound A1-(1) except for the fact that 3-chloropropionic acid chloride was changed to chloroacetic acid chloride.

$^1$H NMR (CDCl3, 400 MHz) δ: 1.88 (3H, s), 2.05 (3H, s), 2.20 (3H, s), 4.37 (2H, s), 6.90 (1H, s), 7.50-7.62 (6H, m), 7.97-8.02 (4H, m).

Examples 3 and 4

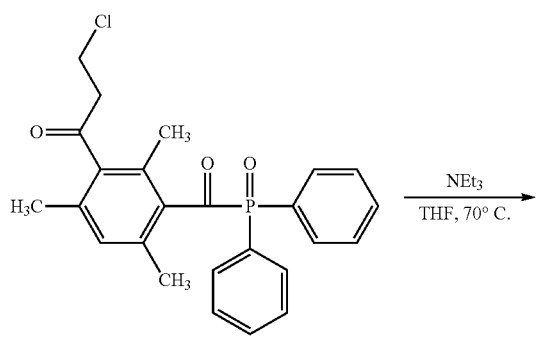

Compound A1-(1)

-continued
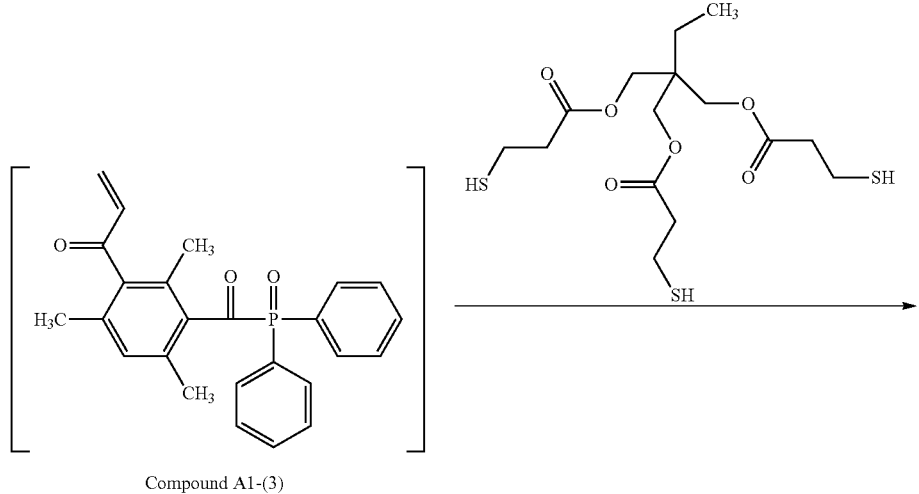
Compound A1-(3)
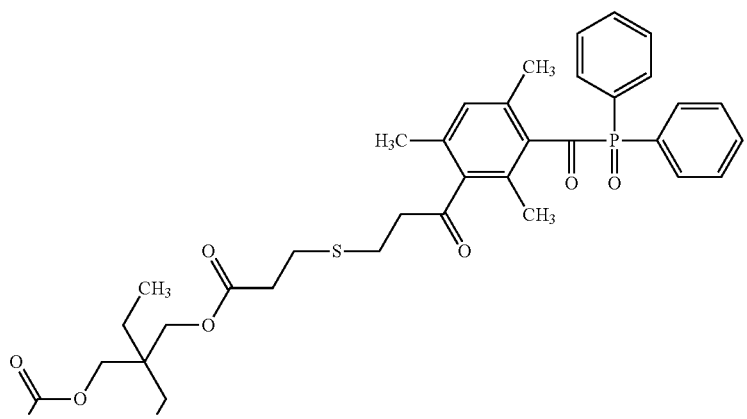
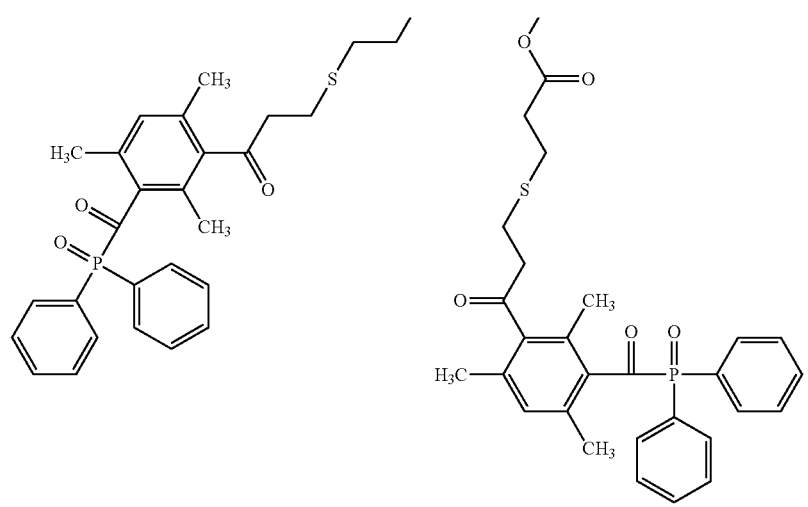
Compound A2-(1)

<Synthesis of Compound A1-(3)>

The compound A1-(1) (50 mg, 0.114 mmol) was dissolved in tetrahydrofuran (1.2 ml), then, triethylamine (0.05 ml) was added thereto, and the mixture was stirred at 70° C. for two hours. After a reaction, a precipitated salt was filtered, then, the filtrate was condensed and purified using a silica gel column (hexane/ethyl acetate=40/60 (volume ratio)), thereby obtaining a yellow target oily compound A1-(3) quantitively.

$^1$H NMR (CDCl3, 400 MHz) δ: 1.82 (3H, s), 2.05 (3H, s), 2.14 (3H, s), 5.96 (1H, d, d=16 Hz), 6.12 (1H, d, d=8.0 Hz), 6.51 (1H, q, d=8.0 Hz), 6.89 (1H, s), 7.50-7.60 (6H, m), 7.96-8.01 (4H, m).

<Synthesis of Compound A2-(1)>

The compound A1-(1) (9.66 g, 22.0 mmol) was dissolved in tetrahydrofuran (65 ml), then, triethylamine (13 ml) was added thereto, trimethylolpropane tris(3-mercaptopropionate) (2.50 g, 6.27 mmol) was added thereto, and the mixture was stirred at 70° C. for two hours. After a reaction, a precipitated salt was filtered, then, the filtrate was condensed and purified using a silica gel column (ethyl acetate), thereby obtaining a yellow target compound A2-(1) (7.96 g, 79%).

$^1$H NMR (CDCl3, 400 MHz) δ: 0.88 (3H, t, d=8.0 Hz), 1.49 (2H, q, d=8.0 Hz), 1.89 (9H, s), 2.01 (9H, s), 2.18 (9H, s), 2.64 (6H, t, d=8.0 Hz), 2.74-2.95 (18H, m), 4.05 (6H, s), 6.86 (3H, s), 7.49-7.60 (18H, m), 7.96-8.01 (12H, m).

Example 5

A compound A2-(2) was obtained in the same manner as the compound A2-(1) except for the fact that trimethylolpropane tris(3-mercaptopropionate) was changed to pentaerythritol (3-mercaptopropionate), and the equivalent of the compound A1-(1) was changed from 3.5 equivalents to 4.5 equivalents with respect to a polyfunctional thiol.

$^1$H NMR (CDCl3, 400 MHz) δ: 1.86 (12H, s), 2.01 (12H, s), 2.17 (12H, s), 2.64 (8H, t, d=8.0 Hz), 2.71-2.95 (24H, m), 4.16 (8H, s), 6.85 (4H, s), 7.49-7.60 (24H, m), 7.96-8.01 (16H, m).

Example 6

A compound A2-(3) was obtained in the same manner as the compound A2-(1) except for the fact that trimethylolpropane tris(3-mercaptopropionate) was changed to dipentaerythritol hexakis(3-mercaptopropionate), and the equivalent of the compound A1-(1) was changed from 3.5 equivalents to 6.6 equivalents with respect to a polyfunctional thiol.

$^1$H NMR (CDCl3, 400 MHz) δ: 1.86 (18H, s), 2.01 (18H, s), 2.16 (18H, s), 2.63 (12H, t, d=8.0 Hz), 2.76-2.94 (36H, m), 3.42 (4H, s), 4.10-4.15 (12H, m), 6.85 (6H, s), 7.49-7.60 (36H, m), 7.96-8.01 (24H, m).

Example 7

A compound A2-(4) was obtained in the same manner as the compound A2-(1) except for the fact that trimethylolpropane tris(3-mercaptopropionate) was changed to bis(hexamethylene)triamine, and the equivalent of the compound A1-(3) was changed from 3.5 equivalents to 5.75 equivalents.

$^1$H NMR (CDCl3, 400 MHz) δ: 1.22-1.27 (8H, m), 1.36-1.46 (8H, m), 1.86 (15H, s), 2.02 (15H, s), 2.17 (18H, s), 2.30-2.38 (8H, m), 2.76-2.84 (20H, m), 6.84 (5H, s), 7.49-7.59 (30H, m), 7.96-8.01 (20H, m).

Example 8

Compounds A1-(2), A1-(4) to (7), A2-(2), A2-(4) to (9), B1-(1) to (9), and B2-(1) to (9) were respectively synthesized in the same manner as any of Examples 1 to 7 except for the fact that the raw material was changed.

Example 9

Compounds B1-(10) to (12) were respectively synthesized in the same manner as in Example 1 except for the fact that a difunctional acid chloride was used as the raw material.

Compound B1-(10): Mw=1,600
Compound B1-(11): Mw=1,500
Compound B1-(12): Mw=1,700

Example 10

<Synthesis of Compound A2-(10)>

Methyl ethyl ketone (20 ml) was stirred at an outer temperature of 70° C. in a nitrogen atmosphere. The raw material compound A1-(3) (5.00 g, 12.4 mmol) dissolved in methyl ethyl ketone (80 ml), 2,2'-azobis(2,4-dimethylvaleronitrile) (571 mg, 2.48 mmol) were added dropwise thereto for two hours and then stirred for eight hours. The mixture was cooled in the air to room temperature, then, condensed in methyl ethyl ketone (approximately 90 ml), then, crystallized using hexane, and filtered and dried, thereby obtaining a compound A2-(10) (3.1 g). The composition of the obtained polymer was confirmed by means of $^1$H NMR, and the molecular weight was measured by means of GPC (Mw=3,200).

Example 11

Compounds B2-(10) to (13) were respectively synthesized in the same manner as in Example 10 except for the fact that the raw material was changed.

Compound B2-(10): Mw=2,200
Compound B2-(11): Mw=1,500
Compound B2-(12): Mw=3,200
Compound B2-(13): Mw=5,300

Examples 12 to 54 and Comparative Examples 1 to 5

<Method for Computing Degradation Yield>

Specimen Adjustment

A solution was produced using propylene glycol monomethyl ether acetate (PEGMEA) as a solvent. The concentrations of the compounds shown in Table 1 to Table 4 were adjusted to approximately 0.5 to 1 mM so that the absorbency (Abs) in the vicinity of a wavelength of 365 nm in a 1-cm cell reached approximately one. Meanwhile, 1 M is equal to 1 mol/L.

Ultraviolet (UV) Exposure

Light exposure was carried out using a high-pressure mercury lamp manufactured by Ushio Inc. A bandpass filter of 370 nm for monochromatically extracting light having a wavelength of 365 nm was used. In addition, the exposure intensity was set to 36 mW/cm$^2$, the exposure area was set to 0.64 cm$^2$, the capacity was set to 4.3 ml, and the time was set to 90 s.

Absorption Measurement

Absorption measurement was carried out using HP8453 manufactured by Agilent Technologies.

Degradation Yield Calculation

The degradation yield was calculated from the following equation.

Degradation yield=(number of degraded molecules)/ (number of radiated photons)×(absorbance)× (number of functional groups in acylphosphine oxide structure in molecule)

Meanwhile, individual values are as described below.

Number of degraded molecules=reaction molar number (mol)×Avogadro's number (mol$^{-1}$)

Reaction molar number (mol)=initial concentration (mol/L)×absorbance×capacity (L)

Reaction ratio=1−(absorbency after exposure)/(absorbency before exposure)

(the absorbencies mentioned herein refer to individual values before and after exposure at 365 nm)

Number of radiated photons=irradiation energy/energy of one photon (eV)

Irradiation energy=exposure intensity ($W$)×exposure area $S$×reaction ratio×time ($t$)

The absorbance=1−10$^{-absorbency}$: (here, the absorbency mentioned herein refers to the average value of the absorbency before and after exposure at 365 nm.)

<Evaluation of Curing Sensitivity>

—Production Method of Ink Composition (Polymerizable Composition)—

3-Methyl-1,5-pentanediol diacrylate (SR341, manufactured by Sartomer) (approximately 870 parts by mass) and polyethylene glycol diacrylate (SR344, manufactured by Sartomer) (approximately 10 parts by mass) as polymerizable compounds, a compound shown in Table 1 to Table 4 (approximately 8 parts by mass) as a photopolymerization initiator, a cyan millbase A (10 parts by mass), and a surfactant (BYK307 silicone-based surfactant, manufactured by BYK Chemie) (0.1 parts by mass) were added, mixed, and stirred together, thereby obtaining each ink composition.

In addition, the cyan millbase A was prepared as described below.

—Preparation of Cyan MillBase A—

Heliogen Blue D 7110 F (a cyan pigment, manufactured by BASF Japan Ltd.) (300 parts by mass), SR9003 (PO-modified neopentyl glycol diacrylate, manufactured by Sartomer) (620 parts by mass), and SOLSPERSE32000 (a dispersant manufactured by Noveon International) (80 parts by mass) were stirred and mixed together, thereby obtaining a cyan millbase A. Meanwhile, the cyan millbase A was prepared by putting the above-described components into a disperser motor mill M50 (manufactured by Eiger) and carrying out dispersion using zirconia beads having a diameter of 0.65 mm at a circumferential speed of 9 m/s for four hours.

—Ink Jet Image Recording—

Recording was carried out on a medium to be recorded using an ink jet recording device having a piezo-type ink jet nozzle and the ink composition obtained above. An ink supply system was made up of a base tank, a supply pipe, an ink supply tank immediately ahead of an ink jet head, a filter, and a piezo-type ink jet head (the diameter of an opening portion of the nozzle was 25 μm), and heat insulation and heating can be carried out in a portion from the ink supply tank to the ink jet head. Temperature sensors were provided in the ink supply tank and the vicinity of the nozzle of the ink jet head, and the temperature was controlled so as to be 40° C.±2° C. at all times in the nozzle portion. The piezo-type ink jet head was driven so that 1 to 10 picoliters (pl) of multi-sized dots could be injected at a resolution of 4,800× 4,800 dpi. After the landing, UV light was focused to an exposed surface illuminance of 700 mW/cm$^2$, and the exposure system, the main scanning rate, and the injection frequency were adjusted so that irradiation began 0.1 seconds after the landing of the ink composition on the medium to be recorded. In addition, the exposure time was set to be variable, and exposure energy was radiated. As an ultraviolet lamp, a HAN250NL high-cure mercury lamp (manufactured by GS Yuasa Corporation) was used. Meanwhile, dpi mentioned in the present disclosure refers to the number of dots per 2.54 cm. As the medium to be recorded, an ester film E5000 (film thickness: 125 μm, manufactured by Toyobo Co., Ltd.) was used.

—Evaluation of Curing Sensitivity—

A solid image having an average film thickness of 12 μm was drawn according to the above-described ink jet image record and was irradiated with ultraviolet rays. The amount of exposure energy (mJ/cm$^2$) at which the pressure sensitive adhesive feeling disappeared on the ultraviolet-irradiated image surface was defined as the curing sensitivity. A small numerical value indicates a high sensitivity.

In addition, the curing sensitivity was evaluated using the following standards.

A: Less than 3,500 mJ/cm$^2$
B: 3,500 mJ/cm$^2$ or more and less than 4,000 mJ/cm$^2$
C: 4,000 mJ/cm$^2$ or more and less than 4,500 mJ/cm$^2$
D: 4,500 mJ/cm$^2$ or more and less than 5,000 mJ/cm$^2$
E: 5,000 mJ/cm$^2$ or more

TABLE 1

|  | Compound | Degradation yield (%) | Curing sensitivity |
| --- | --- | --- | --- |
| Example 12 | A1-(1) | 88 | B |
| Example 13 | A1-(1) | 95 | A |
| Example 14 | A1-(2) | 88 | B |
| Example 15 | A1-(3) | 93 | B |
| Example 16 | A1-(4) | 90 | B |
| Example 17 | A1-(5) | 88 | B |
| Example 18 | A1-(6) | 86 | B |
| Example 19 | A1-(7) | 92 | B |
| Comparative Example 1 | C1-(1) | 85 | C |
| Comparative Example 2 | C1-(2) | 82 | C |
| Comparative Example 3 | C1-(3) | 80 | C |

Meanwhile, in Example 13, an ink composition (polymerizable composition) was prepared in the same manner as in Example 12 except for the fact that isopropylthioxanthone (ITX, manufactured by Tokyo Chemical Industry Co., Ltd.) was further added as the sensitizer by 2%.

TABLE 2

|  | Compound | Degradation yield (%) | Curing sensitivity |
| --- | --- | --- | --- |
| Example 20 | B1-(1) | 92 | B |
| Example 21 | B1-(2) | 92 | B |
| Example 22 | B1-(3) | 95 | A |
| Example 23 | B1-(4) | 95 | A |
| Example 24 | B1-(5) | 92 | B |

TABLE 2-continued

| | Compound | Degradation yield (%) | Curing sensitivity |
|---|---|---|---|
| Example 25 | B1-(6) | 92 | B |
| Example 26 | B1-(7) | 95 | A |
| Example 27 | B1-(8) | 95 | A |
| Example 28 | B1-(9) | 92 | B |
| Example 29 | B1-(10) | 95 | A |
| Example 30 | B1-(11) | 95 | A |
| Example 31 | B1-(12) | 95 | A |

TABLE 3

| | Compound | Degradation yield (%) | Curing sensitivity |
|---|---|---|---|
| Example 32 | A2-(1) | 92 | B |
| Example 33 | A2-(2) | 95 | B |
| Example 34 | A2-(3) | 95 | B |
| Example 35 | A2-(4) | 95 | B |
| Example 36 | A2-(5) | 95 | B |
| Example 37 | A2-(6) | 95 | B |
| Example 38 | A2-(7) | 95 | B |
| Example 39 | A2-(8) | 95 | B |
| Example 40 | A2-(9) | 95 | B |
| Example 41 | A2-(10) | 95 | B |
| Comparative Example 4 | C2-(1) | 90 | C |
| Comparative Example 5 | C2-(2) | 90 | C |

TABLE 4

| | Compound | Degradation yield (%) | Curing sensitivity |
|---|---|---|---|
| Example 42 | B2-(1) | 95 | A |
| Example 43 | B2-(2) | 95 | A |
| Example 44 | B2-(3) | 92 | A |
| Example 45 | B2-(4) | 92 | A |
| Example 46 | B2-(5) | 95 | A |
| Example 47 | B2-(6) | 95 | A |
| Example 48 | B2-(7) | 92 | A |
| Example 49 | B2-(8) | 95 | A |
| Example 50 | B2-(9) | 95 | A |
| Example 51 | B2-(10) | 94 | A |
| Example 52 | B2-(11) | 93 | A |
| Example 53 | B2-(12) | 90 | B |
| Example 54 | B2-(13) | 92 | B |

Compounds C1-(1) to (3) and C2-(1) and (2) described in Table 1 to Table 4 which were used in the respective comparative examples are illustrated below. Meanwhile, in the following compounds, "$^n$Bu" represents an n-butyl group.

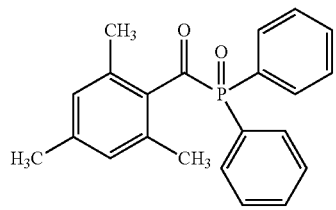

Compound C1-(1)

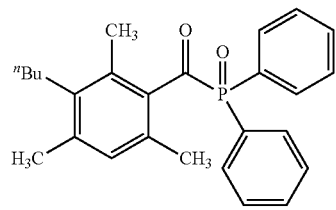

Compound C1-(2)

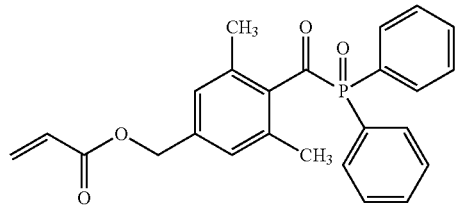

Compound C1-(3)

Compound C2-(1)

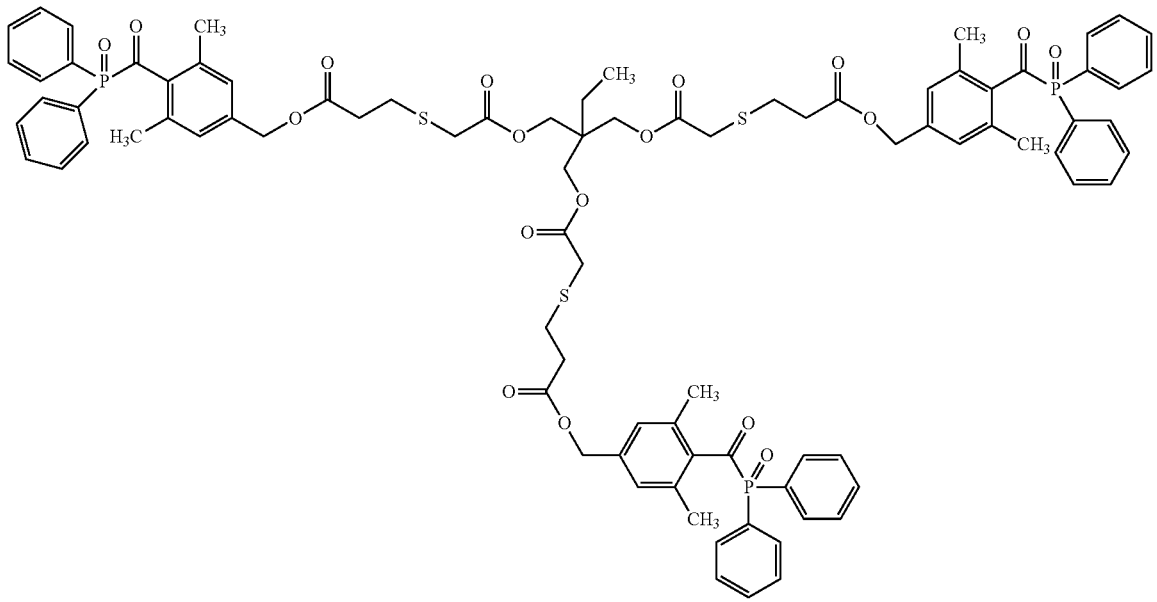

Compound C2-(2)

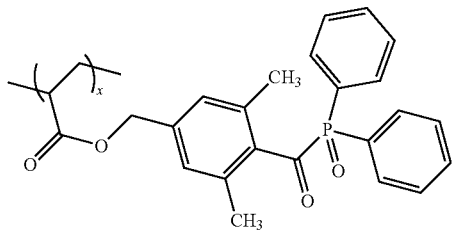

<Synthesis Method of A3-(1)>

Dichloromethane (CH$_2$Cl$_2$) (500 ml) was added to and dissolved in TPO (500 g, 144 mmol, LUCIRIN (registered trademark) TPO manufactured by BASF Japan Ltd.), and then anhydrous aluminum (III) chloride (AlCl$_3$, 576 g, 432 mmol) was added thereto in a split manner and stirred so as to be dissolved. After that, 3-chloropropionic acid chloride (145 ml, 173 mmol) was added dropwise thereto and stirred at room temperature for seven hours. A reaction liquid was slowly added dropwise to ice water so as to stop the reaction, then, extracted using dichloromethane, washed with water, and dried using magnesium sulfate. The reaction liquid was filtered, the filtrate was condensed, then, purified using a silica gel column (hexane/ethyl acetate=40/60 (volume ratio)), and then dispersed using hexane, thereby obtaining a solid. The solid was filtered and washed with hexane, thereby obtaining a white target compound A3-(1) (365 g, 54%).

$^1$H NMR (CDCl3, 400 MHz) δ: 1.89 (3H, s), 2.05 (3H, s), 2.20 (3H, s), 4.24 (2H, s), 6.90 (1H, s), 7.50-7.61 (6H, m), 7.97-8.01 (4H, m).

<Synthesis Method of A3-(2)>

Acetonitrile (60 ml) was added to citric acid (2.88 g, 15.0 mmol), the compound A3-(1) (23.22 g, 49.5 mmol), and triethylamine (15.2 g, 150 mmol) and stirred at 65° C. for seven hours. A reaction liquid was condensed, ethyl acetate (100 ml) was added thereto, dispersed therein, and filtered, and the filtrate was purified using a silica gel column (ethyl acetate), thereby obtaining a white target compound A3-(2) (10.3 g).

$^1$H NMR (CDCl3, 400 MHz) δ: 1.89 (6H, s), 1.95 (3H, s), 1.98 (3H, s), 2.02 (6H, s), 2.20 (6H, s), 2.21 (3H, s), 3.06 (4H, s), 4.86 (4H, s), 4.96 (2H, s), 6.89 (3H, m), 7.49-7.60 (18H, m), 7.97-8.02 (12H, m).

<Synthesis Method of A3-(3) to A3-(5), A3-(8) and A3-(9)>

A3-(3), A3-(4), A3-(5), A3-(8), and A3-(9) were respectively synthesized in the same manner as A3-(2) except for the fact that a tetraacid (manufactured by Frontier Scientific Inc.), malic acid, glycolic acid, trimesic acid, and tris(2-carboxyethyl) isocyanurate were used respectively instead of citric acid as a carboxylic acid.

<Synthesis Method of A3-(6) and A3-(7)>

A compound A3-(6) was synthesized in the same manner as the compound A3-(1) except for the fact that the molar ratio between TPO and dodecane dioic acid dichloride was changed to 2.5:1 using dodecane dioic acid dichloride as an acid chloride.

In addition, a compound A3-(7) was synthesized in the same manner as the compound A3-(1) except for the fact that lauroyl chloride was used as an acid chloride.

<Synthesis Method of A3-(10)>

Thionyl chloride (30 ml) and N,N-dimethylformamide (0.1 ml) were added to tris(2-carboxyethyl) isocyanurate (10.36 g, 30 mmol) and stirred at 100° C. for three hours. After that, a reaction liquid was condensed and dried at a reduced pressure, and then TPO (36.6 g, 105 mmol) and dichloromethane (CH$_2$Cl$_2$) (100 ml) were added thereto. After that, anhydrous aluminum (III) chloride (AlCl$_3$, 48 g, 360 mmol) was added thereto in a split manner and then stirred for eight hours while being refluxed. The reaction liquid was slowly added dropwise to ice water so as to stop the reaction, then, extracted using ethyl acetate, washed with water, and dried using magnesium sulfate. The reaction liquid was filtered, the filtrate was condensed, then, purified using a silica gel column (hexane/ethyl acetate=10/90 (volume ratio)), and then dispersed using hexane, thereby obtaining a solid. The solid was filtered and washed with hexane, thereby obtaining a white target compound A3-(10) (27.5 g, 69%).

$^1$H NMR (CDCl3, 400 MHz) δ: 1.88 (9H, s), 2.01 (9H, s), 2.19 (9H, s), 3.02 (6H, t, d=8.0 Hz), 4.24 (6H, t, d=8.0 Hz), 6.86 (3H, s), 7.49-7.60 (18H, m), 7.94-8.01 (12H, m).

<Synthesis Method of B2-(14)>

A compound B2-(14) was synthesized in the same manner as in Example 10 except for the fact that the raw material was changed.

Compound B2-(14): A compound having Mw of 15,000 and the same structure as the compound B2-(13) except for Mw.

Examples 55 to 64

The degradation rate and the curing sensitivity in the case of using A3-(1) to (10) respectively shown in Table 5 were evaluated in the same manner as in Example 12. The evaluation results are shown in Table 5.

TABLE 5

|  | Compound | Degradation yield (%) | Curing sensitivity |
|---|---|---|---|
| Example 55 | A3-(1) | 92 | B |
| Example 56 | A3-(2) | 95 | B |
| Example 57 | A3-(3) | 95 | B |
| Example 58 | A3-(4) | 94 | B |
| Example 59 | A3-(5) | 92 | B |
| Example 60 | A3-(6) | 94 | B |
| Example 61 | A3-(7) | 94 | B |
| Example 62 | A3-(8) | 93 | B |
| Example 63 | A3-(9) | 95 | B |
| Example 64 | A3-(10) | 96 | B |

Examples 65 to 82

Ink compositions containing each of the compounds described in Table 6 were respectively produced in the same manner as in Example 12. The compounds shown in Table 6 or the produced ink compositions were used, and the following evaluation was carried out. The evaluation results are summarized in Table 6.

<Evaluation of Light Stability of Linking Group in Acylphosphine Oxide Compound>

A1% solution was prepared by dissolving a compound shown in Table 6 in toluene and applied onto polyethylene terephthalate (PET) (8×16 cm) using a 24 μm-thick bar, N2 substitution was carried out in a nitrogen purge-type small-sized conveyor UV irradiation device (CSN2-40A, manufactured by GS Yuasa International Ltd.) for five minutes, then, exposure was carried out 10 times at a transportation rate of 50 m/min, an exposure intensity of 4 mW, and a wavelength of 365 nm, and then the PET film was extracted using THF (4 ml). The obtained solution was analyzed using LC-MS (liquid chromatography-mass spectrometer), the peak of the acylphosphine oxide compound and the degraded substance peak attributed to the degradation of the acylphosphine oxide structure were specified, the area % of the total of degraded substance peaks other than these peaks was computed, and evaluation was carried out as described below on the basis of the above-described value. C or higher are evaluated as levels with no practical problems.

A: 0% or more and less than 2%
B: 2% or more and less than 4%
C: 4% or more and less than 7%
D: 7% or more and less than 10%
E: 10% or more <Ink Jet Jettability (Jettability)>

The obtained ink composition was jetted from 256 nozzles using a piezo-type ink jet head QS-256/30 (manufactured by FUJIFILM DIMA TIX) at an amount of jetted liquid droplets being each 30 pL, a frequency of 33 kHz, and 25° C. for 10 minutes, and nozzle clogging after the jetting was evaluated. Evaluation was carried out using the following five levels.

A: There is no clogging.
B: The number of clogged nozzles is 1 or 2.
C: The number of clogged nozzles is 3 to 5.
D: The number of clogged nozzles is 6 to 20.
E: The number of clogged nozzles is 21 or more.

<Evaluation of Elution (Migration) Amount>

The obtained ink composition was used, a printed article obtained using the same ink jet image recording method as in Example 12 was cut out to a size of 1 square decimeter, a liquid mixture of water and ethanol (mass ratio=20:80) (10 ml) was added dropwise to the printed surface, and the printed article was put into a glass airtight container so that the liquid mixture was not volatilized and left to stand at 40° C. for 10 days. After that, the total of the elution amounts of the photopolymerization initiator (the acylphosphine compound) and the degraded substance of the photopolymerization initiator from the printed article included in the liquid mixture was determined by means of high-performance liquid chromatography (HPLC) and was evaluated using the following five levels. C or higher are evaluated as levels with no practical problems.

A: Less than 10 ppb
B: 10 ppb or more and less than 30 ppb
C: 30 ppb or more and less than 100 ppb
D: 100 ppb or more and less than 300 ppb
E: 300 ppb or more

TABLE 6

|  | Compound | Light stability of linking group | Jettability | Elution amount |
|---|---|---|---|---|
| Example 65 | A1-(9) | A | B | A |
| Example 66 | A1-(6) | A | B | B |
| Example 67 | A3-(8) | A | B | A |
| Example 68 | A1-(7) | A | C | A |
| Example 69 | B1-(10) | A | B | B |
| Example 70 | B1-(12) | A | C | B |
| Example 71 | B2-(13) | A | B | A |
| Example 72 | B2-(14) | A | C | A |
| Example 73 | A2-(1) | C | B | C |
| Example 74 | A2-(4) | C | B | C |
| Example 75 | A2-(7) | C | B | C |
| Example 76 | B2-(1) | C | B | C |
| Example 77 | A3-(2) | A | B | A |
| Example 78 | A3-(3) | A | B | A |
| Example 79 | A3-(6) | A | B | A |
| Example 80 | A3-(7) | A | A | C |
| Example 81 | A3-(9) | A | B | A |
| Example 82 | A3-(10) | A | B | A |

The reason for the compound having an amino bond or a thioether bond in the linking group having a low light stability is considered that the generated radical participated in a complicated reaction such as the chain transfer to a hetero atom, and a side reaction such as dimerization or bond cleavage was caused. In addition, it is considered that, in the compound A1-(1) or the compound A3-(1), the halogen atom is likely to desorb together with an adjacent proton having a high acidity as hydrochloric acid or hydrobromic acid, and thus the stability became low.

In a case in which Example 67 and Example 68 are compared with each other, Example 67 in which the compound A3-(8) in which the carbon atom that linked to the carbonyl group that further linked to the aromatic ring of the aromatic acyl group that bonded to the phosphorus atom in the acylphosphine oxide structure was an aliphatic carbon atom was used was superior in terms of the jettability to Example 68 in which the compound A1-(7) in which the carbon atom was an aromatic carbon atom was used.

In a case in which Example 69 and Example 70 are compared with each other, Example 69 in which the compound B1-(10) in which L in Formula 2B was an alkylene group was used was superior in terms of the jettability to Example 70 in which the compound B1-(12) in which L was an arylene group was used.

In a case in which Example 71 and Example 72 are compared with each other, Example 71 in which the compound B2-(13) in which the molecular weight or the weight-average molecular weight was 300 or more and 10,000 or less was used was superior in terms of the jettability to Example 72 in which the compound B2-(14) in which the weight-average molecular weight exceeded 10,000 was used.

In a case in which Example 73 to Example 76 and Example 75 to Example 77 are compared with each other, the use of the compound in which the linking group did not have any of an amino bond, a thioether bond, and a halogen atom led to superior light stability and enabled the additional suppression of the elution amount.

In addition, as described in Example 77 to Example 80, Example 77 to Example 79 in which the compound A3-(2), A3-(3), or A3-(6) having two or more acylphosphine oxide structures in the molecule had a smaller migration amount than Example 80 in which the compound A3-(7) having only one acylphosphine oxide structure in the molecule.

The disclosures of JP2015-227695 filed on Nov. 20, 2015 and JP2016-169969 filed on Aug. 31, 2016 are all incorporated into the present specification by reference.

All of the documents, the patent applications, and the technical standards described in the present specification are incorporated into the present specification by reference to the same extent as each of the documents, the patent applications, and the technical standards is specifically and individually described in the present specification.

What is claimed is:

1. A photopolymerization initiator which is an acylphosphine oxide compound having a structure in which one or more carbonyl groups that link to a carbon atom are further directly bonded to an aromatic ring of an aromatic acyl group that bonds to a phosphorus atom in an acylphosphine oxide structure,
wherein the carbon atom that links to the carbonyl group is an aliphatic carbon atom,
wherein the photopolymerization initiator has a constitutional unit represented by Formula 1A, Formula 2A, or Formula 2B:

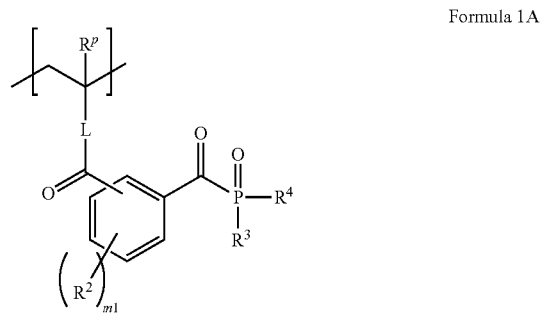

Formula 1A

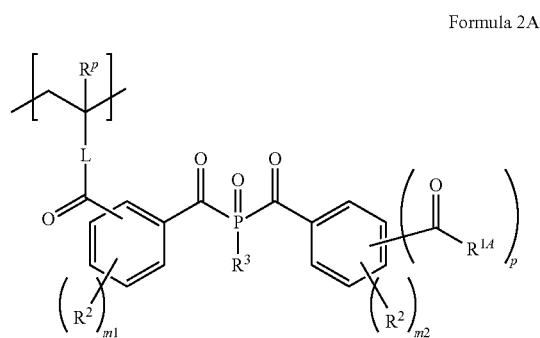

Formula 2A

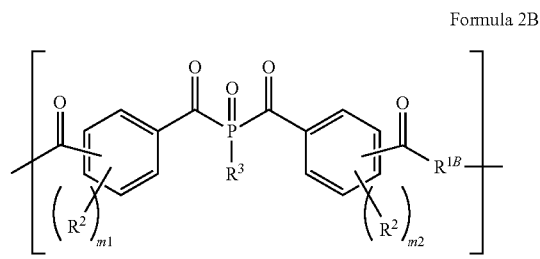

Formula 2B wherein, in Formula 1A, Formula 2A, or Formula 2B, L's each independently represent a single bond, $R^P$'s each independently represent a hydrogen atom or an alkyl group, $R^{1A}$'s each independently represent a monovalent hydrocarbon group in which a part of a hydrocarbon chain may be substituted with a carbonyl group, an ester bond, an amide bond, an oxygen atom, NR, and/or a sulfur atom, and $R^{1A}$ is a group that links at an aliphatic carbon atom to the carbonyl group in Formula 2A, $R^{1B}$ represents a divalent hydrocarbon group in which a part of a hydrocarbon chain may be substituted with a carbonyl group, an ester bond, an amide bond, an oxygen atom, NR, and/or a sulfur atom, and $R^{1B}$ is a group that links at an aliphatic carbon atom to the carbonyl group in Formula 2B, R represents a hydrogen atom, an alkyl group, or an aryl group, $R^2$ to $R^4$ each independently represent an alkyl group, an aryl group, or an alkoxy group, m1 represents 3, m2 represents an integer of 0 to 5, and p represents an integer of 0 to 3.

2. The photopolymerization initiator according to claim 1, wherein Formula 1A is Formula 1C, and Formula 2A is Formula 2C:

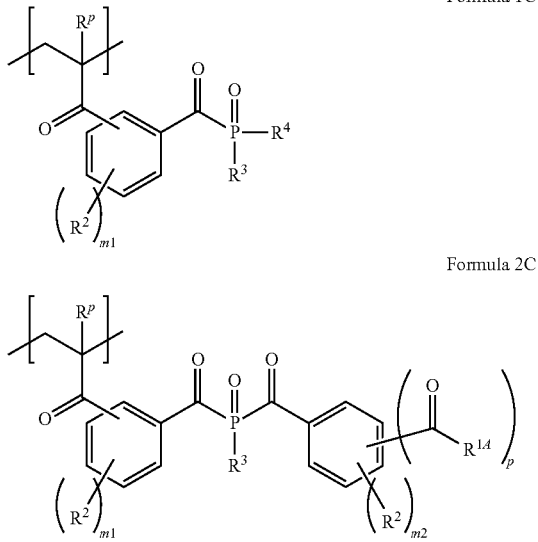

wherein, in Formula 1C and Formula 2C, $R^P$'s each independently represent a hydrogen atom or a methyl group, $R^{1A}$'s each independently represent a monovalent hydrocarbon group in which a part of a hydrocarbon chain may be substituted with a carbonyl group, an ester bond, an amide bond, an oxygen atom, NR, and/or a sulfur atom, R represents a hydrogen atom, an alkyl group, or an aryl group, $R^2$ to $R^4$ each independently represent an alkyl group, an aryl group, or an alkoxy group, m1 represents 3, m2 represents an integer of 0 to 5, and p represents an integer of 0 to 3.

3. The photopolymerization initiator according to claim 1 which has two or more acylphosphine oxide structures in a molecule.

4. The photopolymerization initiator according to claim 3, wherein a linking group that links two or more of the acylphosphine oxide structures together does not have any of an amino bond, a thioether bond, and a halogen atom.

5. The photopolymerization initiator according to claim 1, wherein a molecular weight or a weight-average molecular weight is 300 or more and 10,000 or less.

6. A polymerizable composition comprising:
   the photopolymerization initiator according to claim 1; and
   a polymerizable compound.

7. An inkjet recording method comprising:
   a step of jetting the polymerizable composition according to claim 6 onto a recording medium using an ink jet method; and
   a step of curing the polymerizable composition by irradiating the jetted polymerizable composition with active radiation.

8. A producing method of the photopolymerization initiator according to claim 1, the method comprising:
   a step of reacting an acylphosphine oxide compound having one or more aromatic acyl groups that bond to a phosphorus atom with an acid halide or an acid anhydride in the presence of a Lewis acid.

* * * * *